(12) United States Patent
Tokunaga et al.

(10) Patent No.: US 6,363,221 B1
(45) Date of Patent: *Mar. 26, 2002

(54) FLASH PHOTOGRAPHY SYSTEM WITH PRELIMINARY AND MAIN EMISSION

(75) Inventors: Tatsuyuki Tokunaga, Saitama-ken; Yoichi Sato; Takao Takano, both of Kanagawa-ken, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/525,841

(22) Filed: Mar. 15, 2000

Related U.S. Application Data

(62) Division of application No. 08/685,411, filed on Jul. 24, 1996, now Pat. No. 6,067,422.

(30) Foreign Application Priority Data

| Jul. 28, 1995 | (JP) | 7-193683 |
| Jul. 31, 1995 | (JP) | 7-194908 |
| Aug. 16, 1995 | (JP) | 7-208833 |
| Aug. 16, 1995 | (JP) | 7-208835 |
| Aug. 21, 1995 | (JP) | 7-212266 |

(51) Int. Cl.[7] .............. G03B 15/03; G03B 15/06; G03B 7/099

(52) U.S. Cl. .............. 396/157; 396/172; 396/174
(58) Field of Search .............. 396/157, 174, 396/155, 172, 269, 175

(56) References Cited

U.S. PATENT DOCUMENTS

| 4,305,647 A | * | 12/1981 | Ishida | 354/33 |
| 4,542,975 A | * | 9/1985 | Ishida et al. | 354/416 |
| 4,657,367 A | * | 4/1987 | Kataoka | 354/415 |
| 4,811,043 A | * | 3/1989 | Ishimura et al. | 354/412 |
| 5,113,216 A | * | 5/1992 | Murata | 354/421 |
| 5,576,798 A | * | 11/1996 | Takagi | 396/159 |
| 5,721,971 A | * | 2/1998 | Sasaki | 396/56 |
| 6,094,536 A | * | 7/2000 | Harada | 396/121 |

\* cited by examiner

Primary Examiner—Christopher E. Mahoney
(74) Attorney, Agent, or Firm—Robin, Blecker & Daley

(57) ABSTRACT

The present invention relates to a camera system which is arranged to find the amount of emission of a main emission on the basis of a measured light value obtained during a preliminary emission, and perform control of the main emission. More specifically, the present invention provides a camera system which is arranged to inhibit processing, such as abnormal-reflection correction, during execution of a specific kind of photography, such as bounce flash photography, perform control processing suited to the specific kind of photography, and execute correct amount-of-light control.

5 Claims, 47 Drawing Sheets

FP EMISSION ENABLE FLAG

| NAME OF FLAG | 0 | 1 |
|---|---|---|
| FP_ON | DISABLED | ENABLED |

FIG.45

| | W(i) | | | | | |
|---|---|---|---|---|---|---|
| | WEIGHTED AVERAGE LIGHT MEASUREMENT | | | PARTIAL LIGHT MEASUREMENT | | |
| i | P0 | P1 | P2 | P0 | P1 | P2 |
| 0 | 7 | 3 | 1 | 1 | 0 | 0 |
| 1 | 3 | 7 | 3 | 0 | 1 | 0 |
| 2 | 1 | 3 | 7 | 0 | 0 | 1 |
| 3 | 3 | 1 | 1 | 0 | 0 | 0 |
| 4 | 1 | 1 | 3 | 0 | 0 | 0 |
| 5 | 1 | 1 | 1 | 0 | 0 | 0 |

← DISTANCE MEASURING POINT

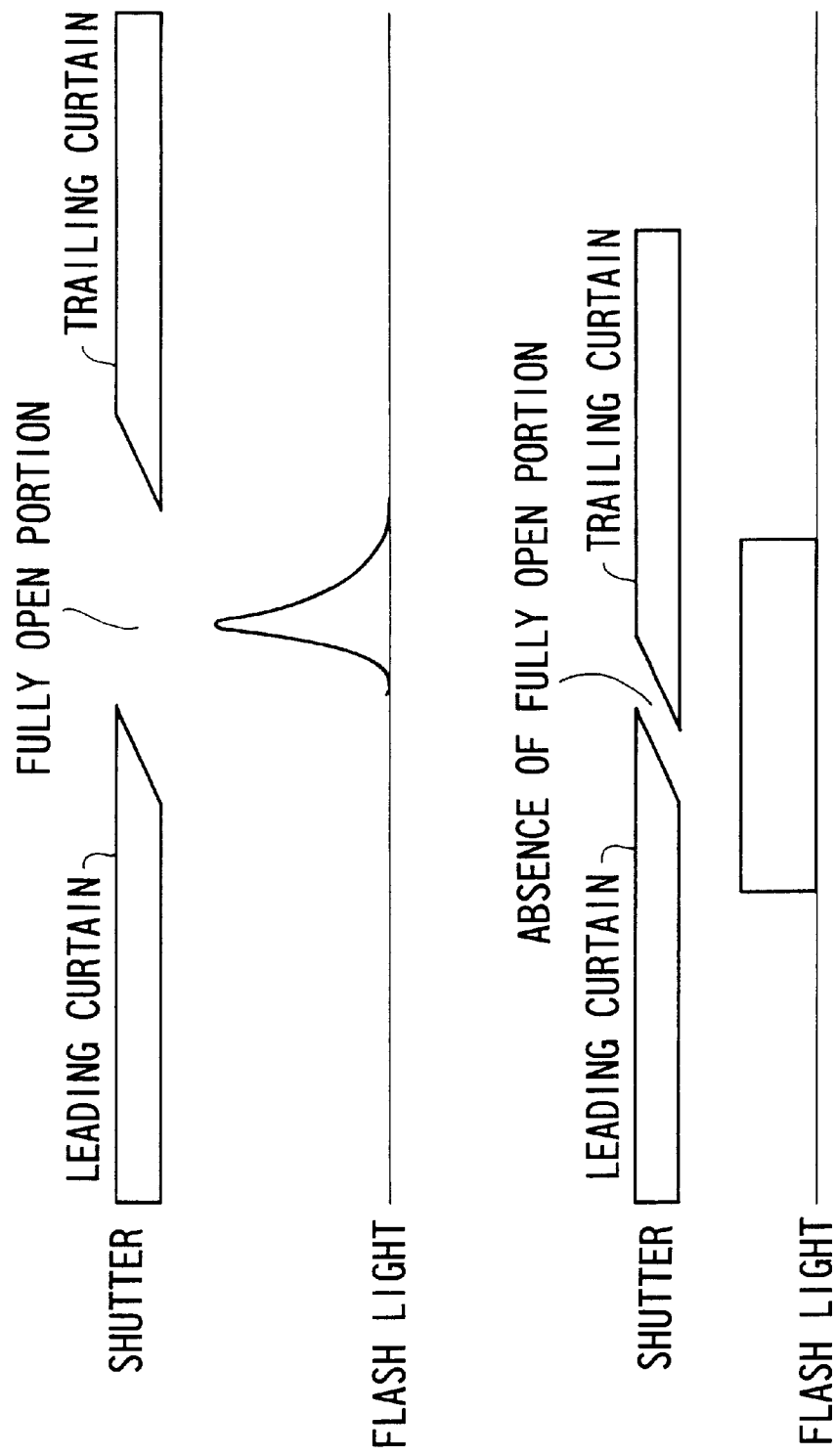

FLASH PHOTOGRAPHY SYSTEM WITH PRELIMINARY AND MAIN EMISSION

CROSS-REFERENCE TO RELATED APPLICATIONS

This application is a divisional of application Ser. No. 08/685,411, filed Jul. 24, 1996 now U.S. Pat. No. 6,067,422.

BACKGROUND OF THE INVENTION

1. Field of the Invention

The present invention relates to a camera system which causes a flash unit to perform a preliminary emission before a main emission, performs light measurement during the preliminary emission and computes a correct control value of the main emission on the basis of the result of the light measurement.

2. Description of the Related Art

Various camera systems have heretofore been proposed as a camera of the type which is capable of adjusting the amount of emission pointed at a subject so that correct exposure is automatically achieved. A system which is arranged to measure the subject-reflected light of the light emitted from a flash unit and obtain the amount of correct emission has been widely used because of its highly precise light measurement performance. One example of such system is a TTL flash control system arranged to find the amount of correct emission by measuring the film-surface-reflected light of light which reaches a film surface during exposure, and another example is a system arranged to perform a preliminary emission pointed at a subject and control a main emission so that the amount of emission of the main emission is made equivalent to the relative amount of emission with respect to the amount of emission of the preliminary emission.

In general, during flash photography, the light emitted from a flash unit is directly projected onto a subject. However, bounce flash photography is also often carried out by projecting the light emitted from a flash unit to a ceiling or the like and illuminating a subject with diffused light reflected from the ceiling or the like.

FIGS. 46(a) and 46(b) schematically show different examples of flash photography. FIG. 46(a) shows normal flash photography, and FIG. 46(b) shows bounce flash photography. In the bounce flash photography, a subject can be indirectly illuminated, so that it can be photographed with soft light.

For the purpose of flash photography intended to emphasize an three-dimensional effect, a flash unit may be made to emit light toward a subject not from the same position as a camera body but from a position away from the camera body. In this case, the flash unit and the camera body cooperate with each other to perform photography while exchanging information with each other in a wired or wireless manner.

In addition, for the purpose of close-up photography (macrophotography) of a subject, a ring type of flash unit having an annular flash illumination surface capable of being disposed around the periphery of a lens may be used so that a small subject can be photographed on an enlarged scale in the state of being illuminated with the light emitted from the flash unit.

However, in the conventional camera systems, in many cases, the amount of emission in flash photography is controlled on the assumption that the reflectance of a subject is similar to that of a gray sheet having a 18% reflectance. This leads to the problem that the amount of emission is controlled so that a white or black subject is photographed as a gray subject. In addition, if a regular reflection object, such as glass, is present on an image plane, the luminance of the subject-reflected light of flash light becomes extremely high, so that the amount of emission is controlled to be reduced to an underexposure level which is greatly low relative to a correct exposure level.

Japanese Laid-Open Patent Application No. Hei 4-331935 has proposed a system which is arranged to cause a flash unit to perform a preliminary emission before exposure, cause a multiple divided light measuring sensor to measure subject-reflected light, select a particular light measuring area on the basis of information indicative of the amount of emission of the preliminary emission and subject distance information, and perform a computation for correcting the amount of emission of a main emission, by using the measured light value obtained from the selected light measuring area.

This system provides control based on normal flash photography which is carried out on the assumption that the distance from a camera to a subject is equal to the distance from a flash unit to the subject. As a result, in the case of the aforesaid bounce flash photography, the flash photography which is performed in such a way that a subject is illuminated with flash light from a position away from a camera, or the macrophotography, the control of the selection of a light measuring area based on the distance information and hence the computation of the amount of emission of the main emission becomes meaningless, so that the amount of emission may be incorrectly controlled.

In addition, this system has the disadvantage that even if a photographer intends to control the amount of emission of the flash unit so as to correctly expose a subject nearer to the camera than an in-focus subject or intends to take an underexposure photograph, as by intentionally placing a regular reflection object, such as glass, or other high reflection objects in an image plane, the system will perform a uniform correction of the amount of emission or change light measuring areas to be used for control of the main emission, thereby providing flash photography which does not reflect the intention of the photographer.

In the conventional camera systems, if a subject is darker than a background under backlight conditions, the intensity of a stationary light component becomes higher than that of flash light. As a result, if the area in the image plane of a backlit main subject is smaller than the area of a light measuring sensor, a correct measured light value cannot be obtained, so that when a photographer slightly changes a composition, the state of exposure greatly varies and so-called exposure unevenness occurs.

Japanese Laid-Open Patent Application No. Hei 6-250253 and others have proposed that a decision is made as to whether a subject is backlit and a control method is varied on the basis of the decision. However, since there is only a combination of backlight and non-backlight, exposure unevenness still occurs under photographic conditions similar to backlighting conditions.

Many of the recent single-lens reflex cameras or the like which use focal plane shutters have been designed so that a photographer can select a flat emission mode for keeping the emission intensity of flash light approximately constant (flat) during the period from the instant when a shutter leading curtain starts running until the instant when a shutter trailing curtain completes running. The difference between the flat emission and the flash emission whose emission intensity has a peak is shown in FIG. 47. Although the flash emission only allows flash photography to be performed in the case of a shutter time which causes a shutter to be fully opened, the flat emission allows flash photography to be performed even in the case of a high-speed shutter time which uses slit exposure.

Since the flat emission takes a longer emission time than the flash emission as shown in FIG. 47, the guide number of the flat emission is smaller than that of the flash emission. For this reason, if the distance to a main subject is far or a large aperture value is used in photography, the flat emission may provide an underexposure compared to the flash emission.

Photographers who can understand the meaning of the guide number will be able to predict occurrence of an underexposure. However, beginners or the like who frequently make use of an automatic exposure mode during photography and do not fully understand the meaning of the guide number will have difficulty in making such a prediction. Some of the beginners may have to check warning displays of their cameras after the completion of photography using the flat emission and newly perform photography using the flash emission, or may forget to check such warning displays and note an underexposure after the development of photographs.

In the conventional TTL flash control system, the luminance of a subject is measured indirectly and vaguely only at a particular location in the image plane by making use of the diffused light reflected by a film surface. This leads to the problem that if the size or the composition of the subject varies, exposure becomes instable and continuous photography (continuous shooting) becomes difficult to perform with the same exposure level.

The above-cited Japanese Laid-Open Patent Application No. Hei 4-331935 has proposed the technique of causing a flash unit to perform a preliminary emission before exposure, performing light measurement of the preliminary emission, and correcting TTL flash control at the time of a main emission. However, if the preliminary emission is performed with the diaphragm of a photographing lens stopped down for the purpose of viewing a depth of field or the like, it is impossible to perform accurate light measurement, so that accurate correction becomes impossible or a complicated computation becomes necessary.

In addition, after the preliminary emission, if the photographer is worried about an overexposure or the like and deviates the direction of the emission part of the flash unit from the subject, it is impossible to achieve correct correction by using the measured light value obtained during the preliminary emission without modification.

SUMMARY OF THE INVENTION

An object of the present invention is to provide a camera system or a flash unit which is capable of perform correct control of the amount of emission of a main emission according to the state or the kind of the flash unit or the operating state thereof.

To achieve the above object, in accordance with one aspect of the present invention, the flash unit is made to perform a preliminary emission before the main emission and the amount of emission of the main emission is computed according to the result of light measurement obtained during the preliminary emission, and whether the processing of correcting the computation is possible is determined according to the state or the kind of the flash unit or the operating state thereof.

In accordance with another aspect of the present invention, there is provided a camera system or a flash unit which is arranged to perform multiple divided light measurement during the preliminary emission, select a predetermined light measuring area from among the multiple divided light measuring areas according to the state or the kind of the flash unit or the operating state thereof, and perform correct control of the amount of emission of the main emission on the basis of the measured light value of the selected predetermined light measuring area.

In accordance with another aspect of the present invention, there is provided a flash control system which is arranged to perform a preliminary emission before a main emission during photography and which comprises light measuring means for measuring subject-reflected light during the preliminary emission, computing means for computing a correction value of the amount of emission of the main emission on the basis of measured light data according to a measured light value detected by the light measuring means, amount-of-light control means for controlling the amount of emission of the main emission according to a computation result of the computing means to make the amount of emission of the main emission equivalent to a predetermined amount, and control means for making the computation result of the computing means different according to the operation of a photographer. Accordingly, the flash control system is capable of inhibiting automatic correction in accordance with the operation of the photographer and faithfully reflecting the intention of the photographer.

In accordance with another aspect of the present invention, there is provided a flash control system which is arranged to perform a preliminary emission before a main emission during photography and which comprises multiple divided light measuring means for dividing an image plane into a plurality of areas and measuring subject-reflected lights of the plurality of areas during the preliminary emission, selecting means for selecting at least one area from among the plurality of areas, changing means for changing the selected area with another area on the basis of measured light data according to a measured light value detected by the multiple divided light measuring means, amount-of-emission control means for controlling the amount of emission of the main emission to make the amount of emission of the main emission equivalent to a predetermined amount, with respect to the aforesaid other area determined by the selecting means and the changing means, and operating means for making the result of area changing by the changing means different according to the operation of a photographer. Accordingly, the flash control system is capable of inhibiting the automatic change of the areas in accordance with the operation of the photographer and faithfully reflecting the intention of the photographer.

To solve the problem of backlight in the aforesaid preliminary-emission type of camera system, in accordance with another aspect of the present invention, there is provided a camera system which comprises preliminary emission means for performing a preliminary emission pointed at a subject, light measuring means for measuring a light reflected from a subject during the preliminary emission, and for measuring subject light while the preliminary emission is not being performed, measuring means for measuring the amount of emission of the preliminary emission during the preliminary emission, amount-of-main-emission computing means for computing the relative amount of emission of a main emission with respect to the amount of emission of the preliminary emission measured by the measuring means, backlight computing means for computing the backlighting condition of a main subject on the basis of a measured light value obtained from the light measuring means while the preliminary emission is not being performed, and correcting means for applying a correction to a control value of the amount of emission of the main emission computed by the amount-of-main-emission computing means according to the output of the backlight computing means.

Another object of the present invention is to provide a camera system or a flash unit which is arranged to perform a main emission in the form of a flat emission and which can perform, if a photographing mode which is frequently used by beginners is selected as the mode of a camera, not the flat emission but a normal flash emission so that even a beginner can take a photograph without causing an underexposure.

To achieve the above object, in accordance with another aspect of the present invention, if a measured light value is not greater than a predetermined value, the flat emission is inhibited to prevent occurrence of an underexposure.

In accordance with another aspect of the present invention, there is provided a camera system of the type which controls a main emission according to a measured light value obtained during a preliminary emission and sets a diaphragm to a fully open aperture (or an aperture value smaller than a predetermined value) during the preliminary emission so as to perform correct light measurement.

In accordance with another aspect of the present invention, there is provided a camera system or a flash unit which is arranged to perform a preliminary emission before a main emission and perform light measurement of the preliminary emission and which includes control means for executing, in each photographic cycle of continuous shooting, a main emission according to a measured light value obtained from a preliminary emission before a first photographic cycle, so that it is possible to realize continuous shooting capable of providing frames each having the same exposure level, by making the amount of emission of the main emission in each of a second photographic cycle et seqq. equal to the amount of emission of the main emission in the first photographic cycle.

In accordance with another aspect of the present invention, there is provided a camera system or a flash unit which is arranged to perform a preliminary emission before a main emission and perform light measurement of the preliminary emission and which includes detecting means for detecting whether a photographing condition has been changed and re-emission means for newly performing a preliminary emission if the detecting means performs a detecting operation before a main emission after the previous preliminary emission, so that if a photographic condition, such as the direction of the flash unit or a photographing mode of the camera system, is changed after a measured light value obtained from a first preliminary emission has been fixed, another preliminary emission is performed before a main emission to carry out accurate light measurement and correct main-emission control according to the changed photographic condition.

The above and other objects and aspects of the present invention will become apparent from the following detailed description of preferred embodiments of the present invention, taken in conjunction with the accompanying drawings.

BRIEF DESCRIPTION OF THE DRAWINGS

FIG. 45 is a table showing a light measuring method for the camera system shown in FIG. 42;

FIG. 47 is an explanatory view aiding in describing the normal flash photography and the bounce flash photography.

DETAILED DESCRIPTION OF THE PREFERRED EMBODIMENTS

Preferred embodiments of the present invention will be described below with reference to the accompanying drawings.

Figure 1:
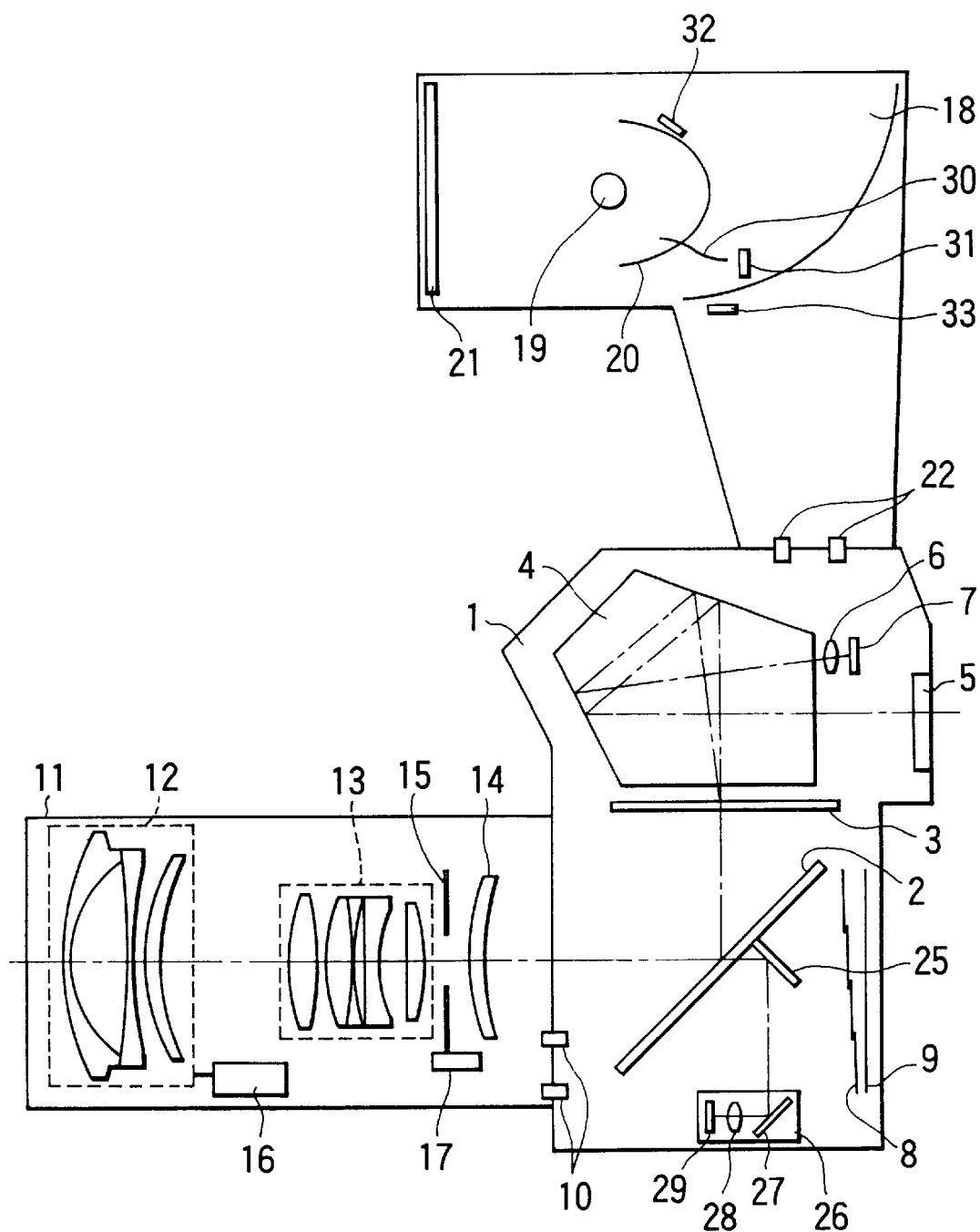
FIG. 1 is a diagrammatic cross-sectional view of a camera system according to one embodiment of the present invention.

FIG. 1 is a diagrammatic cross-sectional view mainly showing the optical arrangement of a flash photography camera system applied to a single-lens reflex camera according to the present invention.

The single-lens reflex camera shown in FIG. 1 includes a camera body 1 in which the elements required for photography are accommodated, such as optical parts, mechanical parts, electrical circuits and film. A main mirror 2 is arranged to be obliquely inserted into a photographic optical path or retracted therefrom according to whether the shown camera is placed in an observation-enabled state or a photography-enabled state. The main mirror 2 is a half-mirror which, when it is obliquely inserted in the photographic optical path, transmits approximately half of a light ray reflected from a subject and received by the main mirror 2 to a focus detecting optical system which will be described later.

A focusing screen 3 is disposed in a predetermined image forming plane of a photographing lens system (12 to 14), and a pentagonal prism 4 is provided for changing a viewfinder optical path. A viewfinder 5 is arranged so that a photographer can observe a photographic image plane, by observing the focusing screen 3 through the viewfinder 5. An image forming lens 6 and a multiple divided light measuring sensor 7 are provided for measuring a subject luminance in the photographic image plane which is being observed by the photographer. The image forming lens 6 conjugationally relates the focusing screen 3 and the multiple divided light measuring sensor 7 to each other via the reflected-light optical path formed in the pentagonal roof prism 4.

Figure 2:
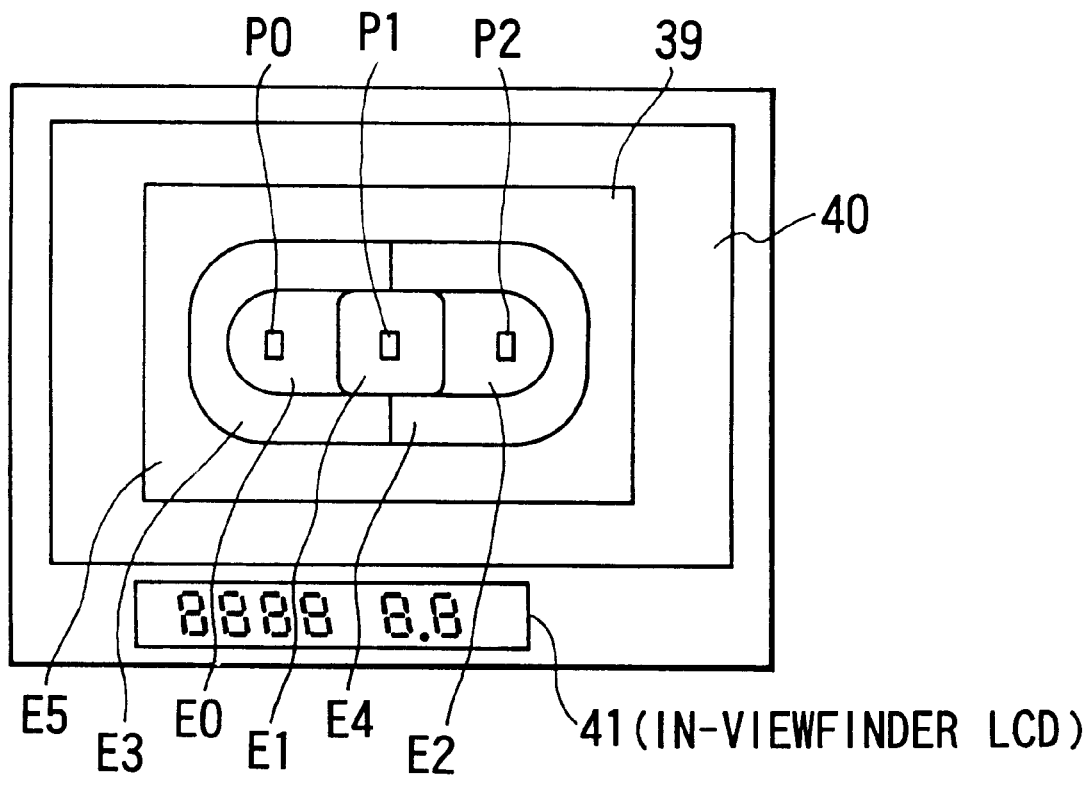
FIG. 2 is a schematic view showing the viewfinder of the camera system shown in FIG. 1.

The function of the multiple divided light measuring sensor 7 will be described below in detail. FIG. 2 is a schematic view showing divided light measuring areas which are provided on the photographic image plane. In FIG. 2, reference numeral 40 denotes the entire photographic image plane, and reference numeral 39 collectively denotes the divided light measuring areas on the photographic image plane which are to be used by the multiple divided light measuring sensor 7 during light measurement. The photographic image plane is divided into six light measuring areas E0, E1, E2, E3, E4 and E5. The multiple divided light measuring sensor 7 which is conjugationally related to the photographic image plane in this manner is capable of measuring luminance values of the respective divided light measuring areas on the photographic image plane and outputting the measured luminance values.

The camera body 1 shown in FIG. 1 also includes a shutter 8 and a sub-mirror 25 which bends downwardly the reflected light ray of the subject passing through the main mirror 2 and conducts the light ray to a focus detecting unit 26. A photosensitive material 9 is a silver-halide film or the like.

A secondary image forming mirror 27, a secondary image forming lens 28, a focus detecting line sensor 29 and the like are provided in the focus detecting unit 26. The secondary image forming mirror 27 and the secondary image forming lens 28 forms a focus detecting optical system, which forms a secondary image forming plane of a photographing optical system on the focus detecting line sensor 29. The focus detecting unit 26 serves as an automatic focus detecting device by detecting the state of focus of a subject in the photographic image plane by a known phase-difference detecting method and controlling a focus adjusting mechanism for the photographing lens system, through processing performed by an electrical circuit which will be described later. This automatic focus detecting device is arranged to detect the states of focus at predetermined three points in the photographic image plane. FIG. 2 shows the positions of the three points as distance measuring points P0, P1 and P2.

In FIG. 1, reference numeral 10 denotes a mount contact group which serves as a known interface between the camera body 1 and a lens barrel 11. The lens barrel 11 is secured to the camera body 1. The photographic lens system includes the lens groups 12 to 14. The first lens group 12 is arranged to move backward and forward along the optical axis of the photographing lens system and adjust the position of focus of an image to be photographed. The second lens group 13 is arranged to move backward and forward along the optical axis and vary the magnification of an image to be photographed, i.e., the focal length of the photographing lens system. The lens group 14 is a third lens group which is fixed. Reference numeral 15 denotes a photographing lens diaphragm.

The operation of a first lens group driving motor 16 is controlled in accordance with an automatic focus adjusting operation to cause the first lens group 12 to move backward and forward so that the position of focus can be automatically adjusted. The operation of a lens diaphragm driving motor 17 is controlled so that the photographing lens diaphragm 15 can be opened and closed.

An external flash unit 18 is secured to the camera body 1, and executes emission control in accordance with a signal supplied from the camera body 1. The flash unit 18 includes a xenon tube 19 which converts electric-current energy into emission energy, a reflector 20 and a Fresnel lens 21. The reflector 20 and the Fresnel lens 21 have the role of efficiently gathering light of the emission energy toward a subject. Reference numeral 22 denotes a known flash contact group which serves as an interface between the camera body 1 and the external flash unit 18.

The flash unit 18 also includes a glass fiber 30 which conducts light emitted by the xenon tube 19 to a monitoring sensor (PD1) 31. The sensor (PD1) 31 directly measures the amounts of emissions of a preliminary emission and a main emission of the flash unit 18, and is provided for control of the amount of emission of the main emission, which control constitutes a feature of the present invention. A sensor (PD2) 32 is provided for monitoring light emitted by the xenon tube 19. By restricting the emission current of the xenon tube 19 according to the output of the sensor (PD2) 32, the flash unit 18 can be made to perform a flat emission.

The flash unit 18 has the bounce flash function of varying the direction of an emission part independently of the optical axis of the photographing lens system. A switch 33 is provided for detecting whether the flash unit 18 is in a bounce state.

Although FIG. 1 shows only the optical parts selected from among all the elements required for realizing the present invention, it is a matter of course to need various other electrical circuit parts none of which is shown.

Figure 3:
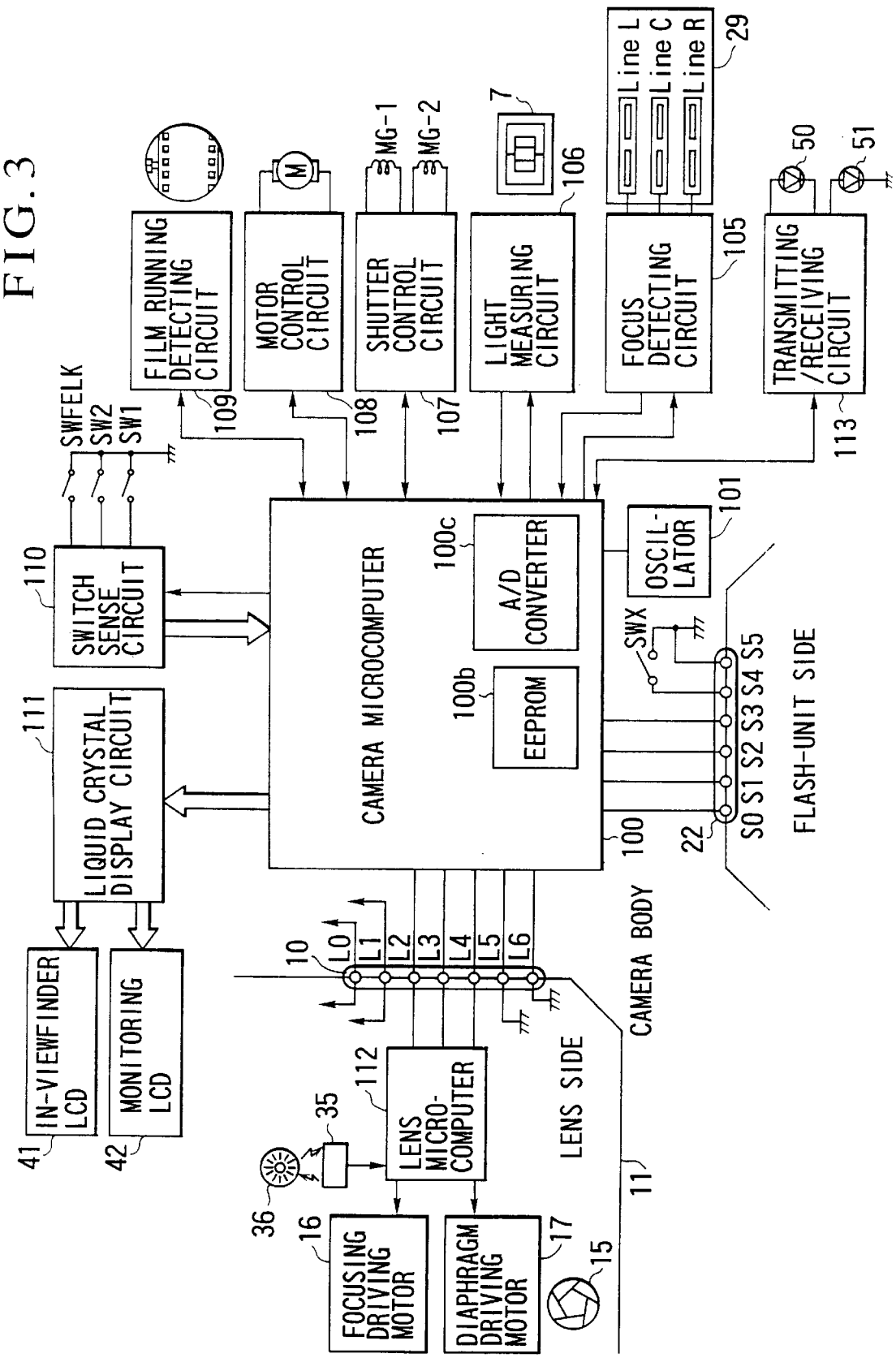
FIG. 3 is a block diagram showing the electrical circuits of a camera body and a lens barrel which constitute the camera system shown in FIG. 1.
Figure 4:
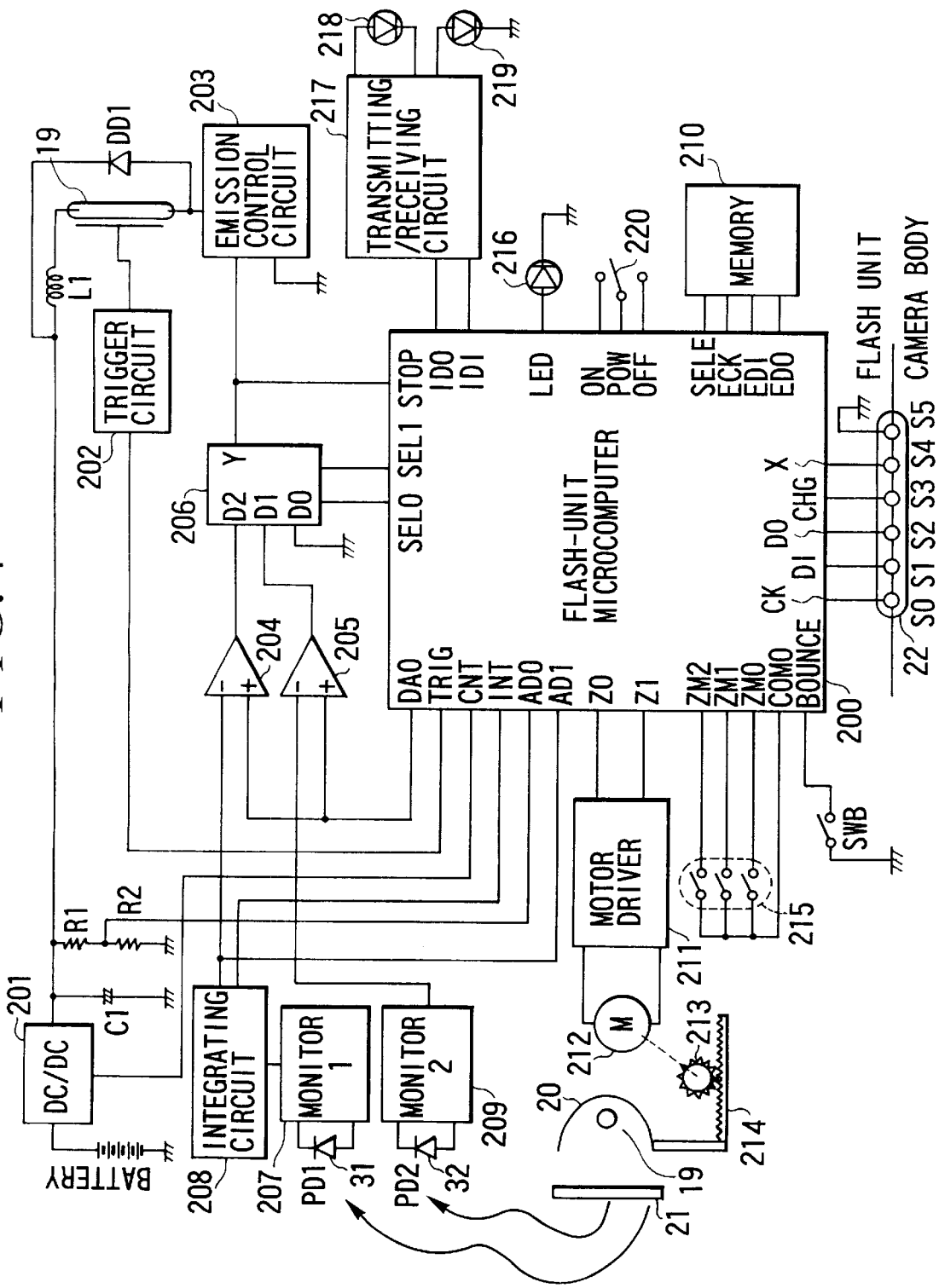
FIG. 4 is a block diagram showing the electrical circuit of a flash unit which constitutes the camera system shown in FIG. 1.

FIGS. 3 and 4 show block diagrams of electrical circuits of the present camera system. In FIGS. 3 and 4, identical reference numerals are used to denote constituent elements identical to those shown in FIG. 1. FIG. 3 shows a circuit block diagram of the camera body 1 and the lens barrel 11, and FIG. 4 shows a circuit block diagram of the flash unit 18.

A camera microcomputer 100 performs a required computation processing operation on the basis of a clock signal produced by an oscillator 101.

An EEPROM 100b stores a film count value and other photography information. An A/D converter 100c performs A/D conversion of analog signals supplied from a focus detecting circuit 105 and a light measuring circuit 106. The camera microcomputer 100 sets various states by performing signal processing of a digital value supplied from the A/D converter 100c.

The focus detecting circuit 105 and the light measuring circuit 106 as well as a shutter control circuit 107, a motor control circuit 108, a film running detecting circuit 109, a switch sense circuit 110 and an LCD driving circuit 111 are connected to the camera microcomputer 100.

The transmission of signals between the camera microcomputer 100 and a lens microcomputer 112 disposed in the lens barrel 11 is carried out via the mount contact group 10. If the flash unit 18 is attached directly to the camera body 1, the transmission of signals between the camera microcomputer 100 and a flash-unit microcomputer 200 disposed in the flash unit 18 is carried out via a flash contact group 22. The camera body 1 also includes a transmitting/receiving circuit 113, an infrared light receiving sensor 50 and a transmitting infrared LED 51. The camera microcomputer 100 can perform communications with the flash unit 18 (the flash-unit microcomputer 200) which is spatially remote from the camera body 1, via these elements 113, 50 and 51.

The focus detecting line sensor 29 is a known CCD line sensor composed of three line sensors Line-L, Line-C and Line-R which correspond to the above-described three distance measuring points P0, P1 and P2. The focus detecting circuit 105 performs storage control and reading control of the focus detecting line sensor 29 in accordance with a signal supplied from the camera microcomputer 100, and outputs pixel information read from the respective line sensors Line-L, Line-C and Line-R to the camera microcomputer 100. The camera microcomputer 100 performs A/D conversion of the pixel information and performs focus detection based on a known phase-difference detecting method. The camera microcomputer 100 performs an exchange of signals with the lens microcomputer 112 on the basis of the focus detection information, to adjust the focus of the photographing lens system.

The light measuring circuit 106 outputs to the camera microcomputer 100 the output from the multiple divided light measuring sensor 7 having the photographic image plane divided into the six light measuring areas E0, E1, E2, E3, E4 and E5 as described previously, i.e., the luminance signals of the respective light measuring areas in photographic image plane. The light measuring circuit 106 outputs luminance signals both when the flash unit 18 is in a steady state in which the flash unit 18 has not yet performed a preliminary emission of flash light toward a subject and when the flash unit 18 is in a preliminary emission state in which the flash unit 18 has performed the preliminary emission. The camera microcomputer 100 performs A/D conversion of the luminance signals, and performs a computation on an aperture value to adjust the amount of exposure for photography, a computation on a shutter speed, and a computation on the amount of emission for the main emission of the flash unit 18 during an exposure.

The shutter control circuit 107 causes a shutter leading curtain (MG-1) and a shutter trailing curtain (MG-2) to run to control an exposure operation, in accordance with a signal from the camera microcomputer 100.

The motor control circuit 108 controls a motor M in accordance with a signal from the camera microcomputer 100, to cause the motor M to move the main mirror 2 up and down, charge the shutter 8 and transport the film 9.

The film running detecting circuit 109 detects whether the film 9 has been wound by one frame during a film transport, and sends a signal indicative of the detection result to the camera microcomputer 100.

When a release button (not shown) is pressed to a first stroke position, a switch SW1 is turned on to start a light measuring operation and an automatic focusing (AF) operation. When the release button is pressed to a second stroke position, a switch SW2 is turned on to start an exposure operation. A switch SWFELK is interlocked with a push switch (not shown). If the photographer points the camera system at a subject to which to correctly adjust the amount of emission of the flash unit 18 before starting an exposure operation and depresses the push switch (the switch SWEFLK) with the subject located at a particular position on the photographic image plane within the viewfinder 5, the flash photography camera system performs a preliminary emission and memorizes the amount of correct emission of the flash unit 18 relative to the subject, and controls the amount of emission of the flash unit 18 during the main emission in accordance with the memorized amount of correct emission.

The switch sense circuit 110 senses signals supplied from the switches SW1, SW2 and SWFELK and other camera operating members (not shown) and sends them to the camera microcomputer 100.

When the shutter 8 is fully opened, a switch SWX is turned on to instruct the flash unit 18 of an emission timing at which to perform the main emission during an exposure operation.

The liquid crystal display circuit 111 controls an in-viewfinder LCD 41 which is specifically shown in FIG. 2 and a monitoring LCD 42 which is not shown in FIG. 2, in accordance with a signal from the camera microcomputer 100.

The arrangement of the lens barrel 11 will be described below. The camera body 1 and the lens barrel 11 are electrically connected to each other via the mount contact group 10. The mount contact group 10 includes a power supply contact L0 for the focusing (first lens group) driving motor 16 and the lens diaphragm driving motor 17 both of which are provided in the lens barrel 11, a power supply contact L1 for the lens microcomputer 112, a clock-signal contact L2 for communication of known serial data, a contact L3 for transmission of data from the camera body 1 to the lens barrel 11, a contact L4 for transmission of data from the lens barrel 11 to the camera body 1, a motor grounding contact L5 for a motor power supply, and a grounding contact L6 for a power supply of the lens microcomputer 112.

The lens microcomputer 112 is connected to the camera microcomputer 100 via the mount contact group 10, and operates the first lens group driving motor 16 and the lens diaphragm driving motor 17 to control a focus adjusting operation and the photographing lens diaphragm 15 of the lens barrel 11. The lens microcomputer 112 can obtain information indicative of the position of the first lens group 12 and performing focus adjustment of the lens barrel 11 or transmitting information indicative of the absolute position of a subject to the camera microcomputer 100, by counting the angle of rotation (the number of pulses) of a pulse plate 36 through an optical detector 35.

The arrangement of the flash unit 18 will be described below. The flash-unit microcomputer 200 is a circuit which performs control of the flash unit 18 in accordance with a signal from the camera microcomputer 100, and performs various kinds of control, such as control of the amount of emission, control of the emission intensity and the emission time of a flat emission, and control of the illuminating angle of an emission.

A DC/DC converter 201 boosts a battery voltage to several hundred volts and charges a main capacitor C1, in accordance with an instruction given by the flash-unit microcomputer 200.

Voltage dividing resistors R1 and R2 are provided so that the flash-unit microcomputer 200 can monitor the voltage of the main capacitor C1. The flash-unit microcomputer 200 performs A/D conversion of a divided voltage supplied from the resistors R1 and R2, through an A/D converter (not shown) built in the flash-unit microcomputer 200, and indirectly monitors the voltage of the main capacitor C1 to control the operation of the DC/DC converter 201 and control the voltage of the main capacitor C1 to set it to a predetermined voltage.

A trigger circuit 202 outputs a trigger signal in response to an instruction or the signal SWX received from the camera microcomputer 100 via the flash-unit microcomputer 200 during an emission of the flash unit 18, and applies a high voltage of several thousand volts to a trigger electrode of the xenon tube 19 to induce an electric discharge of the xenon tube 19. Thus, the charge energy stored in the main capacitor C1 is discharged via the xenon tube 19 as light energy.

An emission control circuit 203 employs a switching element such as an IGBT. When a trigger voltage for starting an emission is applied to the emission control circuit 203, the emission control circuit 203 becomes conductive and allows a current to flow through the xenon tube 19. When the emission control circuit 203 becomes nonconductive and shuts off the flow of a current through the xenon tube 19, the emission of the xenon tube 19 is made to stop.

A comparator 204 is employed for stopping an emission at the time of the flash emission which will be described later, while a comparator 205 is employed for controlling an emission intensity at the time of the flat emission which will be described later. A data selector 206 selects an input provided at any of terminals D0 to D2, in accordance with selecting signals SEL0 and SEL1 supplied from the flash-unit microcomputer 200, and outputs the selected input to a terminal Y.

A flash-emission controlling monitor circuit 207 logarithmically compresses and amplifies the output of the monitor sensor 31. An integrating circuit 208 integrates the output of the flash-emission controlling monitor circuit 207. A flat-emission controlling monitor circuit 209 amplifies the output of the monitor sensor 32. A memory 210 is a writable memory, such as an EEPROM or a flash ROM, for memorizing an emission time of the flat emission and the like.

The flash unit 18 also includes a known motor driving circuit 211, a flash zoom driving motor 212, a pinion gear 213, a rack gear 214, a flash zoom position detecting encoder 215 for detecting the position of the reflector 20 with respect to the Fresnel lens 21, and an LED 216 for indicating whether an emission is possible.

The flash unit 18 also includes a transmitting/receiving circuit 217, a receiving sensor 218 and a transmitting infrared LED 219.

A switch SWB is a bounce detecting switch for detecting whether the flash unit 18 is in a bounce state.

Each terminal of the flash-unit microcomputer 200 will be described below. The flash-unit microcomputer 200 includes an input terminal CK through which to input a synchronizing clock signal required for the flash-unit microcomputer 200 to perform serial communication with the camera body 1, an input terminal DI through which to input serial communication data, an output terminal Do through which to output serial communication data, an output terminal CHG through which to transmit an emission-possible or emission-impossible state of the flash unit 18 to the camera body 1 by means of an electric current, and an input terminal X through which to input an emission signal from the camera body 1.

The flash-unit microcomputer 200 also includes an output terminal ECK through which to output a communication clock signal required for the flash-unit microcomputer 200 to perform serial communication with a memory 210 externally connected to the flash-unit microcomputer 200, an input terminal EDI through which to input serial data from the memory 210, an output terminal EDO through which to output serial data to the memory 210, and an enable terminal SELE through which to output a signal which enables or disables communication with the memory 210. If a low-level signal is outputted through the enable terminal SELE, the communication with the memory 210 is set to an enabled state, whereas if a high-level is outputted through the enable terminal SELE, the communication with the memory 210 is set to a disabled state.

Although in this embodiment the memory 210 is provided outside the flash-unit microcomputer 200, the memory 210 may be built in the flash-unit microcomputer 200.

The flash-unit microcomputer 200 also includes an input terminal Pow through which to input a state of a power switch 220, an output terminal OFF through which to output a signal to turn off the flash unit 18, when connected to the power switch 220, and an output terminal ON through which to output a signal to turn on the flash unit 18, when connected to the power switch 220. If the power switch 220 is turned on, the input terminal POW is connected to the output terminal ON, and the impedance at the output terminal ON becomes high while the impedance at the output terminal OFF becomes low. If the power switch 220 is turned off, the input terminal POW is connected to the output terminal OFF, and the impedance at the output terminal ON becomes low while the impedance at the output terminal OFF becomes high.

The flash-unit microcomputer 200 also includes a display output terminal LED for providing a display indicating that an emission is possible, an input terminal IDI through which to input data when the flash-unit microcomputer 200 communicates with the camera body 1 by infrared light, and an output terminal IDO through which to output serial data when the flash-unit microcomputer 200 communicates with the camera body 1 by infrared light.

The flash-unit microcomputer 200 also includes an input terminal STOP through which to input an emission stop signal. If a low-level signal is inputted through the input terminal STOP, the flash-unit microcomputer 200 stops an emission of the flash unit 18. The flash-unit microcomputer 200 also includes output terminals SEL0 and SEL1 for instructing the data selector 206 to select a particular input from among the inputs D0 to D2. If low-level signals are outputted from the respective output terminals SEL0 and SEL1, the terminal D0 is connected to a terminal Y; if low- and high-level signals are outputted from the respective output terminals SEL0 and SEL1, the terminal D1 is connected to the terminal Y; and if high- and low-level signals are outputted from the respective output terminals SEL0 and SEL1, the terminal D2 is connected to the terminal Y.

A terminal DAO is the output terminal of a D/A converter built in the flash-unit microcomputer 200, and a comparison level for each of the comparators 204 and 205 is outputted from the output terminal DAO. A terminal TRIG is an output terminal through which to output a trigger signal which instructs the trigger circuit 202 to trigger an emission. A terminal CNT is an output terminal through which to output a signal for controlling the operation of the DC/DC converter 201 to start and stop charging the main capacitor C1. If a high-level signal is outputted from the output terminal CNT, the DC/DC converter 201 starts charging the main capacitor C1, and if a low-level signal is outputted from the output terminal CNT, the DC/DC converter 201 stops charging the main capacitor C1.

A terminal INT is an output terminal through which to output a signal for controlling the integration operation of the integrating circuit 208. If a high-level signal is outputted from the output terminal INT, the integrating circuit 208 is inhibited from performing an integration, whereas if a low-level signal is outputted from the output terminal INT, the integrating circuit 208 is enabled to perform an integration.

Terminals are A/D input terminals AD0 and AD1 through which to input voltages to be converted into digital data so that they can be processed in the flash-unit microcomputer 200. The input terminal AD0 is provided for monitoring the voltage of the main capacitor C1, while the input terminal AD1 is provided for monitoring the integral output voltage of the integrating circuit 208.

The flash-unit microcomputer 200 also includes control output terminals Z0 and Z1 through which to control the motor driving circuit 211 for driving the flash zoom driving motor 212, input terminals ZM0, ZM1 and ZM2 through which to input signals outputted from the flash zoom position detecting encoder 215, and a common terminal COMO through which to input a current equivalent to the ground level of the flash zoom position detecting encoder 215.

A terminal BOUNCE is an input terminal through which to input a signal (supplied from the switch SWB) indicating whether the flash unit 18 is in a bounce state.

Individual operations of the flash unit 18 as well as the operation of the circuit shown in FIG. 4 will be described below.

Detection of Whether Emission is Possible

The flash-unit microcomputer 200 performs A/D conversion of a divided voltage of the main capacitor C1 which has been inputted through the terminal AD0. If the flash-unit microcomputer 200 determines that the voltage of the main capacitor C1 is not less than a predetermined voltage at which an emission is possible, the flash-unit microcomputer 200 draws a predetermined current through the terminal CHG to inform the camera body 1 that an emission is possible, and sets a high-level signal at the terminal LED. Thus, the LED 216 emits light to provide a display indicating that the emission of the flash unit 18 is possible.

If the flash-unit microcomputer 200 determines that the voltage of the main capacitor C1 is less than the predetermined voltage, the flash-unit microcomputer 200 makes the terminal CHG inactive and shuts off the flow of the predetermined current to inform the camera body 1 that an emission is impossible, and sets a low-level signal at the terminal LED. Thus, the LED 216 is turned off to provide a display indicating that the emission of the flash unit 18 is impossible.

Setting of Illuminating Angle of Flash Unit

The flash-unit microcomputer 200 reads the current flash zoom position through the terminals ZM0 to ZM2, and outputs predetermined signals to the motor driving circuit 211 through the terminals Z0 and Z1 and drive the flash zoom driving motor 212 so that the flash zoom position can be set to a flash zoom position specified by the camera microcomputer 100 through a serial communication.

Preliminary Flat Emission

If the flash unit 18 is in the emission-possible state, the camera microcomputer 100 communicates the emission intensity and the emission time of a preliminary emission to the flash unit 18, and can instruct the flash unit 18 to execute the preliminary emission.

The flash-unit microcomputer 200 sets a predetermined voltage at the terminal DAO according to a predetermined emission intensity signal transmitted from the camera microcomputer 100, and then sets low- and high-level signals at the respective terminals SEL0 and SEL1 to select the terminal D1. At this time, since the xenon tube 19 has not yet emitted light, a substantial amount of photoelectric current does not flow in the monitor sensor 32 and the monitor circuit 209 does not output a signal to be applied to the inverting input terminal of the comparator 205, so that the output of the comparator 205 goes to its high level and the emission control circuit 203 is brought to a conductive state. When a trigger signal is outputted from the terminal TR1G, the trigger circuit 202 generates a high voltage to discharge the xenon tube 19, so that an emission (preliminary emission) of the flash unit 18 is started.

In the meantime, when a predetermined time passes after the trigger circuit 202 has generated the trigger signal, the flash-unit microcomputer 200 instructs the integrating circuit 208 to start an integration, so that the integrating circuit 208 starts to integrate the output of the monitor circuit 207, i.e., a logarithmically compressed photoelectric output of the monitor sensor 31 for integrating the amount of light. At the same time, the flash-unit microcomputer 200 activates a timer for counting a predetermined time.

When the preliminary emission is started, the amount of photoelectric current in the monitor sensor 32 for controlling the emission intensity of the flat emission increases and the output voltage of the flat-emission controlling monitor circuit 209 rises. When this output voltage becomes higher than a predetermined comparison voltage which is set at the non-inverting input terminal of the comparator 205, the output of the comparator 205 is inverted from high to low and the emission control circuit 203 shuts off the emission current of the xenon tube 19. Thus, the discharge loop of the xenon tube 19 is shut down, but since a circulating current loop is formed by a diode DD1 and a coil L1, the emission current gradually decreases after an overshoot due to a circuit delay has subsided.

Since the emission intensity falls with the decrease in the emission current, the photoelectric current of the monitor sensor 32 decreases and the output of the monitor circuit 209 falls. If this output falls below the predetermined comparison level, the output of the comparator 205 is again inverted from low to high and the emission control circuit 203 becomes conductive to form the discharge loop of the xenon tube 19, so that the emission current increases and the emission intensity also increases. In this manner, the output level of the comparator 205 is repeatedly inverted on the basis of the predetermined comparison voltage set at the terminal DAO to cause the emission intensity to repeatedly increase and decrease at intervals of a short period, so that the control of the flat emission of continuing an emission at a desired approximately constant emission intensity is effected.

The peak value of the flat emission can be controlled to become a desired value, by the processing of varying a digital value for setting a voltage at the terminal DAO, varying the comparison voltage to be applied to the non-inverting input terminal of the comparator 205, and varying the operating point of the photoelectric current of the monitor sensor (PD2) 32.

When the aforesaid emission time timer counts up and a predetermined preliminary emission time passes, the flash-unit microcomputer 200 sets low- and low-level signals at the respective terminals SEL1 and SEL2. Thus, the data selector 206 selects the input D0, i.e., the low-level input, and the output of the data selector 206 forcedly goes to its low level, so that the emission control circuit 203 shuts off the discharge loop of the xenon tube 19 and brings the preliminary emission to an end.

At the time of the end of the preliminary emission, the flash-unit microcomputer 200 reads through the input terminal AD1 the integral output of the integrating circuit 208 in which an integration of the preliminary emission has been performed, and performs A/D conversion of the read integral output and obtains an integral value, i.e., the amount of emission of the preliminary emission, as a digital value "INTp".

A guide number "Qpre" of the preliminary emission pointed at a particular subject is obtained from the charged voltage of the main capacitor C1 and the illuminating angle of the flash unit 18, as shown in Table 1, and the obtained data is sent to the camera microcomputer 100 by serial communication.

TABLE 1

(Preliminary Emission Guide Number)

| CHARGED VOLTAGE [V] | AMOUNT OF CORRECTION [EV] | LENS FOCAL LENGTH | AMOUNT OF CORRECTION [EV] |
|---|---|---|---|
| 250 | −0.80 | 24 mm | +0.5 |
| 260 | −0.68 | 28 mm | +0.4 |
| 270 | −0.57 | 35 mm | +0.3 |
| 280 | −0.47 | 50 mm | +0.2 |
| 290 | −0.37 | 70 mm | +0.1 |
| 300 | −0.28 | 105 mm | 0.0 |
| 310 | −0.18 | | |
| 320 | −0.09 | | |
| 330 | 0.00 | | |

Since the above data for the guide number "Qpre" are theoretical values, they may be corrected on the basis of a value which is obtained by actually measuring the integral value of a preliminary emission by means of the monitor circuit 207 and the integrating circuit 208.

Main Emission Control

The camera microcomputer 100 obtains a correct relative value "r" of the amount of emission of a main emission with respect to the amount of emission of a preliminary emission, from a luminance value of subject-reflected light or the like which is supplied from the multiple divided light measuring sensor 7 during the preliminary emission. The camera microcomputer 100 sends the correct relative value "r" to the flash-unit microcomputer 200.

The flash-unit microcomputer 200 obtains a correct integral value "INTm" by multiplying the correct relative value "r" sent from the camera microcomputer 100 by an integral value "INTp" of the measured light value of the preliminary emission, and sets the correct integral value "INTm" at the output terminal DAO.

Then, the flash-unit microcomputer 200 sets high- and low-level signals at the respective terminals SEL1 and SEL2 to select the terminal D2. At this time, since the integrating circuit 208 is placed in an operation-inhibited state, the integrating circuit 208 does not provide any output. Therefore, the output of the comparator 204 goes to a high level and the emission control circuit 203 becomes conductive.

Then, when the flash-unit microcomputer 200 outputs a trigger signal from the terminal TR1G, the xenon tube 19 starts to emit light. The flash-unit microcomputer 200 sets a low-level signal at the integration start terminal INT when an actual emission is started more than 10 μsec after trigger noise due to the application of the trigger signal has been settled. Thus, the integrating circuit 208 integrates the output from the monitor sensor 31 via the monitor circuit 207. When the integral output of the integrating circuit 208 reaches the predetermined voltage set at the terminal DAO, the comparator 204 is inverted and the conduction of the emission control circuit 203 is shut off via the data selector 206 to stop the emission of the xenon tube 19.

In the meantime, the flash-unit microcomputer 200 monitors the state of the input terminal STOP. When the input level at the input terminal STOP is inverted and the emission is stopped, the flash-unit microcomputer 200 sets low- and low-level signals at the terminals SEL1 and SEL2 to set a forcedly emission-inhibited state. In addition, the flash-unit microcomputer 200 inverts the level at the integration start terminal INT to bring the integration as well as the entire emission processing to an end. In the above-described manner, the main emission can be controlled to provide a correct amount of emission.

Figure 5:
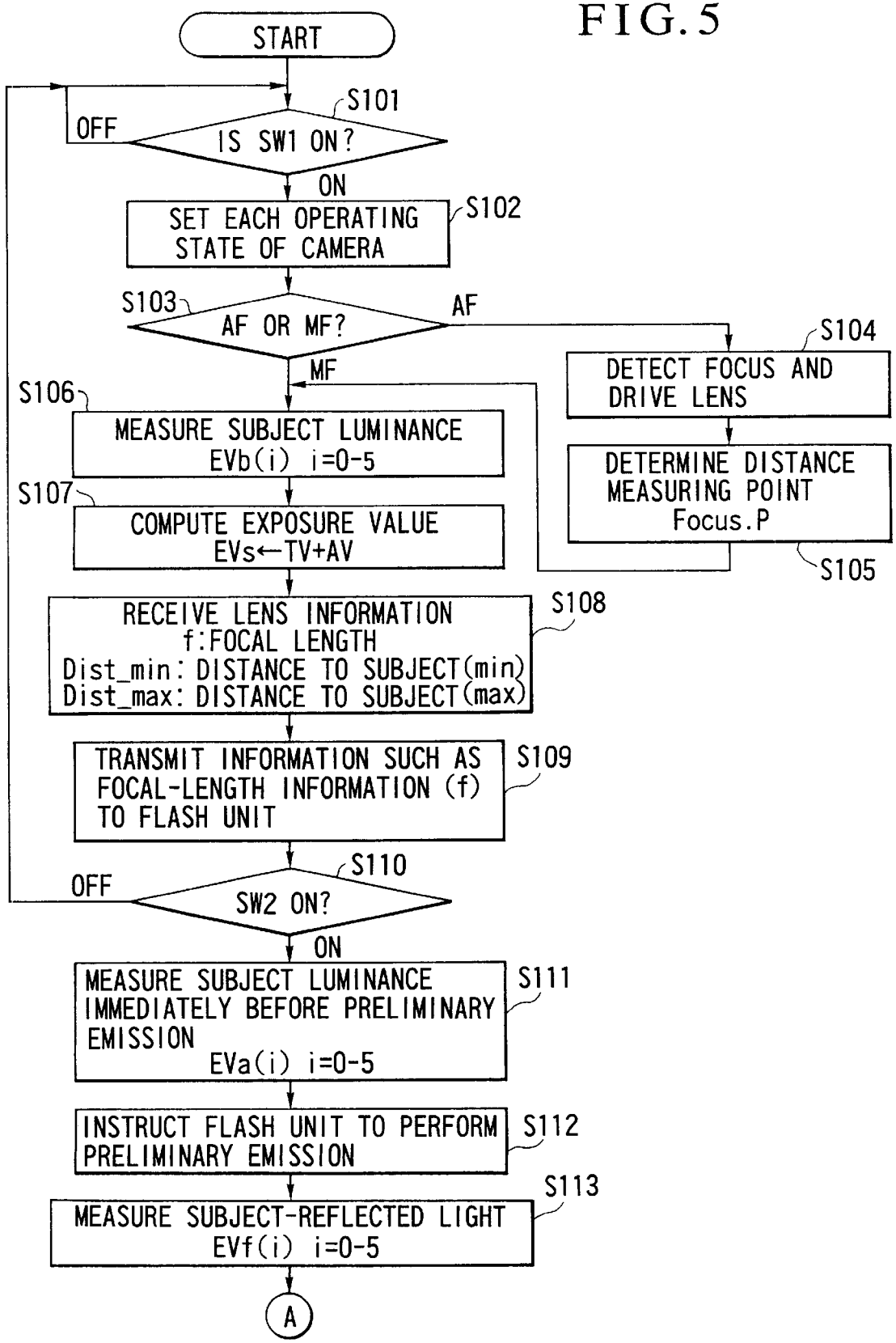
FIG. 5 is a flowchart of computation processing to be performed by the camera system shown in FIG. 1.
Figure 6:
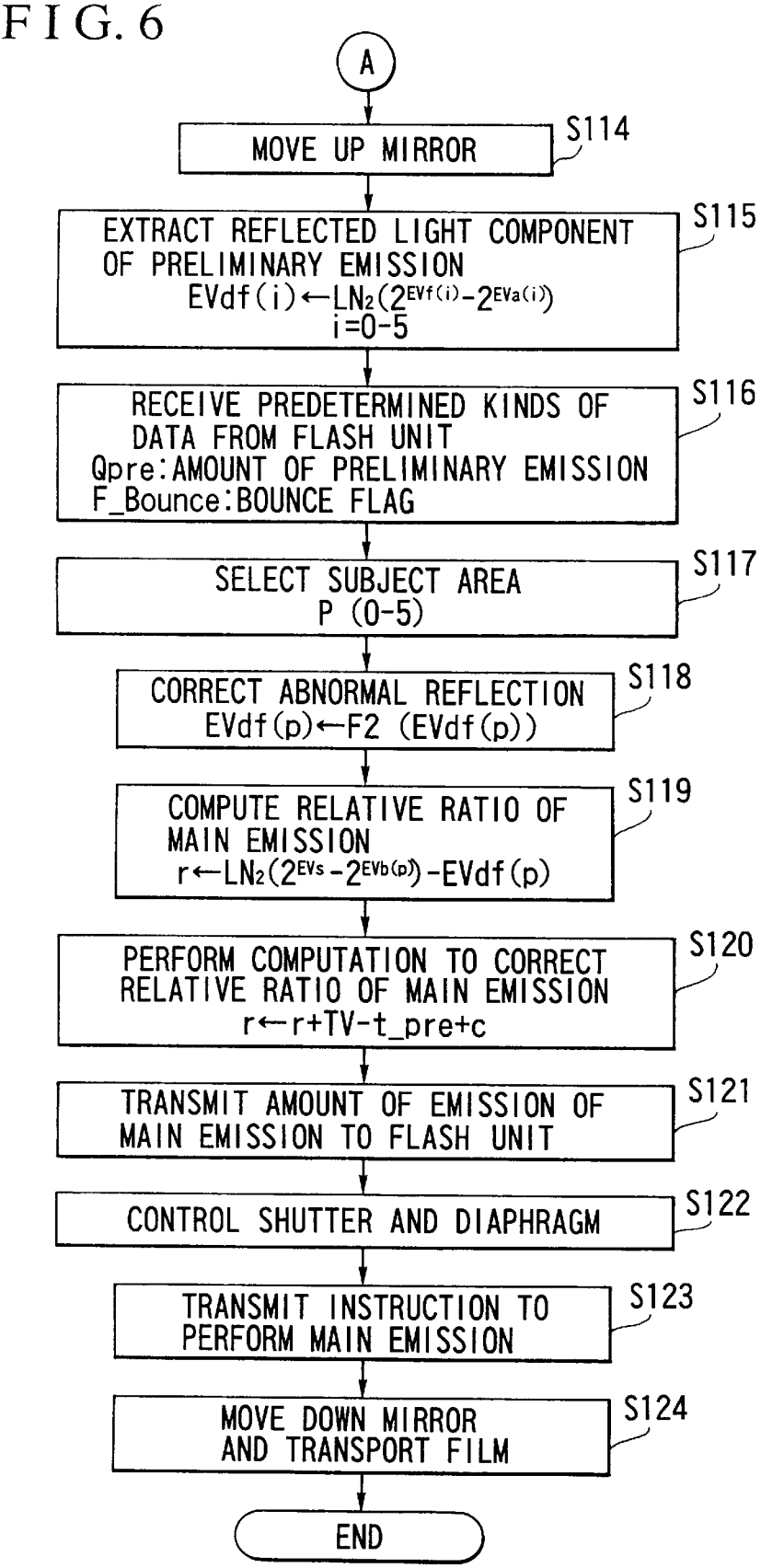
FIG. 6 is a flowchart of computation processing to be performed by the camera system shown in FIG. 1.

The operation flow of the present camera system will be described below with reference to FIGS. 5 to 8, and the following description is mainly focused on the operation of the camera microcomputer 100. The flows of FIGS. 5 and 6 are joined at the circled letter "A". When the operation of the camera system is started, the process proceeds to Step S101, in which the camera microcomputer 100 determines whether the switch SW1 is on. If the switch SW1 is off, Step S101 is repeated. If the switch SW1 is on, the process proceeds to Step S102.

In Step S102, the camera microcomputer 100 reads from the switch sense circuit 110 the states of individual operating switches (not shown) of the camera system, and sets various photographing modes, such as a method of determining a shutter speed and a method of determining an aperture value.

Then, in Step S103, the camera microcomputer 100 determines whether the photographing modes which have been set for the camera system in Step S102 contain a mode for executing an automatic focus detecting operation (AF mode) or another mode (MF mode). If the AF mode has been selected, the camera microcomputer 100 processes Steps S104 and S105 and then proceeds to Step S106. If the MF mode has been selected, the camera microcomputer 100 proceeds to Step S106.

In Step S104, the camera microcomputer 100 drives the focus detecting circuit 105 to perform a focus detecting operation using a known phase-difference detecting method. The camera microcomputer 100 further performs focus adjustment on the basis of the state of the detected focus by performing communication with the lens barrel 11. In this embodiment, three points for focus detection are provided on the image plane, as described previously with reference to FIG. 2. Which of the three points at which subjects are respectively present is to be focused (a distance measuring point) is determined according to the photographing modes which have been set for the camera system on the basis of the aforesaid read states of individual operating switches. For example, the distance measuring point may be arbitrarily determined by the photographer, or may be determined by finding the amounts of defocusing at the respective points and executing a known automatic selection algorithm based on the concept of nearest-point priority (the algorithm of selecting the nearest point from all the points on the basis of the respective amounts of defocusing and focusing a subject lying at the nearest point).

In Step S105, the distance measuring point determined in Step S104 is memorized as "Focus.P" in a RAM (random access memory) provided in the camera microcomputer 100.

In Step S106, the camera microcomputer 100 obtains the subject luminance values of the respective six areas provided in the image plane, through the light measuring circuit 106. The subject luminance values are memorized in the RAM as EVb(i) (i=0–5) (i indicates numbers which correspond to the respective areas E0 to E5, and (Ei) and EVb(i) indicates the luminance values of the respective areas E0 to E5 (Ei)).

Then, in Step S107, the camera microcomputer 100 determines an exposure value "EVs" from the subject luminance values EVb of the respective six areas by a known algorithm (for example, center-weighted average light measurement). Then, the camera microcomputer 100 determines the value of a shutter speed "TV" and the value of an aperture "AV" in accordance with the photographing modes which have been set for the camera system on the basis of the aforesaid read states of the individual operating switches. Incidentally, this EVs is a value determined according to TV and AV which are actually controlled during flash photography, and may not be determined according to EVb.

Then, in Step S108, the camera microcomputer 100 communicates data with the lens microcomputer 112 and receives information about the photographing lens system, such as:

focal length "f", minimum value of distance to subject "Dist_min", and maximum value of distance to subject "Dist_max".

The reason why two kinds of values of the distance to a subject, the minimum and maximum values, are prepared is that the resolution of distance information relative to the distance between the photographing lens system and the subject is low. For example, if the minimum and maximum values indicate that the distance ring of the photographing lens system is located within the range of 1 m to 1.5 m, the data of the minimum value is 1 m and the data of the maximum value is 1.5 mm. To obtain such data, a position encoder may be provided in the lens barrel 11.

Then, in Step S109, the camera microcomputer 100 transmits the focal length information "f" and the like to the flash unit 18. The flash-unit microcomputer 200 drives the motor driving circuit 211 on the basis of the focal length information "f" and controls the illuminating angle of the flash unit 18.

Then, in Step S110, the camera microcomputer 100 determines whether the switch SW2 is on, and if the switch SW2 is off, the camera microcomputer 100 repeats the operation of Steps S101 to S110, whereas if the switch SW2 is on, the process proceeds to a shutter release operation which starts with Step S111.

In Step S111, the camera microcomputer 100 obtains a subject luminance immediately before the preliminary emission through the light measuring circuit 166. The obtained subject luminance value is memorized in the RAM as Eva (i) (i=0–5).

In Step S112, the camera microcomputer 100 transmits to the flash unit 18 an instruction to execute the preliminary emission. The flash-unit microcomputer 200 performs the preliminary emission operation in the above-described manner in accordance with the instruction. Then, in Step S113, while the flat emission of the preliminary emission is being sustained, the camera microcomputer 100 obtains a subject luminance through the light measuring circuit 106. The obtained subject luminance value is memorized in the RAM as EVf (i) (i=0–5).

Then, in Step S114, the camera microcomputer 100 moves up the main mirror 2 and retracts the main mirror 2 from the photographic optical path together with the sub-mirror 25, prior to an exposure operation.

Then, in Step S115, the camera microcomputer 100 expands into antilogarithms the subject luminance value Evf obtained in Step S113 during the sustaining of the flat emission of the preliminary emission and the subject luminance number EVa obtained in Step S111 immediately before the preliminary emission, and then finds the difference between the antilogarithms, thereby extracting the luminance value EVdf(i) of only a preliminary-emission reflected light component:

$$EVdf(i) \leftarrow LN_2(2^{EVf(i)} - 2^{EVa(i)})(i=0-5)$$

Then, in Step S116, the camera microcomputer 100 receives the following kinds of data from the flash unit 18:
preliminary emission guide number "Qpre", and
bounce flag "F_Bounce".

The preliminary emission guide number "Qpre" is a value which is obtained from the focal length information "f" of the photographing lens system, the charged voltage of the main capacitor C1 and the like by the flash-unit microcomputer 200. The bounce flag "F_Bounce" is a flag which is sent by the flash-unit microcomputer 200 on the basis of the terminal BOUNCE.

Then, in Step S117, the camera microcomputer 100 determines which of the six divided light measuring areas the amount of flash light is to be correctly adjusted to, on the basis of a distance measuring point "Focus.P11, the focal length "f", the amount of emission of the preliminary emission "Qpre", the bounce flag "F_Bounce" and the like. The camera microcomputer 100 memorizes the selected light measuring area in the RAM as P (any one of P0–P5). Step S117 will be described later in more detail.

Then, in Step S118, the camera microcomputer 100 determines whether an appropriate subject is present in the selected area P, with reference to the focal length information "f", the subject distance information "Dist" and the like. If it is determined that the subject is an abnormal reflective subject, the camera microcomputer 100 corrects the amount of emission of the main emission. The amount of emission of the main emission is corrected by correcting a luminance value EVdf(p) of only the preliminary-emission reflected light component and causing a relative ratio "r" of the amount of emission of the main emission to the amount of emission of the preliminary emission to correspond to a corrected luminance value EVdf(p), the relative ratio "r" being computed in the next step S119. This part will be described later in more detail.

Then, in Step S119, the camera microcomputer 100 obtains the relative ratio of the amount of correct emission of the main emission to the amount of emission of the preliminary emission with respect to the subject present in the selected area "P", from the exposure value "EVs" and the subject luminance "EVb" and the luminance value EVdf(p) of only the preliminary-emission reflected light component, by using the following expression:

$$r \leftarrow LN_2(2^{EVs} - 2^{EVb(p)}) - EVdf(p)$$

The reason why the camera microcomputer 100 obtains, in this step, the difference between the antilogarithms into which the exposure value "Evs" and the subject luminance "EVb" have been expanded (the amount of underexposure due to external light) is that the flash unit 18 needs to be controlled so that when a subject is illuminated with flash light, the subject can be correctly exposed to both external light and the flash light. In other words, the camera microcomputer 100 finds how many times (r times) as intensive as the preliminary flat emission the main emission needs to be made in order to compensate for the amount of underexposure due to the external light by using the luminance EVdf(p) due to the preliminary flat emission.

Then, in Step S120, the camera microcomputer 100 corrects the relative ratio "r", as expressed by the following expression, by using the shutter speed "TV", an emission time "t_pre" of the preliminary emission and a correction coefficient "c" which is set, as by the photographer, and computes a new relative ratio "r":

$$r \leftarrow r + TV - t\_pre + c$$

where each variable is a compression variable.

The reason why the camera microcomputer 100 corrects the relative ratio "r" by using the shutter speed "TV" and the emission time "t_pre" of the preliminary emission is that it is necessary to correctly compare, within the flash unit 18, the measured light integral value "INTp" of the amount of emission of the preliminary emission and the measured light integral value "INTm" of the main emission.

Then, in Step S121, the camera microcomputer 100 transmits to the flash unit 18 the relative ratio "r" of the amount of emission required to determine the amount of emission of the main emission. Then, in Step S122, the camera microcomputer 100 gives the lens microcomputer 112 an instruction to find an aperture value "AV" based on the determined exposure value "EVs", and causes the shutter control circuit 107 to control the shutter 8 so that the determined shutter speed "TV" is achieved.

Then, when the switch SWX is turned on in synchronism with the timing at which the shutter 8 is fully opened (Step S123), the signal SWX is transmitted to the flash-unit microcomputer 200 as an instruction to execute the main emission. The flash-unit microcomputer 200 performs main-emission control so that a correct amount of emission can be achieved, on the basis of the relative ratio "r" sent from the camera body 1.

When one exposure cycle is completed in the above-described manner, the process proceeds to Step S124, in which the camera microcomputer 100 moves down the main mirror 2 and the like which have been retracted from the photographing optical path, thereby again obliquely inserting the main mirror 2 and the like into the photographing optical path. The camera microcomputer 100 winds the film 9 by one frame, by means of the motor control circuit 108 and the film running detecting circuit 109.

The subject-area selecting routine executed in the aforementioned step S117 will be described below with reference to FIG. 7. First of all, in Step S201, the camera microcomputer 100 determines whether the camera system is in the AF mode or the MF mode. If the AF mode has been selected, the process proceeds to Step S205, whereas if the MF mode has been selected, the process proceeds to Steps S202 to S204.

In Step S202, the camera microcomputer 100 determines whether the value of the bounce flag "F_Bounce" sent from the flash unit 18 in Step S116 is "1" or "0". If the value is "1", the camera microcomputer 100 determines that the flash unit 18 is in the bounce state, and proceeds to Step S211 without executing Steps S203 and S204 and selects a subject area to which to correctly adjust the amount of emission, without taking account of the focal length information "f". Specifically, if the flash unit 18 is in the bounce state, this indicates that the preliminary emission does not directly reach a subject, so that neither of the decisions of Steps S203 and S204 can be executed. For this reason, in Step S211, the light measuring area "Focus.P" which contains a distance measuring point is selected as an area to be used for computing the amount of correct emission of the main emission, and the camera microcomputer 100 brings this routine to an end.

If the value of the bounce flag "F_Bounce" is "0", the process proceeds to Steps S203 and S204, in which the camera microcomputer 100 selects a light measuring area in the following sequence while taking account of the focal length information "f".

In Step S203, the camera microcomputer 100 obtains the preliminary-emission reflected light component "EVdf" at a most distant position beyond which a subject such as a person becomes excessively small with respect to one light measuring area, from the focal length information "f", the amount of emission of the preliminary emission "Qpre" and a predetermined coefficient "c1", and sets the obtained reflected light component as "level.1".

Figure 10A:
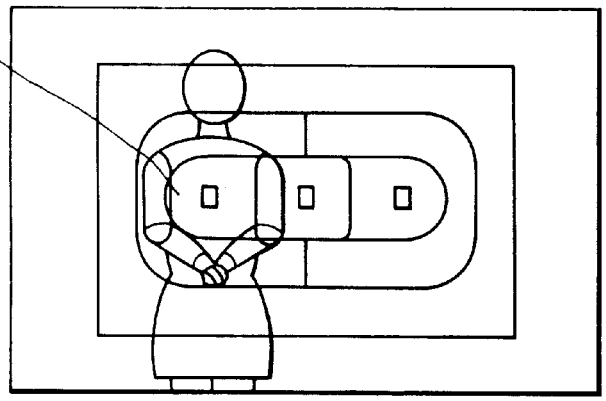
FIGS. 10(a) and 10(b) are schematic views showing different images displayed in the viewfinder of the camera system shown in FIG. 1.

This step will be described below with reference to FIGS. 10(*a*) and 10(*b*). If a person is large with respect to one light measuring area as shown in FIG. 10(*a*), the preliminary-emission reflected light component "EVdf" can be accurately measured through that area. However, if a person is small with respect to one light measuring area as shown in FIG. 10(*b*), part of the light of the preliminary emission passes the person and all the light does not return to the light measuring area, so that the value of the preliminary-emission reflected light component "EVdf" becomes lower than when a gray wall of standard reflectance is present at the position of the person. For this reason, in the case shown in FIG. 10(*b*), if the amount of emission of the main emission (relative ratio "r") is computed by using the preliminary-emission reflected light component "EVdf" on an "as-measured" basis, the amount of emission of the main emission becomes excessively large and overexposure occurs.

To cope with this problem, a threshold level beyond which overexposure occurs is set as "level.1". This "level.1" employs, for example, the value of the preliminary-emission reflected light component "EVdf" which is obtained when a gray wall of standard reflectance is present at a position which is approximately 3 mm away from a lens having a focal length of 50 mm.

In Step S204, the camera microcomputer 100 determines whether the preliminary-emission reflected light component "EVdf(Focus.P)" obtained at a light measuring point is not less than the aforesaid "level.1". If the preliminary-emission reflected light component "EVdf(Focus.P)" obtained at the light measuring point is not less than "level.1", the process proceeds to Step S211. If the preliminary-emission reflected light component "EVdf(Focus.P)" which is obtained at the light measuring point is not less than "level.1", this indicates that a subject such as a person is sufficiently large with respect to a light measuring area which contains the light measuring point, and that the preliminary-emission reflected light component "EVdf" has been accurately measured. Therefore, the light measuring area "Focus.P" which contains the light measuring point is selected as an area to be used for computing the amount of correct emission of the main emission, and the process brings this routine to an end.

On the other hand, if the preliminary-emission reflected light component "EVdf(Focus.P)" obtained at the light measuring point is less than "level.1", the process proceeds to Step S205.

If it is determined in Step S201 that the MF mode is selected and it is determined in Step S204 that the preliminary-emission reflected light component "EVdf(Focus.P)" is less than "level.1" and the light measuring area which contains the light measuring point cannot be selected as an area to be used for computing the amount of correct emission of the main emission, the process proceeds to Step S205. In Step S205, the camera microcomputer 100 selects an area "Close.P" in which a subject nearest to the camera system is present, from the central three light measuring areas E0, E1 and E2. This selection method is based on the concept that there is a highest possibility that a subject which is nearest to the camera system of all the subjects in the image plane is a main subject. Specifically, a light measuring area in which the preliminary-emission reflected light component "EVdf(i)" reaches a maximum is set to the area "Close.P".

Then, in Step S206, the camera microcomputer 100 determines whether the value of the bounce flag "F_Bounce" which has been sent from the flash unit 18 in Step S116 is "0" or "1". If the value is "1", the camera microcomputer 100 determines that the flash unit 18 is in the bounce state, and proceeds to Step S212 without executing Steps S207 and S208 and selects a light measuring area to which to correctly adjust the amount of emission of the main emission, without taking account of the focal length information "f". Specifically, if the flash unit 18 is in the bounce state, this indicates that the preliminary emission does not directly reach a subject, so that neither of the decisions of Steps S207 and S208 can be executed. For this reason, the light measuring area "Focus.P" which contains a closest-distance point is selected as an area to be used for computing the amount of correct emission of the main emission, and the camera microcomputer 100 brings this routine to an end.

On the other hand, if the value of the bounce flag "F_Bounce" is "0", the process proceeds to Steps S207 and S208 and the camera microcomputer 100 selects a light measuring area while taking account of the focal length information "f".

In Step S207, the camera microcomputer 100 obtains the preliminary-emission reflected light component "EVdf" at a most distant position beyond which a subject such as a person becomes excessively small with respect to one light measuring area, from the focal length information "f", the amount of emission of the preliminary emission "Qpre" and a predetermined coefficient "c2", and sets the obtained reflected light component as "level.2".

Although "level.2" is set in a manner similar to that used for finding "level.1" in Step S203, the value of "level.2" is set higher than that of "level.1" on the basis of the concept of weighting the light measuring point to a further extent. For this reason, even if a subject such as a person lies considerably near the camera system and a large amount of light of the preliminary emission does not pass the subject, the preliminary-emission reflected light component becomes less than that "level.2". This "level.2" employs, for example, the value of the preliminary-emission reflected light component "EVdf" which is obtained when a gray wall of standard reflectance is present at a position which is approximately 2.5 mm away from a lens having a focal length of 50 mm.

Then, in Step S208, the camera microcomputer 100 determines whether the preliminary-emission reflected light component "EVdf(Close.P)" obtained at the closest-distance point is not less than the aforesaid "level.2". If the reflected light component "EVdf(Close.P)" is not less than "level.2", this indicates that a subject such as a person is sufficiently large with respect to a light measuring area which contains the closest-distance point, and that the preliminary-emission reflected light component "EVdf" has been accurately measured. Therefore, the light measuring area "Close.P" which contains the closest-distance point is selected as an area to be used for computing the amount of correct emission of the main emission, and the process brings this routine to an end.

On the other hand, if the preliminary-emission reflected light component "EVdf(Close.P)" obtained at the closest-distance point is less than "level.2", the process proceeds to Step S209. If the preliminary-emission reflected light component "EVdf(Close.P)" obtained at the closest-distance point is less than "level.2", this indicates that a subject such as a person is present at a position considerably away from the camera system or in a peripheral portion of the image plane. Accordingly, in Step S209, the camera microcomputer 100 selects a light measuring area to be used for computing the amount of correct emission of the main emission, while taking account of not only the central three areas E0, E1 and E2 but also the peripheral areas E3 and E4.

Figure 9:
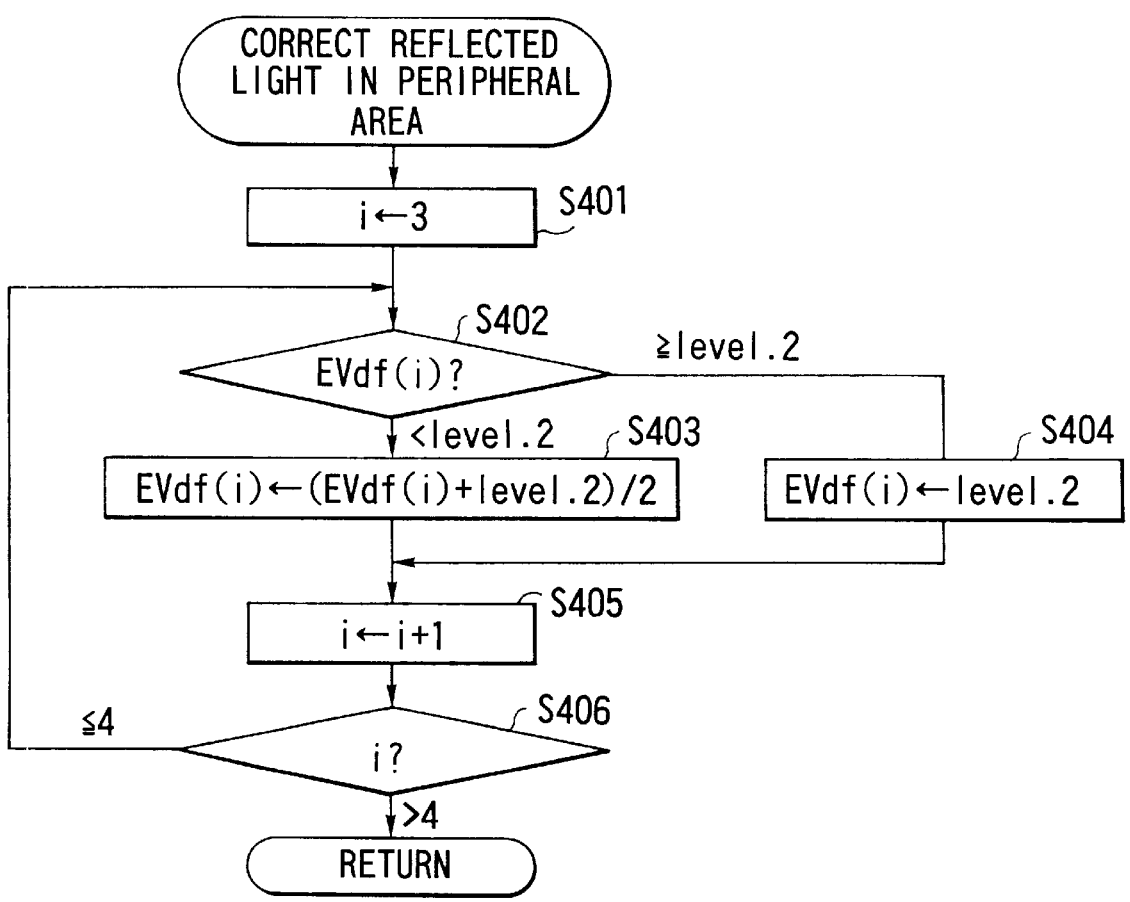
FIG. 9 is a flowchart of computation processing to be performed by the camera system shown in FIG. 1.

Step S209 will be described below with reference to FIG. 9. First, in Step S401, 3 is substituted for a variable i, and in Step S402, a preliminary-emission reflected light component "EVdf(3)" relative to the area E3 is compared with the aforesaid "level.2". If the preliminary-emission reflected light component "EVdf(3)" is less than the aforesaid "level.2", the process proceeds to Step S403, in which the preliminary-emission reflected light component "EVdf(i)" is corrected to obtain:

$$EVdf(i) \leftarrow (EVdf(i)+level.2)/2$$

Figure 10B:
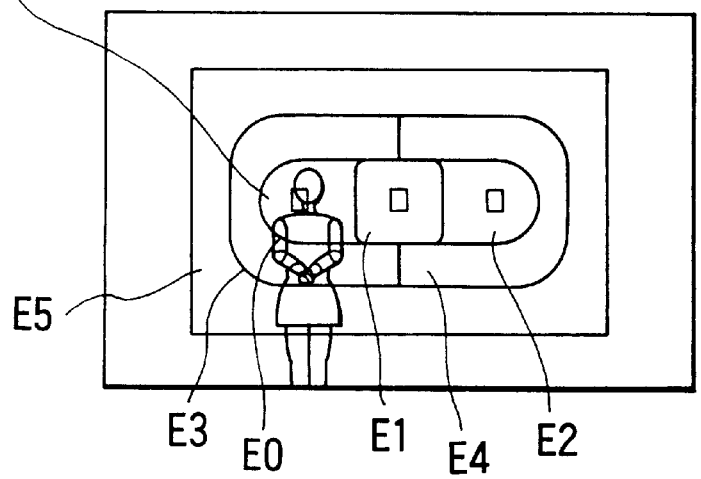

The processing of Step S403 is based on the concept that when the amount of emission of the main emission is to be computed on the basis the preliminary-emission reflected light component "EVdf" relative to the peripheral area E3 adjacent to the area E0 as shown in FIG. 10(b), the preliminary-emission reflected light component "EVdf" is corrected to become a large value, because the preliminary-emission reflected light component "EVdf" obtained when light measurement is performed on the area E3 with a subject considerably small with respect to the area E3 as shown in FIG. 10(b) is small compared to a gray wall of standard reflectance.

On the other hand, if the preliminary-emission reflected light component "EVdf(3)" is not less than the aforesaid "level.2", the process proceeds to Step S404, in which the preliminary-emission reflected light component "EVdf(i)" is corrected to obtain:

$$EVdf(i) \leftarrow level.2$$

The processing of Step S404 is based on the concept that since the preliminary-emission reflected light component "Evdf" is in many cases considerably large in a peripheral area such as the peripheral area E3 if an obstacle such as a table is placed in front of a main subject, the preliminary-emission reflected light component "EVdf" obtained by the light measurement is corrected to become a small value so that the main subject is prevented from being underexposed by the amount of exposure being adjusted to the obstacle.

The process proceeds to Step S403 or S404 to Step S405, in which the variable i is incremented by one. Since the current variable "i" is "3", the variable "i" is made "4". Then, in Step S406, the camera microcomputer 100 determines whether the variable "i" is not greater than "4". If the variable "i" is not greater than "4", Steps S402 to S405 are repeated. After that, the variable "i" is incremented to "5" and if it is determined in Step S406 that the variable "i" is greater than "4", the camera microcomputer 100 brings this routine to an end.

Figure 7:
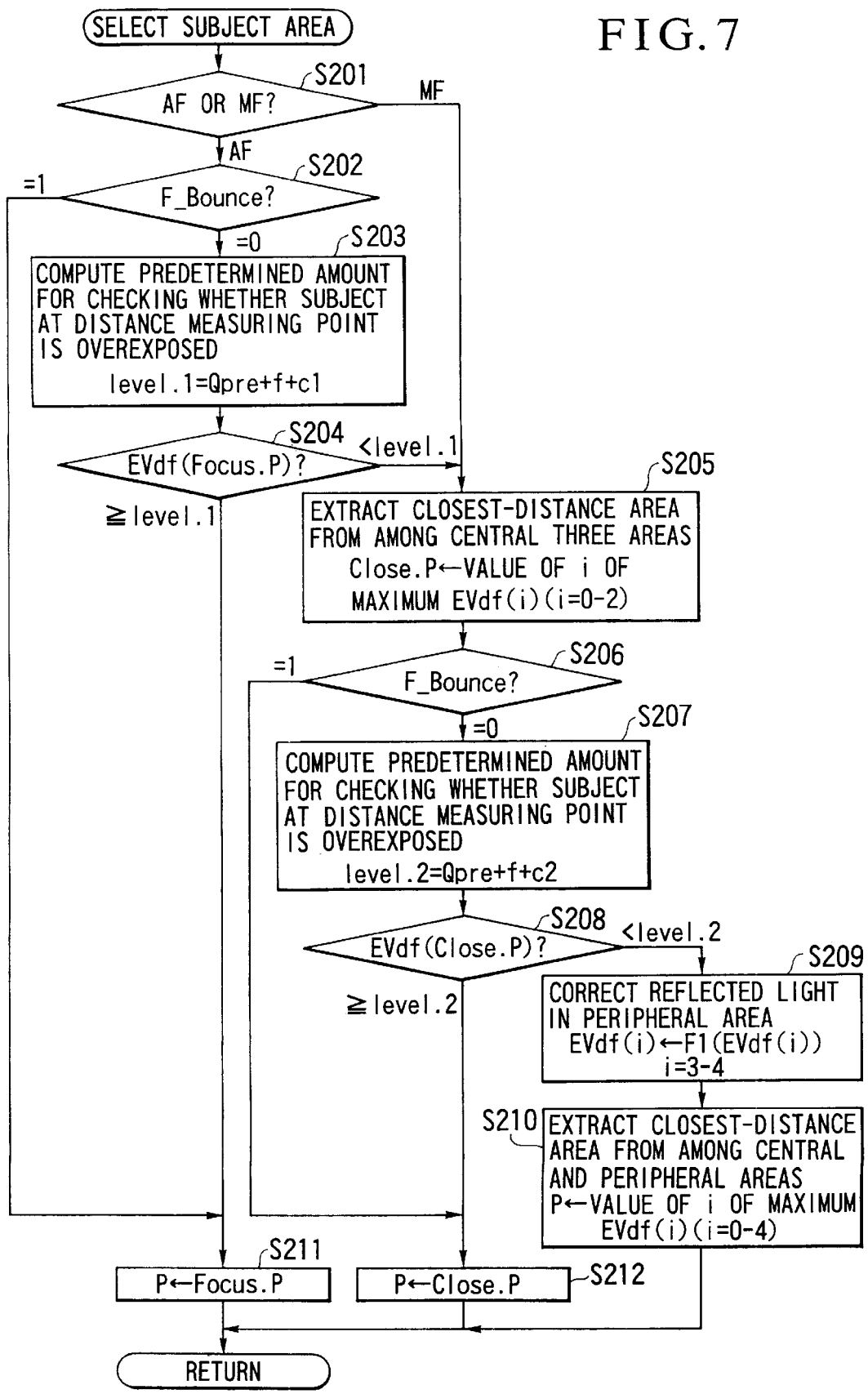
FIG. 7 is a flowchart of computation processing to be performed by the camera system shown in FIG. 1.

In Step S210 of FIG. 7, the camera microcomputer 100 selects a light measuring area having the maximum preliminary-emission reflected light component from the preliminary-emission reflected light component "EVdf (Close.P)" relative to the one of the central three light measuring areas which contains the closest-distance point and the corrected preliminary-emission reflected light component "EVdf" relative to the area E3 or E4, which has been calculated in Step S209 (S401–S406), and sets the selected light measuring area as an area to be used for computing the amount of correct emission of the main emission and brings this routine to an end.

The abnormal-reflection correcting routine of the aforementioned Step S118 will be described below with reference to FIG. 8. In Step S301, the camera microcomputer 100 determines whether the value of the bounce flag "F_Bounce" sent from the flash unit 18 in Step S116 is "0" or "1". If the value is "1", this indicates that the flash unit 18 is in the bounce state, and the camera microcomputer 100 immediately brings this routine to an end without executing correction of abnormal reflection.

On the other hand, if the value of the bounce flag "F_Bounce" is "0", the process proceeds to Step S302 and executes correction of abnormal reflection. In Step S302, the camera microcomputer 100 obtains the preliminary-emission reflected light component "EVdf" at a position at which a subject such as a person is substantially nearest to the camera system, from the focal length information "f", the amount of emission of the preliminary emission "Qpre" and a predetermined coefficient "c3", and sets the obtained reflected light component as "level.3".

This "level.3" employs, for example, the value of the preliminary-emission reflected light component "EVdf" which is obtained when a gray wall of standard reflectance is present at a position which is approximately 0.5 mm away from a lens having a focal length of 50 mm. This is based on the concept that if a lens having a focal length of 50 mm is used, a subject is not at all present within the shortest photographing distance (approximately 0.5 m) of the lens.

In Step S303, the camera microcomputer 100 compares the aforesaid "level.3" and the preliminary-emission reflected light component "EVdf(P)" relative to the light measuring area selected for computing the amount of correct emission of the main emission. If the preliminary-emission reflected light component "EVdf(P)" is not greater than "level.3", the camera microcomputer 100 brings this routine to an end.

On the other hand, if the preliminary-emission reflected light component "EVdf(P)" is greater than "level.3", the process proceeds to Step S304, in which the camera microcomputer 100 sets the preliminary-emission reflected light component "EVdf(P)" as follows:

$$EVdf(P) \leftarrow level.3$$

and brings this routine to an end. By correcting the preliminary-emission reflected light component "EVdf(P)" in this manner, the amount of emission of the main emission is corrected so that the amount of correction is effected at an underexposure level.

As described above, according to the present embodiment, a light measuring area to be used for correcting the amount of emission of the main emission or for computing the amount of emission of the main emission is selected according to whether the flash unit 18 is in the bounce state, so that it is possible to realize a camera system capable of providing a correct amount of exposure at all times.

Figure 8:
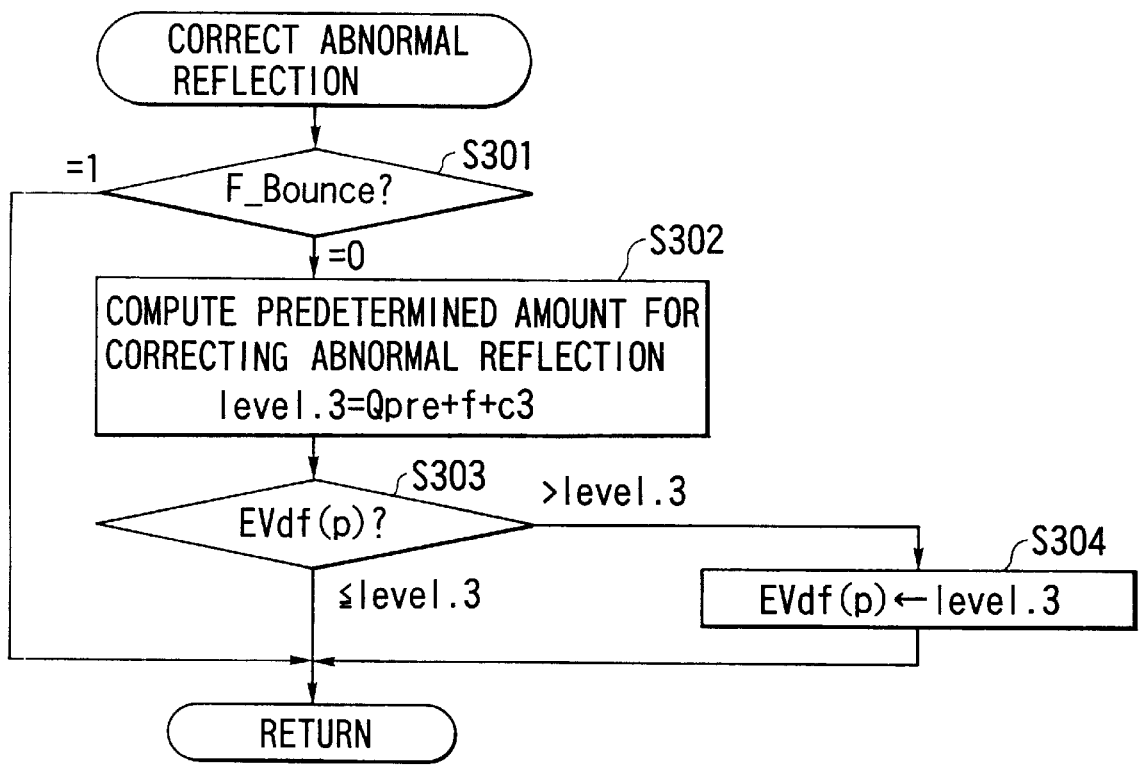
FIG. 8 is a flowchart of computation processing to be performed by the camera system shown in FIG. 1.
Figure 11:
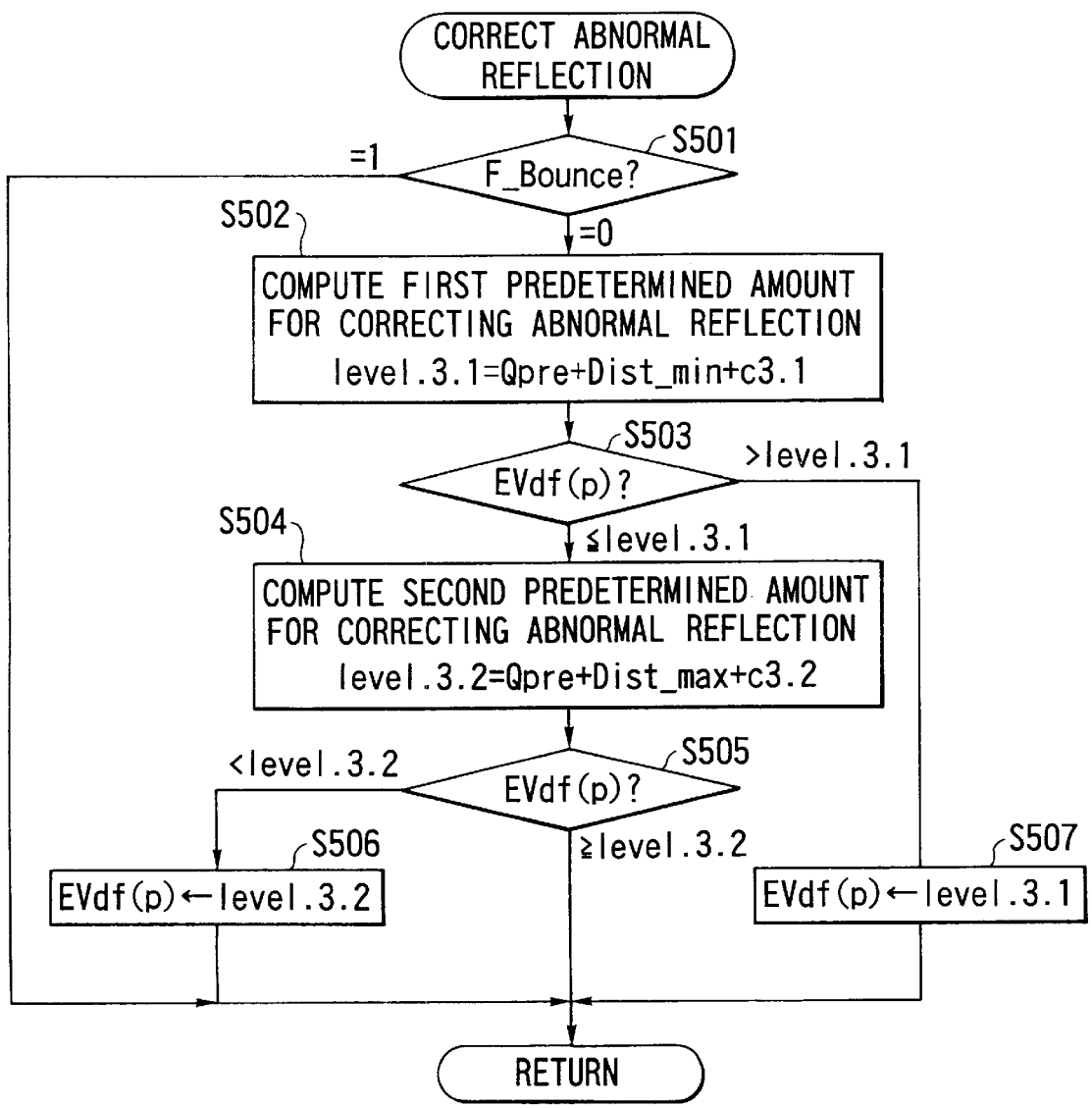
FIG. 11 is a flowchart of computation processing to be performed by the camera system shown in FIG. 1.

FIG. 11 shows another example of the abnormal-reflection correcting routine shown in FIG. 8. In the routine shown in FIG. 11, "level.3.1" and "level.3.2" are obtained by using the minimum value "Dist_min" and the maximum value "Dist_max" of the distance to a subject, instead of "level.3" obtained by using the focal length information "f" in the routine of FIG. 8.

First, in Step S501, the camera microcomputer 100 determines whether the value of the bounce flag "F_Bounce" which has been sent from the flash unit 18 in Step S116 is "0" or "1". If the value is "1", this indicates that the flash unit 18 is in the bounce state, so that the camera microcomputer 100 immediately brings this routine to an end without executing correction of abnormal reflection.

On the other hand, if the value of the bounce flag "F_Bounce" is "0", the process proceeds to Step S502 and executes correction of abnormal reflection.

In Step S502, the camera microcomputer 100 obtains the preliminary-emission reflected light component "EVdf" at a position at which a subject such as a person is substantially nearest to the camera system, from the minimum subject distance information "Dist_min" which has been sent from the lens barrel 11 in Step S108, the amount of emission of the preliminary emission "Qpre" and a predetermined coefficient "c3.1", and sets the obtained reflected light component as "level.3.1".

In Step S503, the camera microcomputer 100 compares the aforesaid "level.3.1" and the preliminary-emission reflected light component "EVdf(P)" relative to the light measuring area selected for computing the amount of correct emission of the main emission. If the preliminary-emission reflected light component "EVdf(P)" is not greater than "level.3.1", the process proceeds to Step S504. On the other hand, if the preliminary-emission reflected light component "EVdf(P)" is greater than "level.3.1", the process proceeds to Step S507, in which the camera microcomputer 100 sets the preliminary-emission reflected light component "EVdf (P)" as follows:

$$EVdf(P) \leftarrow level.3.1$$

and brings this routine to an end. In other words, by computing the amount of emission of the main emission by using the preliminary-emission reflected light component "EVdf(P)" corrected in this manner, the amount of emission of the main emission is corrected so that the main emission is effected at an underexposure level.

In Step S504, the camera microcomputer 100 obtains the preliminary-emission reflected light component "EVdf" at a position at which a subject such as a person is most distant from the camera system, from the maximum subject distance information "Dist_max" which has been sent from the lens barrel 11 in Step S108, the amount of emission of the preliminary emission "Qpre" and a predetermined coefficient "c3.2", and sets the obtained reflected light component as "level.3.2".

In Step S505, the camera microcomputer 100 compares the aforesaid "level.3.2" and the preliminary-emission reflected light component "EVdf(P)" relative to the light measuring area. selected for computing the amount of correct emission of the main emission. If the preliminary-emission reflected light component "EVdf(P)" is less than "level.3.2", the process proceeds to Step S506, in which the camera microcomputer 100 sets the preliminary-emission reflected light component "EVdf(P)" as follows:

$$EVdf(P) \leftarrow level.3.2$$

and brings this routine to an end. In other words, by computing the amount of emission of the main emission by using the preliminary-emission reflected light component "EVdf(P)" corrected in this manner, the amount of emission of the main emission is corrected so that the main emission is effected at an overexposure level.

On the other hand, if the preliminary-emission reflected light component "EVdf(P)" is not less than "level.3.2", the camera microcomputer 100 determines that the distance range represented by the maximum subject distance information "Dist_max", which has been sent from the lens barrel 11, and the value of the preliminary-emission reflected light component "EVdf(P)" correctly agree with each other and there is no abnormality. Then, the camera microcomputer 100 brings this routine to an end without executing correction of abnormal reflection.

In this manner, in the routine shown in FIG. 11, since the amount of emission of the main emission is corrected by using the maximum and minimum values of the distance from the lens barrel 11 to a subject, it is possible to more accurately correct the amount of emission of the main emission than when focal length information is used, so that the amount of emission of the main emission is prevented from being reduced to an underexposure level by abnormal reflection such as the regular reflection of glass. In addition, it is possible to photograph an abnormally black subject correctly as a not gray but black subject, so that it is possible to achieve a correct amount of exposure at all times.

Incidentally, although the above-described embodiment has the arrangement in which the camera system automatically detects focal length information and the like relative to the lens system, the camera system may be arranged so that the photographer can input such focal length information or the like through an operating member such as a button.

In addition, the present camera system may also be provided with means for allowing the photographer to input reflectance information relative to a subject into the camera system, and even if the amount of emission of the main emission is corrected on the basis of the input reflectance information, it is possible to obtain effects similar to the above-described ones.

Although the above-described embodiment is arranged to detect whether the flash unit 18 is in the bounce state and correct the amount of emission of the main emission according to the detection result, it is also possible to correct the amount of emission of the main emission in a manner similar to the above-described one not by detecting not whether the flash unit 18 is in the bounce state but by detecting whether the flash unit 18 is located at a position away from the camera body 1 or whether the flash unit 18 is a ring flash unit for macrophotography.

FIGS. 12 to 15 show an embodiment which is arranged to perform control of the amount of emission of the main emission by finally measuring film-surface-reflected light. The camera system shown in FIG. 12 in cross section is substantially identical to that shown in FIG. 1. Referring to only parts different from those shown in FIG. 1, reference numeral 23 denotes a light measuring lens for measuring light on a film surface, and reference numeral 24 denotes a light-on-film-surface measuring sensor. Similarly to the multiple divided light measuring sensor 7, the light-on-film-surface measuring sensor 24 is arranged to divide the image plane into a plurality of areas, perform light measurement for each of the divided areas, and output measured light information. The divided areas of the light-on-film-surface measuring sensor 24 correspond to the divided areas of the multiple divided light measuring sensor 7.

Figure 13:
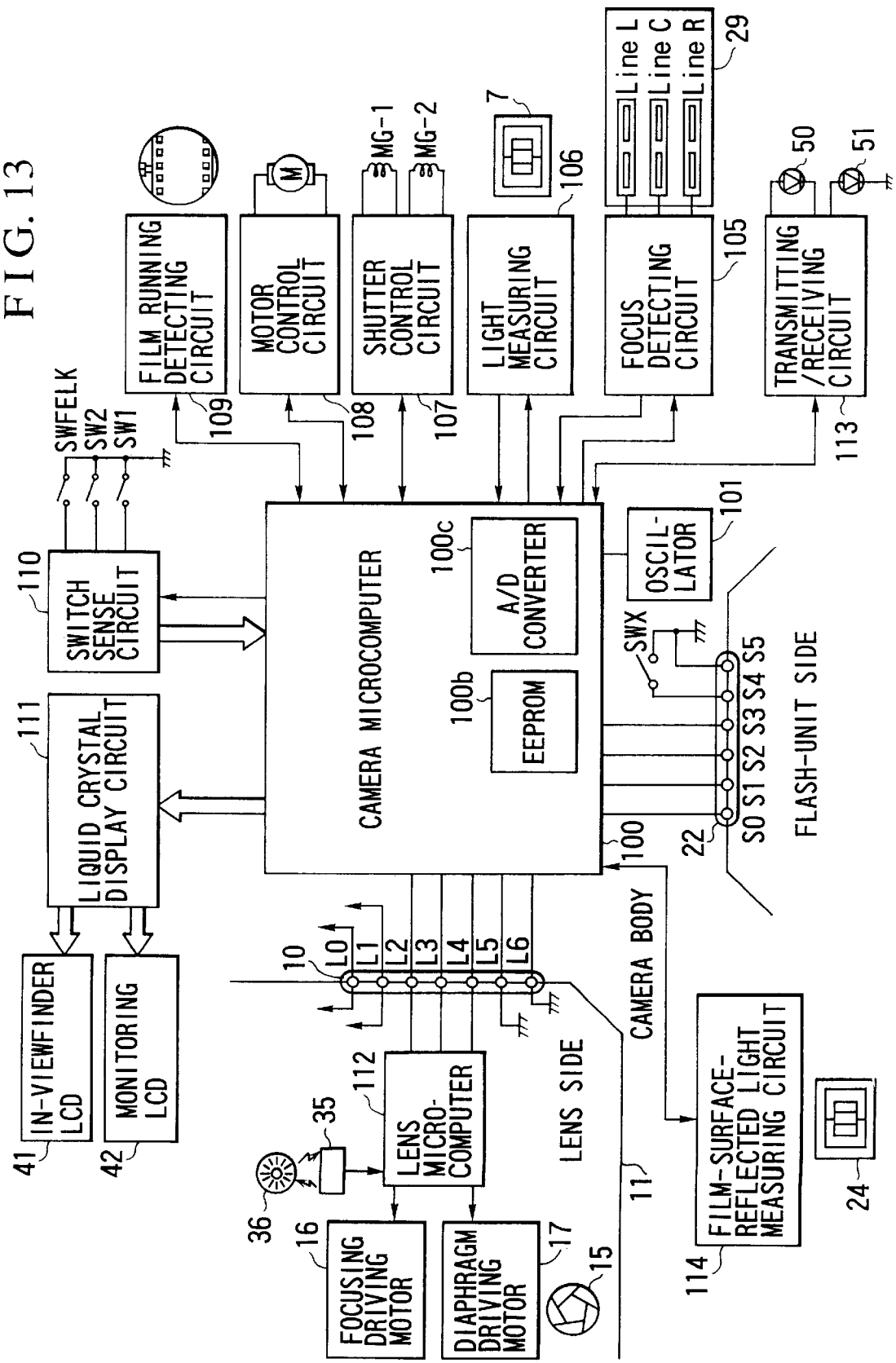
FIG. 13 is a block diagram showing the electrical circuits of a camera body and a lens barrel which constitute the camera system shown in FIG. 12.

FIG. 13 is a circuit block diagram similar to FIG. 3, showing the circuits of the camera body 1 and the lens barrel 11. The arrangement of FIG. 13 differs from that of FIG. 3 in that a light-on-film-surface measuring circuit 114 is provided for transmitting measured light information received from the light-on-film-surface measuring sensor 24 to the camera microcomputer 100.

Figure 14:
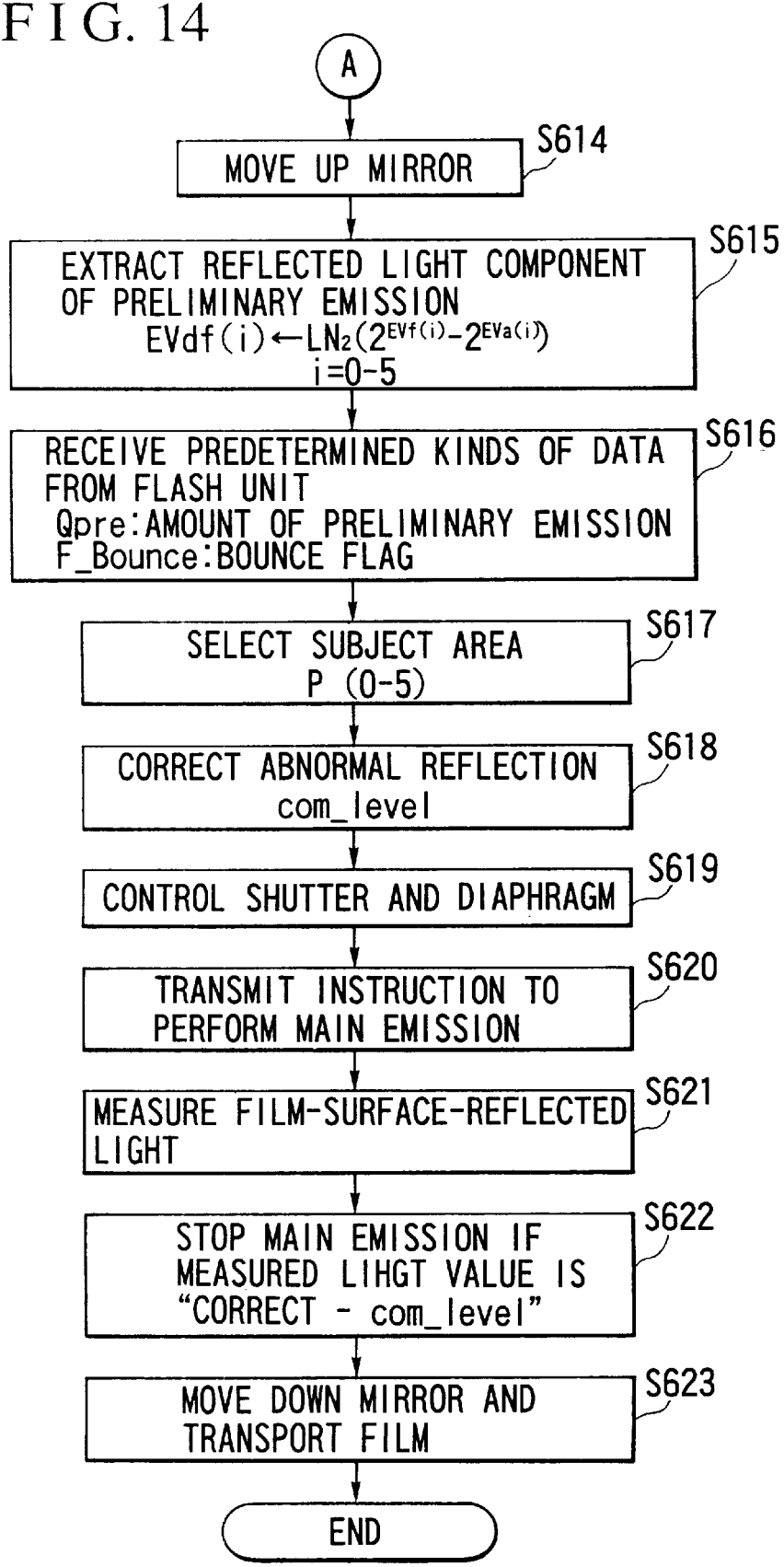
FIG. 14 is a flowchart of computation processing to be performed by the camera system shown in FIG. 12.
Figure 15:
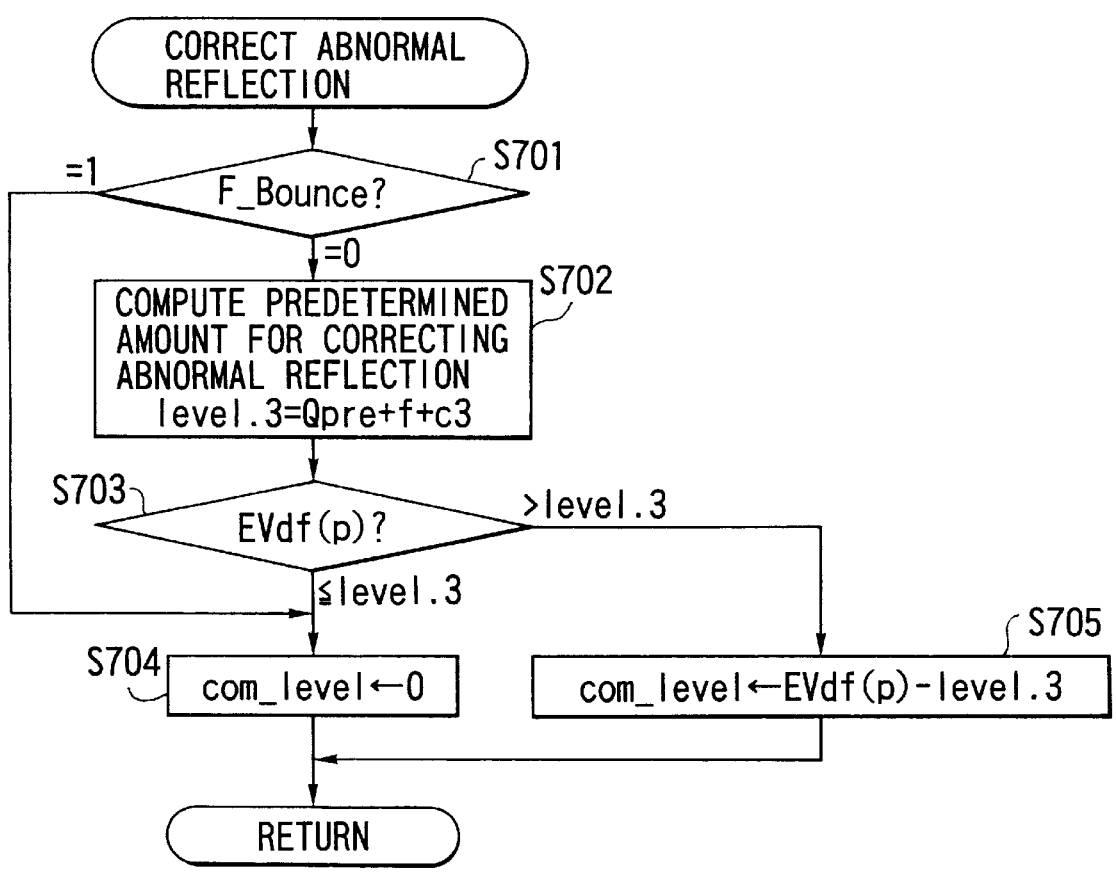
FIG. 15 is a flowchart of computation processing to be performed by the camera system shown in FIG. 12.

The operation flow of this embodiment will be described below with reference to FIGS. 14 and 15. The circled letter "A" of the flow of FIG. 14 is connected to the circled letter "A" of the flow of FIG. 5.

In Steps s614 to S617, processing computations similar to Step S114 to S117 are executed. In Step S618, correction of abnormal reflection is executed, as will be described later in detail.

Then, in Step S619, similarly to Step S122, the shutter 8 and the photographing lens diaphragm 15 are controlled to start an exposure operation. Then, when the switch SWX is turned on in synchronism with the timing at which the shutter 8 is fully opened (Step S620), the signal SWX is transmitted to the flash-unit microcomputer 200 as an instruction to execute the main emission.

At the same time that the instruction is transmitted, in Step S621, the camera microcomputer 100 drives the light-on-film-surface measuring circuit 114 to cause the light-on-film-surface measuring sensor 24 to start a light measuring operation. Then, in Step S622, when the camera microcomputer 100 determines that the measured light integral value of the light-on-film-surface measuring circuit 114 has reached a predetermined value for the light measuring area selected in Step S622, the camera microcomputer 100 transmits an emission stop instruction to the flash unit 18 to stop the emission of the flash unit 18. The predetermined value is a value corrected by the abnormal-reflection correction of Step S618. In Step S623, one photographic cycle is brought to an end, similarly to Step S124.

The abnormal-reflection correcting routine executed in Step S618 will be described below with reference to FIG. 15. First, in Steps S701 to S703, the camera microcomputer 100 performs processing computations similar to Step S301 to S303.

Then, in Step S703, the camera microcomputer 100 compares "level.3" and the preliminary-emission reflected light component "EVdf(P)" relative to the light measuring area selected for computing the amount of correct emission of the main emission. If the preliminary-emission reflected light component "EVdf(P)" is not greater than "level.3", the process proceeds to Step S704, in which the camera microcomputer 100 substitutes "0" for the amount of correction "com_level", and then brings this routine to an end.

On the other hand, if the preliminary-emission reflected light component "EVdf(P)" is greater than "level.3", the process proceeds to Step S705, in which the camera microcomputer 100 corrects the preliminary-emission reflected light component "EVdf(P)" as follows:

$$com\_level \leftarrow EVdf(P) - level.3$$

and brings this routine to an end. In this manner, by controlling the main emission in Step S622 ("correct exposure level" minus "com level"), the amount of emission of the main emission is corrected so that the main emission is effected at an underexposure level.

According to the embodiment described above, it is possible to realize a simple camera system capable of providing a correct amount of exposure at all times without using a complicated arrangement for special photography, such as bounce flash photography, even in the case of flash emission control using film-surface-reflected light measurement.

The present invention is applicable to not only a camera system in which a flash unit is separably secured to a camera body, but also a flash-unit integrated type of camera system.

The present invention is not applied to only a single-lens reflex camera, and can also be applied to various types of cameras such as a lens shutter camera or a video camera, optical apparatuses other than such cameras, apparatuses other than the optical apparatuses, apparatuses applied to the cameras or to the optical or other apparatuses, or elements which constitute part of such apparatuses.

The operation of a flash-unit control system according to another embodiment of the present invention will be described below with reference to the operation flowchart shown in FIGS. 16 through 21. Incidentally, the following description is mainly focused on the operation of the camera microcomputer 100 which is associated with the flowchart shown in FIGS. 16 through 21.

When the operation of the camera system is started, the camera microcomputer 100 first clears a flag F_FELK to "0" in Step S100.

After that, Steps S101 to S109 are executed. Since Steps S101 to S109 are identical to the corresponding steps shown in FIG. 5, the description thereof is omitted for the sake of simplicity.

In Step S110, the camera microcomputer 100 reads the state of the preliminary emission lock switch SWFELK which is interlocked with the aforesaid push switch, and determines whether the preliminary emission lock switch SWFELK is on or off.

The process branches from Step S110 to Steps S111 and S113, and if the preliminary emission lock switch SWFELK is on, the process proceeds to Step S111, in which control of the preliminary emission is executed.

Figure 18:
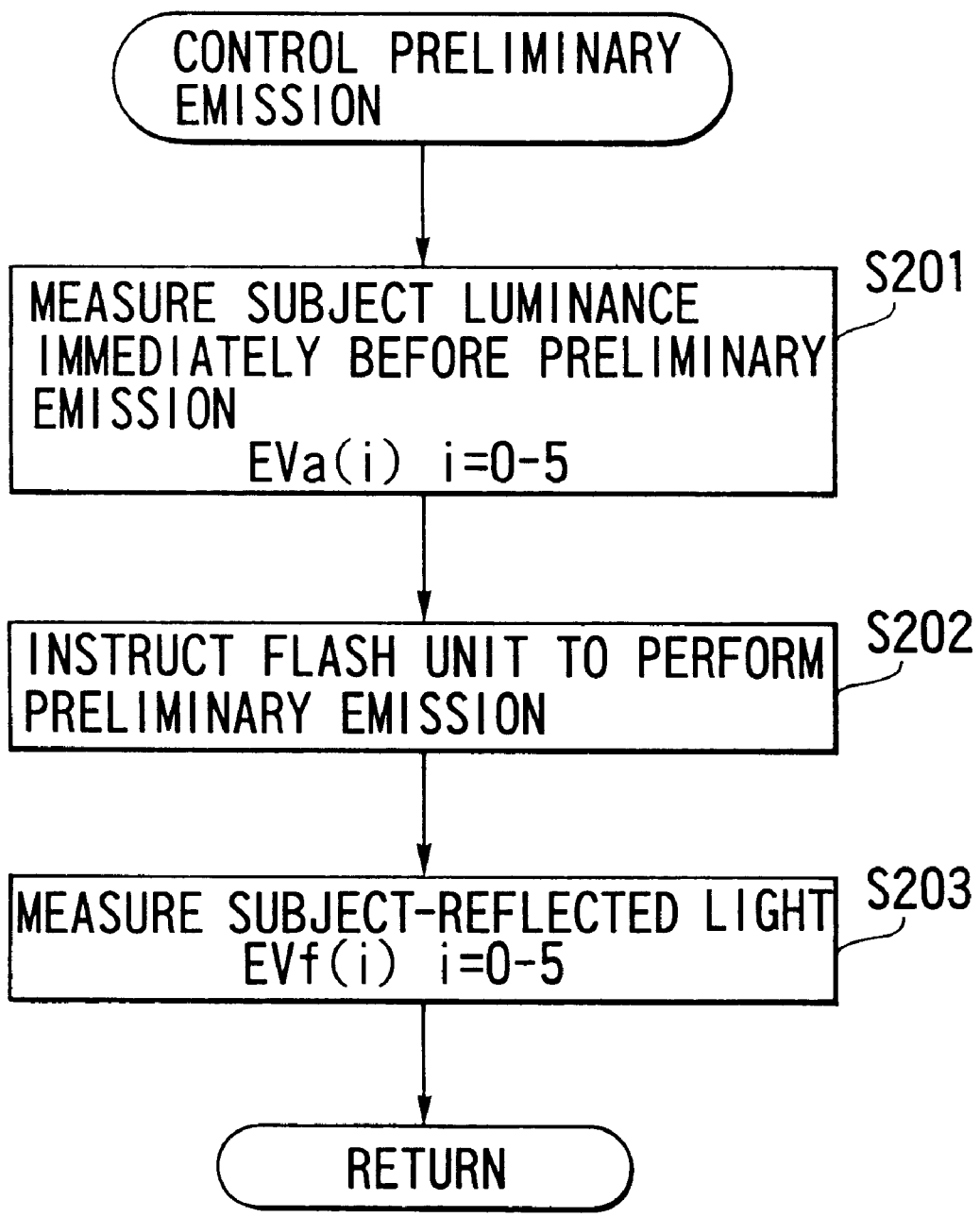
FIG. 18 is a flowchart showing the preliminary emission control routine incorporated in the flowchart of FIG. 16.

A routine for controlling the preliminary emission control routine will be described below with reference to FIG. 18.

In Step S201, the camera microcomputer 100 obtains a subject luminance immediately before the preliminary emission through the light measuring circuit 106. The obtained subject luminance value is memorized in the RAM as EVa (i) (i=0–5).

In Step S202, the camera microcomputer 100 transmits to the flash unit 18 an instruction to execute the preliminary emission. The flash-unit microcomputer 200 performs a preliminary emission operation in the above-described manner in accordance with the instruction.

In Step S203, while the flat emission of the preliminary emission is being sustained, the camera microcomputer 100 obtains a subject luminance through the light measuring circuit 106. The obtained subject luminance value is memorized in the RAM as EVf (i) (i=0–5).

Figure 16:
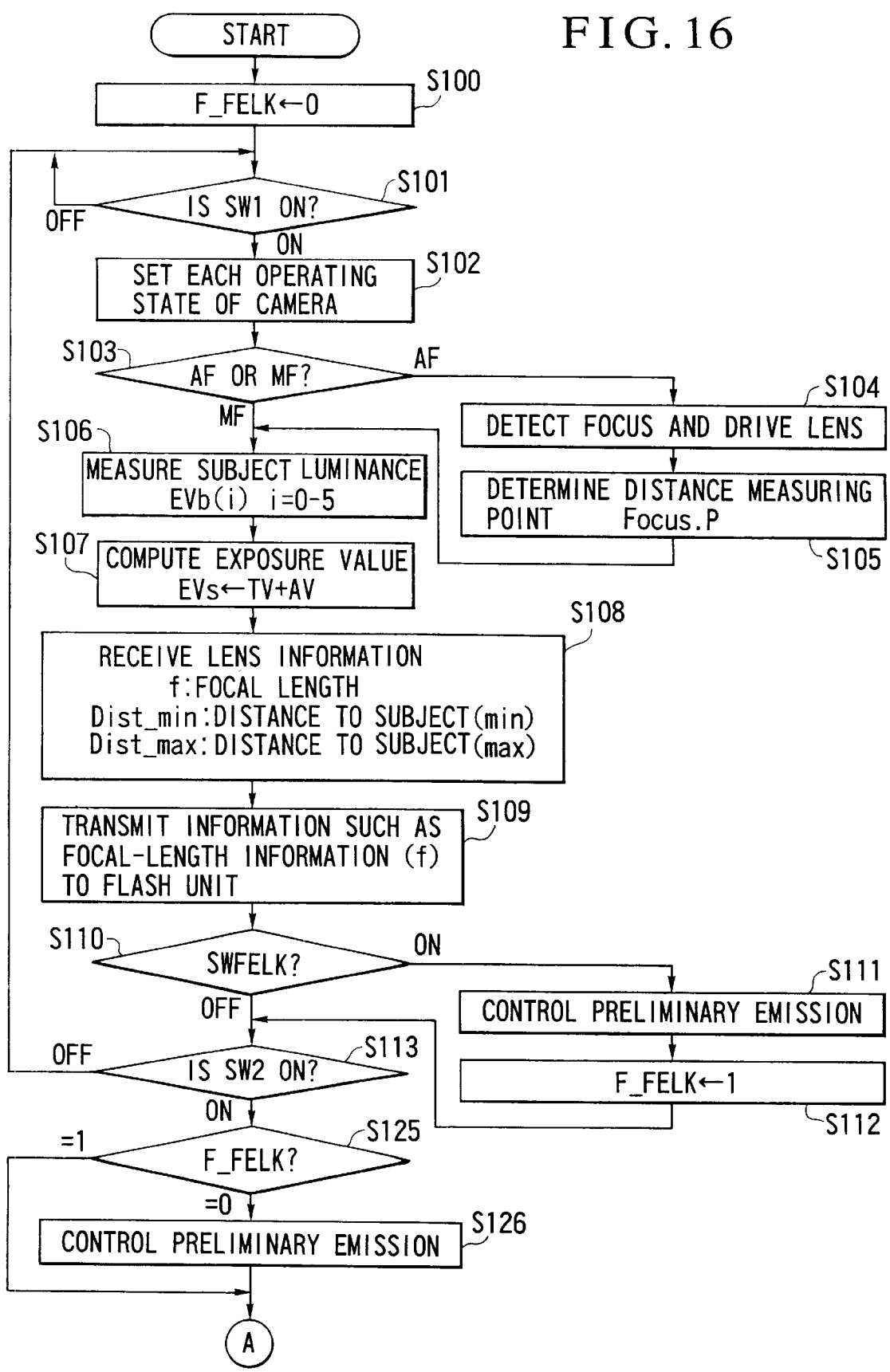
FIG. 16 is a flowchart showing one part of the operation of another embodiment of a flash photography camera system according to the present invention.

Then, the process returns to Step S112 of FIG. 16, in which the camera microcomputer 100 sets the value of flag F_FELK to "1". This flag means that the preliminary emission pointed at the subject intentionally selected by the photographer has been executed.

If it is determined in step S110 that the preliminary emission lock switch SWFELK is off, the process immediately proceeds to Step S113, whereas if it is determined in Step S110 that the preliminary emission lock switch SWFELK is on, the process proceeds to Step S113 through Steps S111 and S112. In Step S113, the camera microcomputer 100 determines whether the switch SW2 is on, the switch SW2 being arranged to be turned on when the release button is pressed to the second stroke position. If the switch SW2 is off, Steps S101 to S110 are repeated, whereas if the switch SW2 is on, the process proceeds to a 1shutter release operation which starts with Step S125.

In Step S125, the camera microcomputer 100 determines whether the value of the flag F_FELK is "1" or "0". If the value of the flag F_FELK is "1", this indicates that the preliminary emission has already been completed. Therefore, the camera microcomputer 100 proceeds to Step S114 without executing Step S126.

If the value of the flag F_ELK is "0", this indicates that the preliminary emission has not yet been performed. Therefore, the camera microcomputer 100 proceeds to Step S126, in which preliminary emission control similar to Step S111 is executed.

The processing of Steps S114 to S124 is identical to that of Steps S114 to S124 of FIG. 6, and the description thereof is omitted for the sake of simplicity. However, since the subject-area selection routine of Step S117 of FIG. 17 differs from that of Step S117 of the embodiment shown in FIG. 6, the following description will be focused on Step S117 of FIG. 17.

Figure 19:
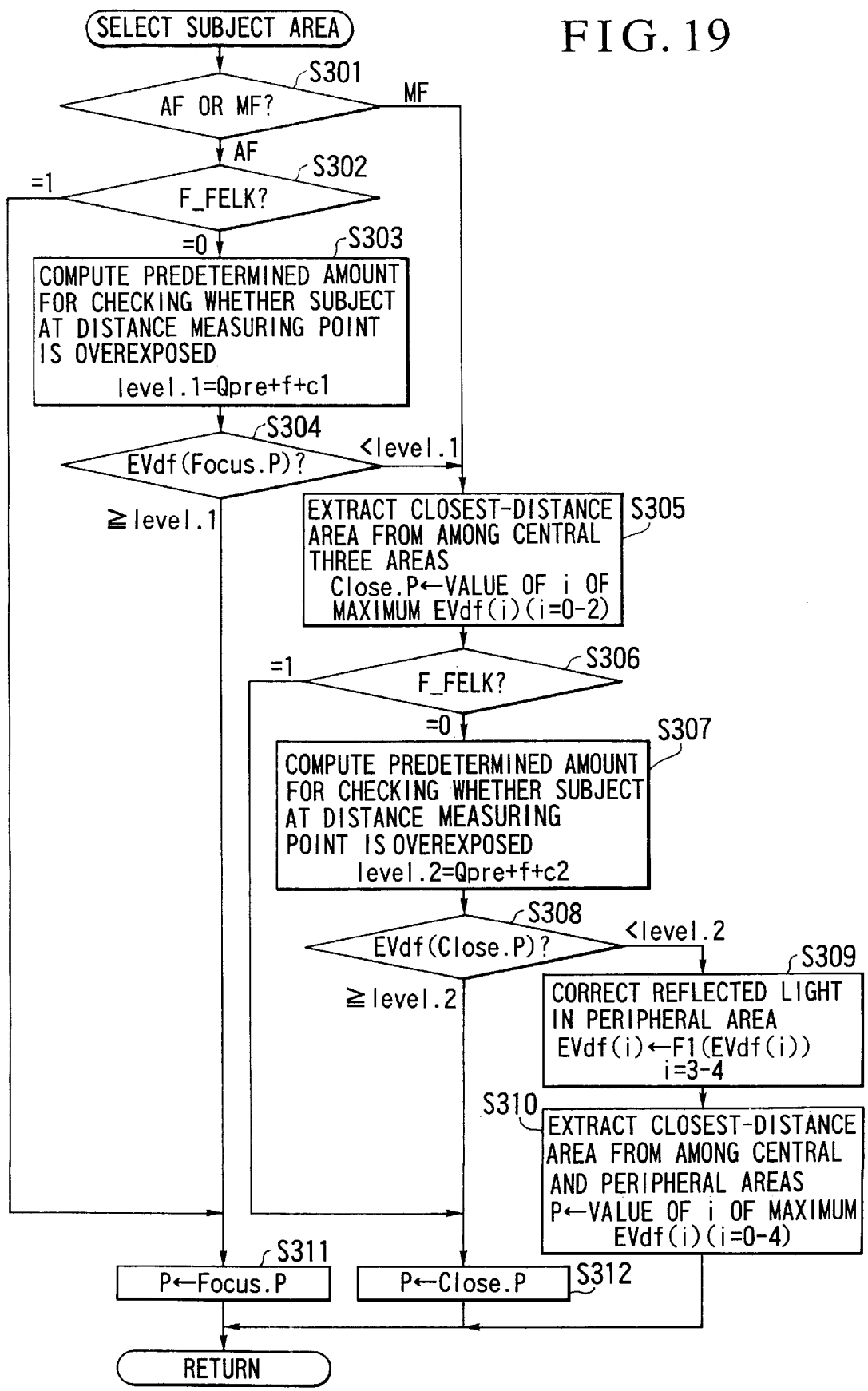
FIG. 19 is a flowchart showing the subject area selecting routine incorporated in the flowchart of FIG. 17.

The subject-area selection routine of Step S117 of FIG. 17 will be described below with reference to FIG. 19.

In Step S301, the camera microcomputer 100 determines whether the camera system is in the AF mode for performing an automatic focus detecting operation or the MF mode in which no automatic focus detecting operation is performed, similarly to Step S103. If the AF mode has been selected, the process proceeds to Step S305, whereas if the MF mode has been selected, the process proceeds to Steps S302.

In Step S302, the camera microcomputer 100 determines whether the value of the flag F_FELK is "1" or "0". If the value is "1", this indicates that the photographer has performed the preliminary emission prior to an exposure operation. Therefore, the camera microcomputer 100 proceeds to step S311 without executing Steps S303 and S304, and selects a subject area to which to correctly adjust the amount of emission, without taking account of the focal length information "f".

If the value of the flag F_FELK is "0", the process proceeds to Steps S303 and S304, in which the camera microcomputer 100 selects a subject area while taking account of the focal length information "f".

In Step S303, the camera microcomputer 100 obtains the preliminary-emission reflected light component "EVdf" at a most distant position beyond which a subject such as a person becomes excessively small with respect to one light measuring area, from the focal length information "f", the amount of emission of the preliminary emission "Qpre" and the predetermined coefficient "c1", and sets the obtained reflected light component as "level.1".

In Step S304, the camera microcomputer 100 determines whether the preliminary-emission reflected light component "EVdf(Focus.P)" obtained at a light measuring point is not less than the aforesaid "level.1". If the preliminary-emission reflected light component "EVdf(Focus.P)" obtained at the light measuring point is not less than "level.1", the process proceeds to Step S311. On the other hand, if the preliminary-emission reflected light component "EVdf(Focus.P)" is less than "level.1", the process proceeds to Step S305.

In Step S305, if it is determined in Step S301 that the camera system is in the MF mode in which no automatic focus detecting operation is performed, and if it is determined in Step S304 that the preliminary-emission reflected light component "EVdf(Focus.P)" is less than "level.1" and the light measuring area which contains the light measuring point cannot be selected as an area to which to correctly adjust the amount of emission, the camera microcomputer 100 selects the area "Close.P" in which a subject nearest to the camera system is present, from the central three light measuring areas E0, E1 and E2. This selection method is based on the concept that there is a highest possibility that a subject which is nearest to the camera system of all the subjects present in the image plane is a main subject. Specifically, a light measuring area in which the preliminary-emission reflected light component "EVdf(i)" (i=0–2) reaches a maximum is set to the area "Close.P".

Then, in Step S306, the camera microcomputer 100 determines whether the value of the flag F_FELK is "0" or "1". If the value is "1", this indicates that the photographer has performed the preliminary emission prior to an exposure operation. Therefore, the camera microcomputer 100 proceeds to Step S312 without executing Steps S307 and S308, and selects a subject area to which to correctly adjust the amount of emission, without taking account of the focal length information "f".

If the value of the flag F_FELK is "0", the camera microcomputer 100 proceeds to Step S307 and S308 and selects a subject area while taking account of the focal length information "f".

In Step S307, the camera microcomputer 100 obtains the preliminary-emission reflected light component "EVdf" at a most distant position beyond which a subject such as a person becomes excessively small with respect to one light measuring area, from the focal length information "f", the amount of emission of the preliminary emission "Qpre" and the predetermined coefficient "c2", and sets the obtained reflected light component as "level.2".

Although "level.2" is set in a manner identical to that used for finding "level.1" in Step S303, the value of level.2" is set higher than that of "level.1" on the basis of the concept of weighting a light measuring point to a further extent. For this reason, even if a subject such as a person lies considerably near the camera system, the preliminary-emission reflected light component "EVdf" becomes less than that "level.2". This "level.2" employs, for example, the value of the preliminary-emission reflected light component "EVdf" which is obtained when a gray wall of standard reflectance is present at a position which is approximately 2.5 mm away from a lens having a focal length of 50 mm.

Then, in Step S308, the camera microcomputer 100 determines whether the preliminary-emission reflected light component "EVdf(Close.P)" obtained at the closest-distance point is not less than the aforesaid "level.2". If the reflected light component "EVdf(Close.P)" is not less than "level.2", the process proceeds to Step S312, whereas if the reflected light component "EVdf(Close.P)" is less than "level.2", the process proceeds to Step S309.

Figure 21:
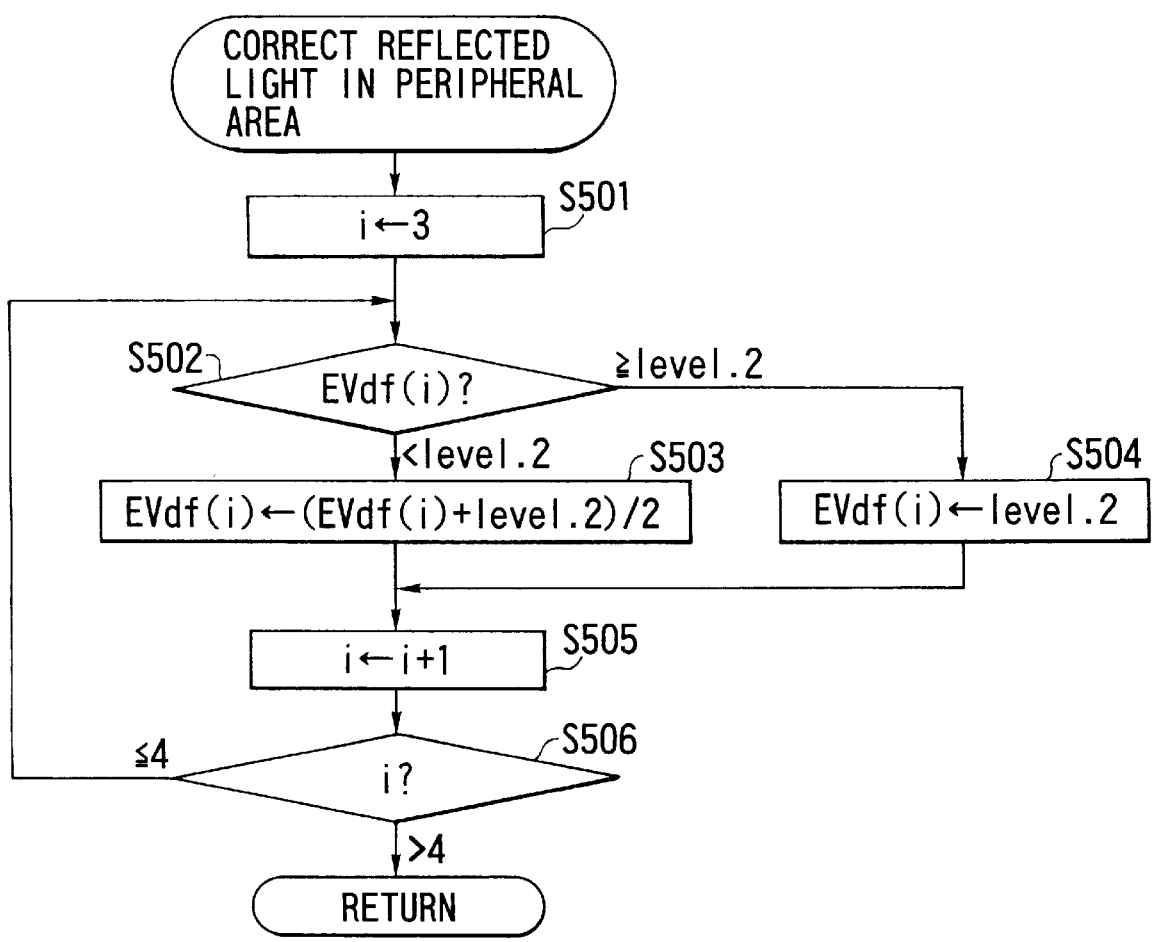
FIG. 21 is a flowchart showing the peripheral-area-reflected light correcting routine incorporated in the flowchart of FIG. 19.

If the preliminary-emission reflected light component "EVdf(Close.P)" obtained at the closest-distance point is less than "level.2", this indicates that a subject such as a person is present at a position considerably away from the camera system or in a peripheral portion of the image plane. Accordingly, in Step S309, the camera microcomputer 100 selects a subject area to which to correctly adjust the amount of emission, while taking account of not only the central three areas E0, E1 and E2 but also the peripheral areas E3 and E4. Step S309 is shown in FIG. 21, but since the flow of FIG. 21 is identical to that shown in FIG. 9, the description thereof is omitted for the sake of simplicity.

In Step S310, the camera microcomputer 100 selects a light measuring area having the maximum preliminary-emission reflected light component from the preliminary-emission reflected light component "EVdf(Close.P)" relative to the one of the central three light measuring areas which contains the closest-distance point and the corrected preliminary-emission reflected light component "EVdf" relative to the area E3 or E4, which has been calculated in Step S309, and sets the selected light measuring area as an area to which to correctly adjust the amount of emission and brings this routine to an end.

If it is determined in Step S302 that the value of the flag F_FELK is "1", this indicates that the photographer has executed the preliminary emission pointed at a subject to which to correctly adjust the amount of emission of the flash unit 18 before starting an exposure operation, with the subject being located in a particular light measuring area which contains a distance measuring point on the photographic image plane within the viewfinder 5. If a decision like Step S304 is made as to such a light measuring area, the intention of the photographer will be impaired. Accordingly, in Step S311, the camera microcomputer 100 selects the light measuring area which contains the distance measuring point, as an area to which to correctly adjust the amount of emission, and brings this routine to an end.

If the preliminary-emission reflected light component "EVdf(Focus.P)" which is obtained at the light measuring point is not less than "level.1", this indicates that a subject such as a person is sufficiently large with respect to the light measuring area which contains the light measuring point, and that the preliminary-emission reflected light component "EVdf" has been accurately measured, irrespective of the value of the flag F_FELK. Therefore, the light measuring area "Focus.P" which contains the light measuring point is selected as an area to which to correctly adjust the amount of emission of the flash unit 18, and the process brings this routine to an end.

If it is determined in Step S306 that the value of the flag F_FELK is "1", this indicates that the photographer has executed the preliminary emission pointed at a subject to which to correctly adjust the amount of emission of the flash unit 18 before starting an exposure operation, with the subject being located in or near the center of the photographic image plane within the viewfinder 5. If a decision like Step S308 is made as to a light measuring area in or near the center which contains a subject present at a comparatively short distance from the camera system, the intention of the photographer will be impaired. Accordingly, in Step S312, the camera microcomputer 100 selects the light measuring area which contains the closest-distance point (Close.P), as an area to which to correctly adjust the amount of emission, and brings this routine to an end.

If it is determined in Step S308 that the preliminary-emission reflected light component "EVdf(Focus.P)" which is obtained at the closest-distance point is not less than "level.2", this indicates that a subject such as a person is sufficiently large with respect to the light measuring area which contains the closest-distance point, and that the preliminary-emission reflected light component "EVdf" has been accurately measured, irrespective of the value of the flag F_FELK. Therefore, the light measuring area "Focus.P" which contains the closest-distance point is selected as an area to which to correctly adjust the amount of emission of the flash unit 18, and the process brings this routine to an end.

Figure 17:
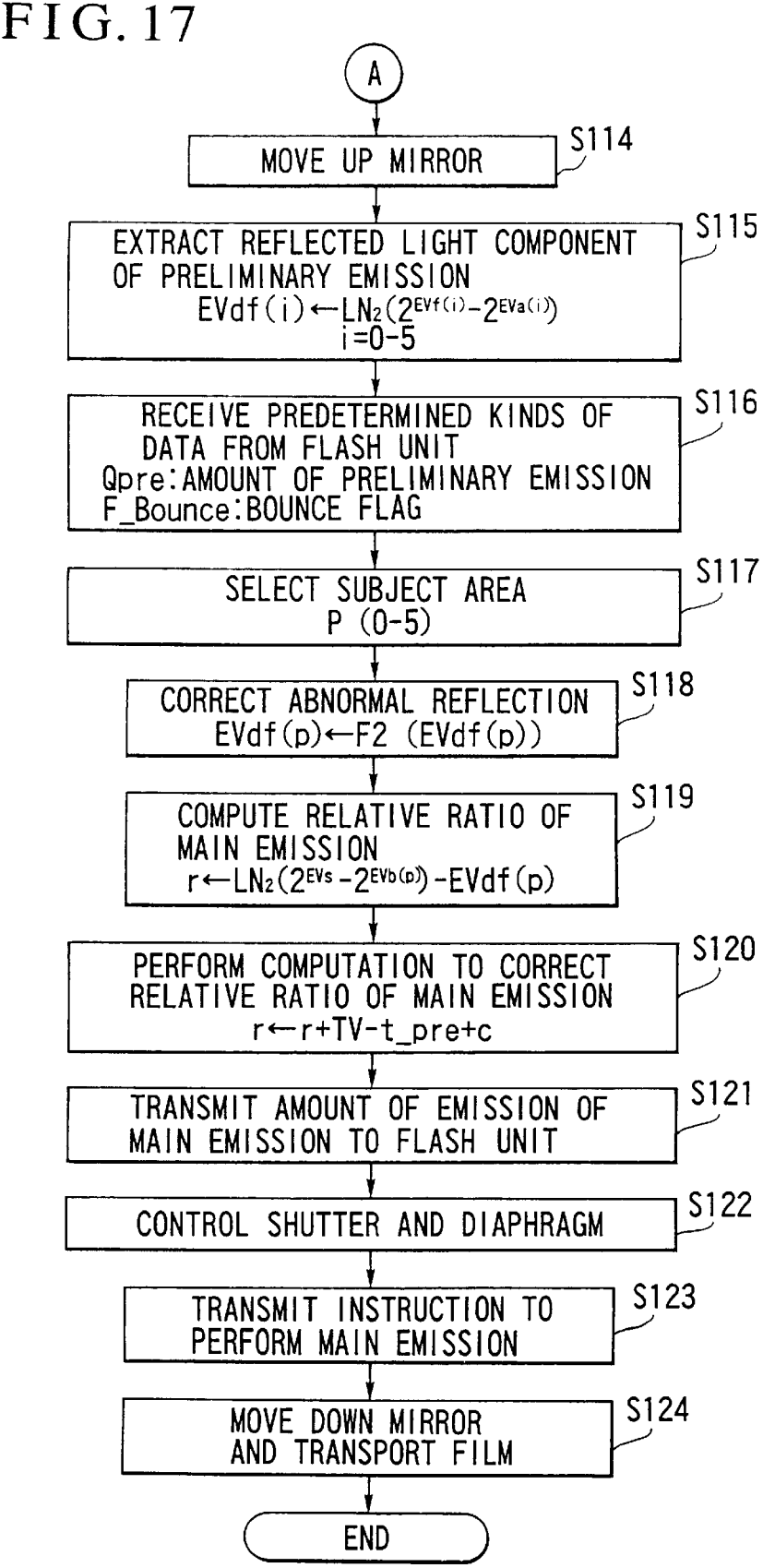
FIG. 17 is a flowchart showing the other part of the operation shown in FIG. 16.
Figure 20:
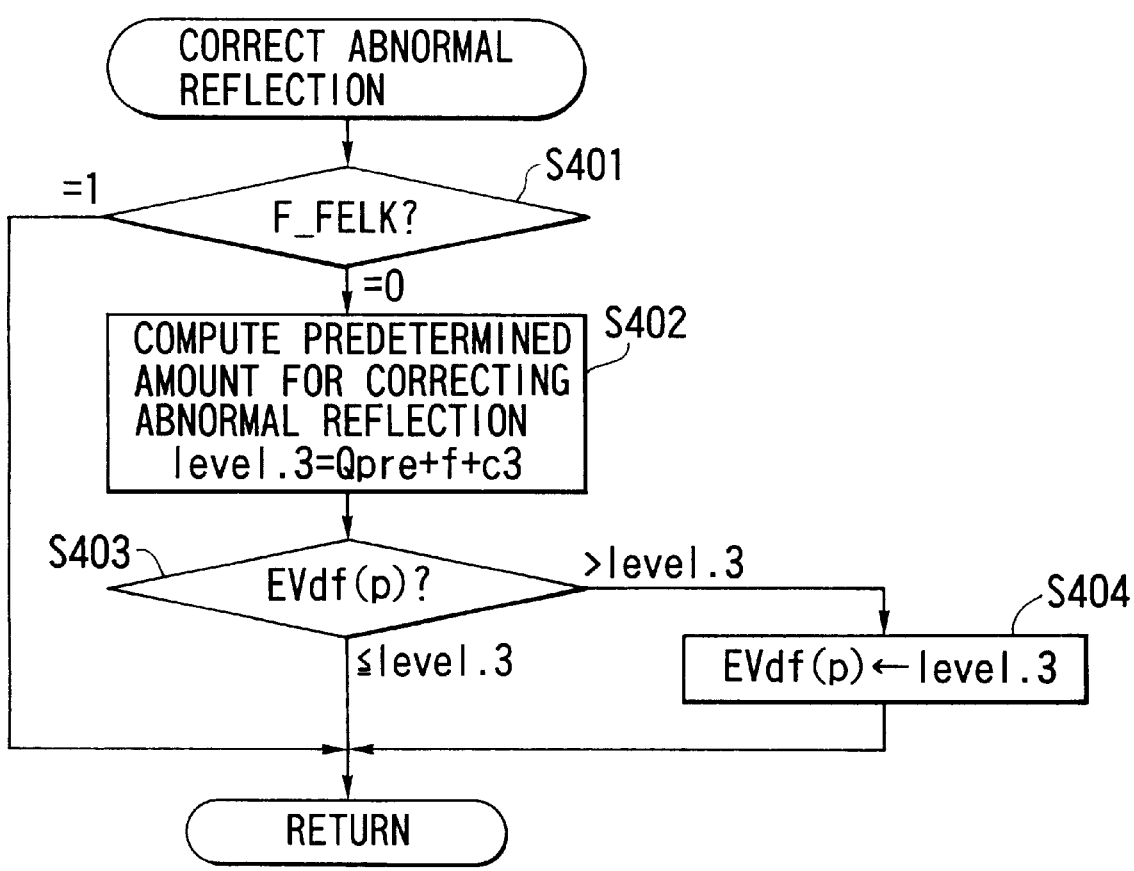
FIG. 20 is a flowchart showing the abnormal-reflection correcting routine incorporated in the flowchart of FIG. 17.

FIG. 20 shows the abnormal-reflection correcting routine of Step S118 of FIG. 17. The processing of Step S118 of FIG. 17 differs from the processing of Step S118 of FIG. 6, as will be described below.

In step S401, the camera microcomputer 100 determines whether the value of the flag F_FELK is "0" or "1". If the value is "1", this indicates that the photographer has performed the preliminary emission prior to an exposure operation. Therefore, the camera microcomputer 100 immediately brings this routine to an end without executing correction of abnormal correction.

If the value of the flag F_FELK is "0", the process proceeds to Step S402 to execute correction of abnormal reflection.

In Step S402, the camera microcomputer 100 obtains the preliminary-emission reflected light component "EVdf" at a position at which a subject such as a person is substantially nearest to the camera system, from the focal length information "f", the amount of emission of the preliminary emission "Qpre" and the predetermined coefficient "c3", and sets the obtained reflected light component as "level.3".

This "level.3" employs, for example, the value of the preliminary-emission reflected light component "EVdf" which is obtained when a gray wall of standard reflectance is present at a position which is approximately 0.5 mm away from a lens having a focal length of 50 mm. This is based on the concept that if a lens having a focal length of 50 mm is used, a subject is not at all present within the shortest photographing distance (approximately 0.5 m) of the lens.

In Step S403, the camera microcomputer 100 compares the aforesaid "level.3" and the preliminary-emission reflected light component "EVdf(P)" relative to the light measuring area to which to correctly adjust the amount of emission. If the preliminary-emission reflected light component "EVdf(P)" is not greater than "level.3", the camera microcomputer 100 brings this routine to an end.

On the other hand, if the preliminary-emission reflected light component "EVdf(P)" is greater than "level.3", the process proceeds to Step S404, in which the camera microcomputer 100 sets the preliminary-emission reflected light component "EVdf(P)" as follows:

$$EVdf(P) \leftarrow level.3$$

and brings this routine to an end. By correcting the preliminary-emission reflected light component "EVdf(P)" in this manner, the amount of emission of the main emission is corrected so that the main emission is effected at an underexposure level.

As described above, according to the present embodiment, the method of finding a light measuring area to be selected for correcting the amount of emission of the main emission or for correctly controlling the amount of emission is altered according to whether the photographer has intentionally executed the preliminary emission before an exposure operation, so that it is possible to realize a flash photography camera system capable of providing a correct amount of exposure suited to the intention of the photographer at all times.

Although the above-described embodiment is arranged so that the photographer performs the preliminary emission beforehand by operating a push button, the present invention is not limited to only such arrangement, and a lever or a dial may be employed. It is also possible to adopt an arrangement in which the preliminary emission is performed in inter-locked relation to the switch SW1 which is turned on at the first stroke of the release button, by a setting member.

The present invention is applicable to not only a camera system in which a flash unit is separably secured to a camera body, but also a flash-unit integrated type of camera system.

The present invention is applicable to not only a single-lens reflex camera but also other types of cameras such as a lens shutter camera.

Figure 22:
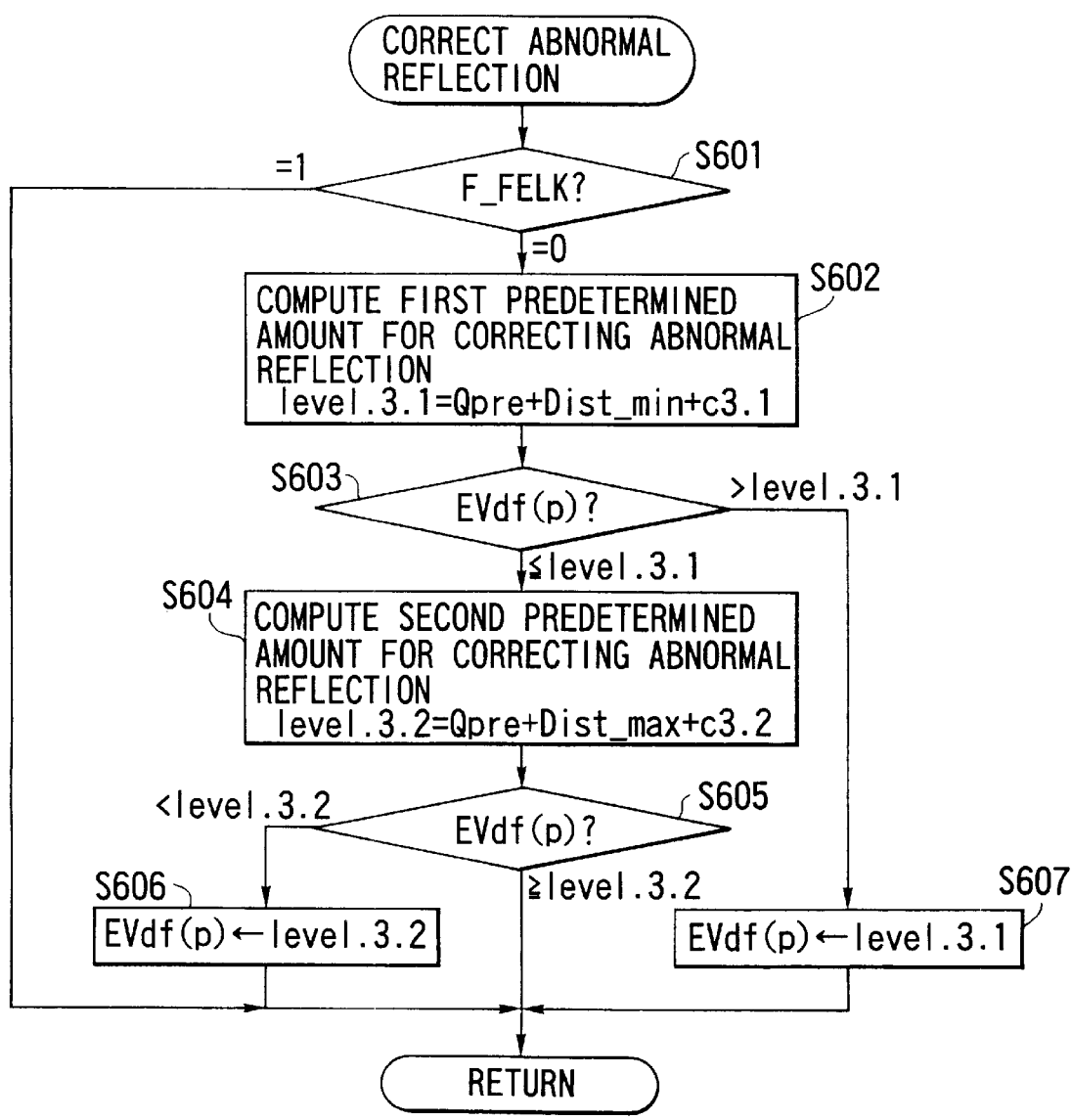
FIG. 22 is a flowchart showing another example of the abnormal-reflection correcting routine of FIG. 19.

FIG. 22 is a flowchart of a modification of the abnormal-reflection correction described above with reference to FIG. 20.

In Step S601, the camera microcomputer 100 determines whether the value of the flag F_FELK is "0" or "1". If the value is "1", this indicates that the photographer has performed the preliminary emission prior to an exposure operation. Therefore, the camera microcomputer 100 immediately brings this routine to an end without executing correction of abnormal correction.

If the value of the flag F_FELK is "0", the process proceeds to Step S602 to execute correction of abnormal reflection.

In Step S602, the camera microcomputer 100 obtains the preliminary-emission reflected light component "EVdf" at a position at which a subject such as a person is substantially nearest to the camera system, from the subject distance information "Dist_min" which has been sent from the lens barrel 11 in Step S108, the amount of emission of the preliminary emission "Qpre" and the predetermined coefficient "c3.1", and sets the obtained reflected light component as "level.3.1".

In Step S603, the camera microcomputer 100 compares the aforesaid "level.3.1" and the preliminary-emission reflected light component "EVdf(P)" relative to a selected light measuring area to which to correctly adjust the amount of emission. If the preliminary-emission reflected light component "EVdf(P)" is not greater than "level.3.1", the process proceeds to Step S604. If the preliminary-emission reflected light component "EVdf(P)" is greater than "level.3.1", the process proceeds to Step S607.

In Step S604, the camera microcomputer 100 obtains the preliminary-emission reflected light component "EVdf" at a position at which a subject such as a person is most distant from the camera system, from the maximum subject distance information "Dist_max" which has been sent from the lens barrel 11 in Step S108, the amount of emission of the preliminary emission "Qpre" and the predetermined coefficient "c3.2", and sets the obtained reflected light component as "level.3.2".

In Step S605, the camera microcomputer 100 compares the aforesaid "level.3.2" and the preliminary-emission reflected light component "EVdf(P)" relative to the selected light measuring area to which to correctly adjust the amount of emission. If the preliminary-emission reflected light component "EVdf(P)" is less than "level.3.2", the process proceeds to Step S606. If the preliminary-emission reflected light component "EVdf(P)" is not less than "level.3.2", the camera microcomputer 100 determines that the distance range of the maximum subject distance information "Dist_max", which has been sent from the lens barrel 11, and the value of the preliminary-emission reflected light component "EVdf(P)" correctly agree with each other and there is no abnormality. Then, the camera microcomputer 100 brings this routine to an end without executing correction of abnormal reflection.

If the preliminary-emission reflected light component "EVdf(P)" is less than "level.3.2", in Step S606, the camera microcomputer 100 sets the preliminary-emission reflected light component "EVdf(P)" as follows:

$$EVdf(P) \leftarrow level.3.2$$

and brings this routine to an end. By correcting the preliminary-emission reflected light component "EVdf(P)" in this manner, the amount of emission of the main emission is corrected so that the main emission is effected at an underexposure level.

If it is determined in Step S603 that the preliminary-emission reflected light component "EVdf(P)" is greater than "level.3.1", the process proceeds to Step S607, in which the camera microcomputer 100 sets the preliminary-emission reflected light component "EVdf(P)" as follows:

$$EVdf(P) \leftarrow level.3.1$$

and brings this routine to an end. By correcting the preliminary-emission reflected light component "EVdf(P)" in this manner, the amount of emission of the main emission is corrected so that the main emission is effected at an underexposure level.

As described above, according to the routine shown in FIG. 22, it is possible to realize a flash photography camera system in which although the amount of emission is corrected by using the maximum and minimum values of the distance from the lens barrel 11 to a subject, it is possible to provide a correct amount of exposure suited to the intention of the photographer at all times, by altering the status of such correction according to whether the photographer has intentionally executed the preliminary emission before an exposure operation.

Figure 12:
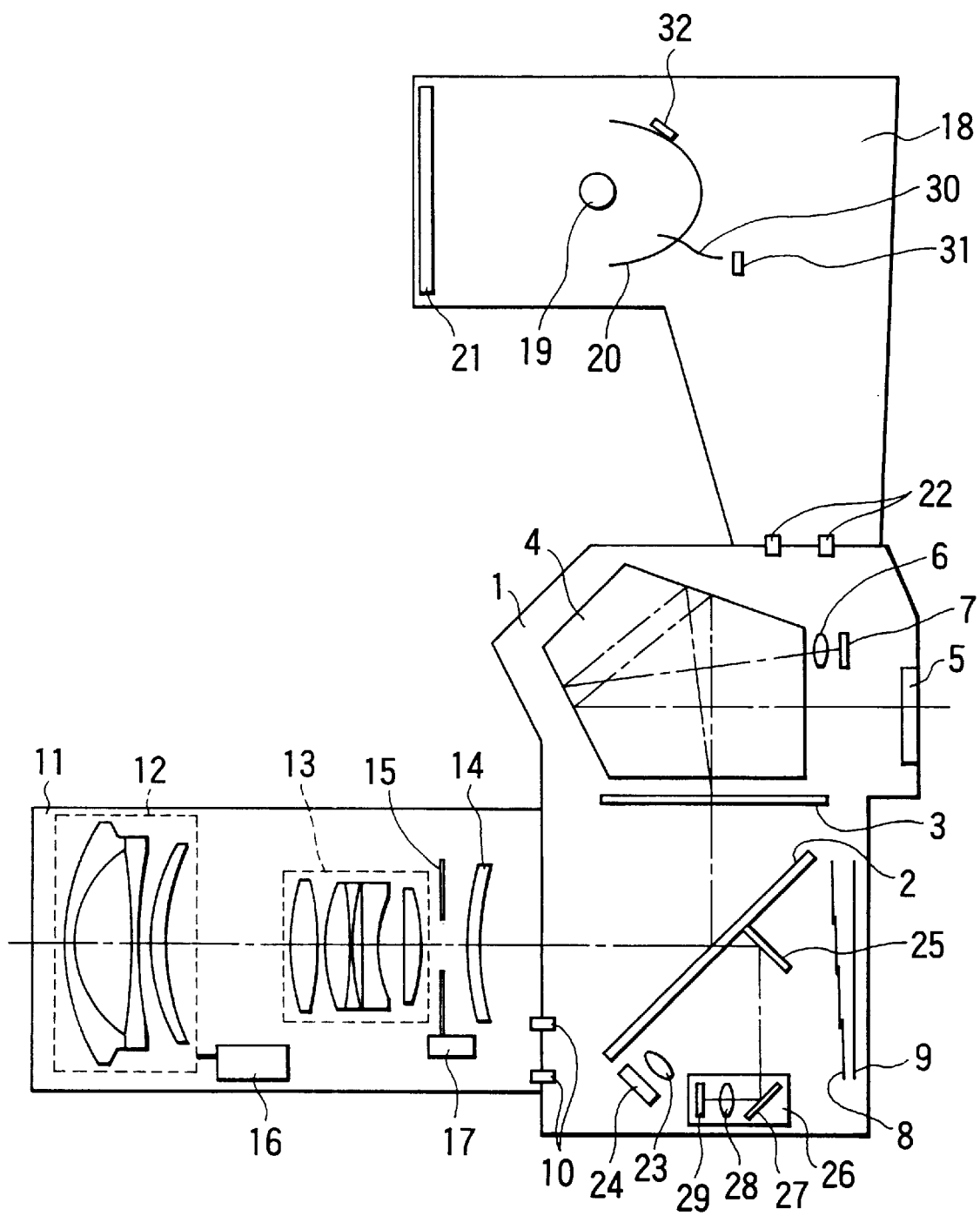
FIG. 12 is a diagrammatic cross-sectional view showing a camera system according to another embodiment of the present invention.
Figure 23:
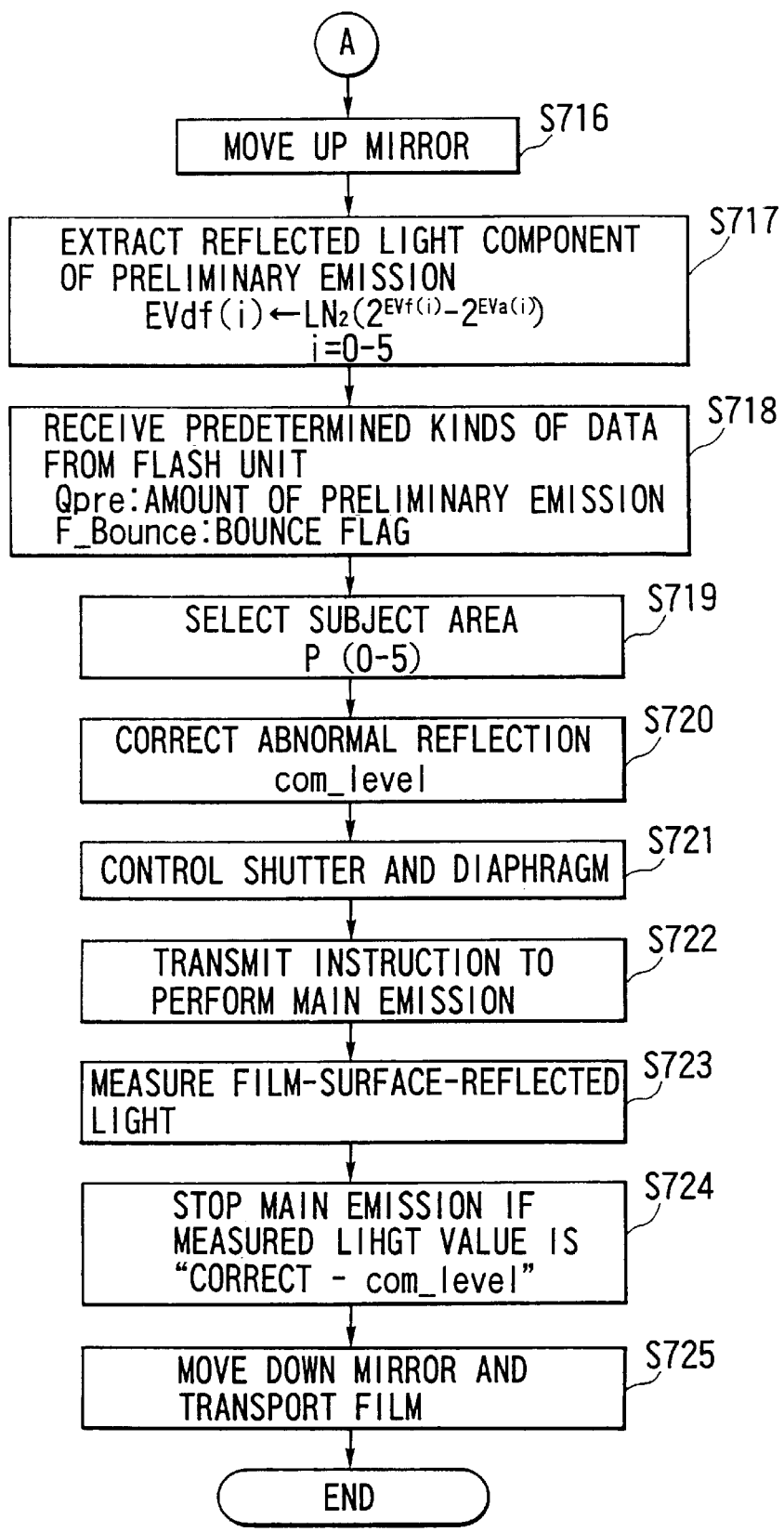
FIG. 23 is a flowchart showing another embodiment of the present invention.
Figure 24:
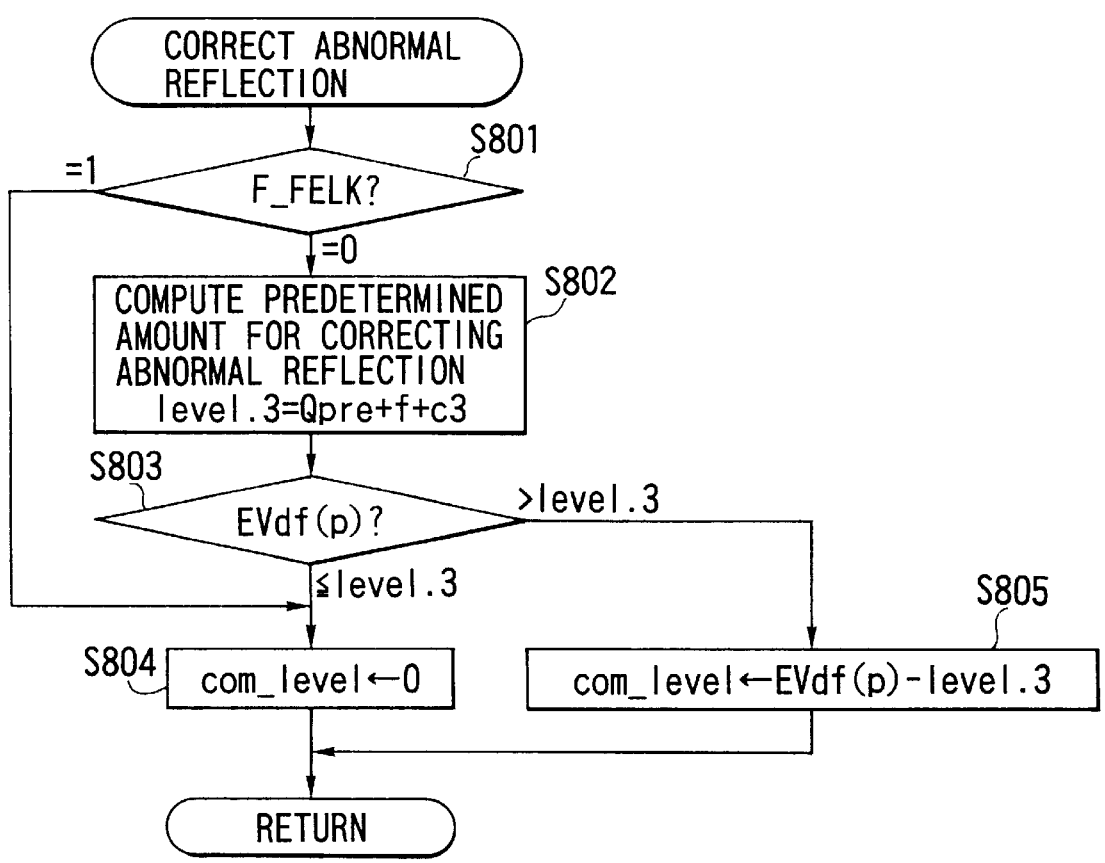
FIG. 24 is a flowchart showing the abnormal-reflection correcting routine incorporated in the flowchart of FIG. 23.

FIGS. 23 and 24 are flowcharts showing the routine of controlling the amount of emission control by means of film-surface-reflected light measurement in the camera system shown in FIGS. 12 and 13.

Since the flowchart of FIG. 23 is substantially identical to that of FIG. 14 except for Step S720 of FIG. 23, the description of the entire flowchart is omitted for the sake of simplicity and only the routine of Step S720 (shown in FIG. 24) will be described below.

Since Steps S801 to S803 shown in FIG. 24 are substantially identical to Steps S401 to S403 of FIG. 20, the description thereof is omitted for the sake of simplicity.

In Step S803, the camera microcomputer 100 compares the aforesaid "level.3" and the preliminary-emission reflected light component "EVdf(P)" relative to a selected light measuring area to which to correctly adjust the amount of emission. If the preliminary-emission reflected light component "EVdf(P)" is not greater than "level.3", the process proceeds to Step S804, in which the camera microcomputer 100 substitutes "0" for the amount of correction "com_level", and then brings this routine to an end.

On the other hand, if the preliminary-emission reflected light component "EVdf(P)" is greater than "level.3", the process proceeds to Step S805, in which the camera microcomputer 100 corrects the preliminary-emission reflected light component "EVdf(P)" as follows:

$$com\_level \leftarrow EVdf(P) - level.3$$

and brings this routine to an end. In this manner, the amount of correction of the amount of emission of the main emission is obtained and the main emission is controlled in Step S822 ("correct exposure level" minus "com_level"), to correct the amount of emission of the main emission so that the main emission is effected at an underexposure level.

Figure 25:
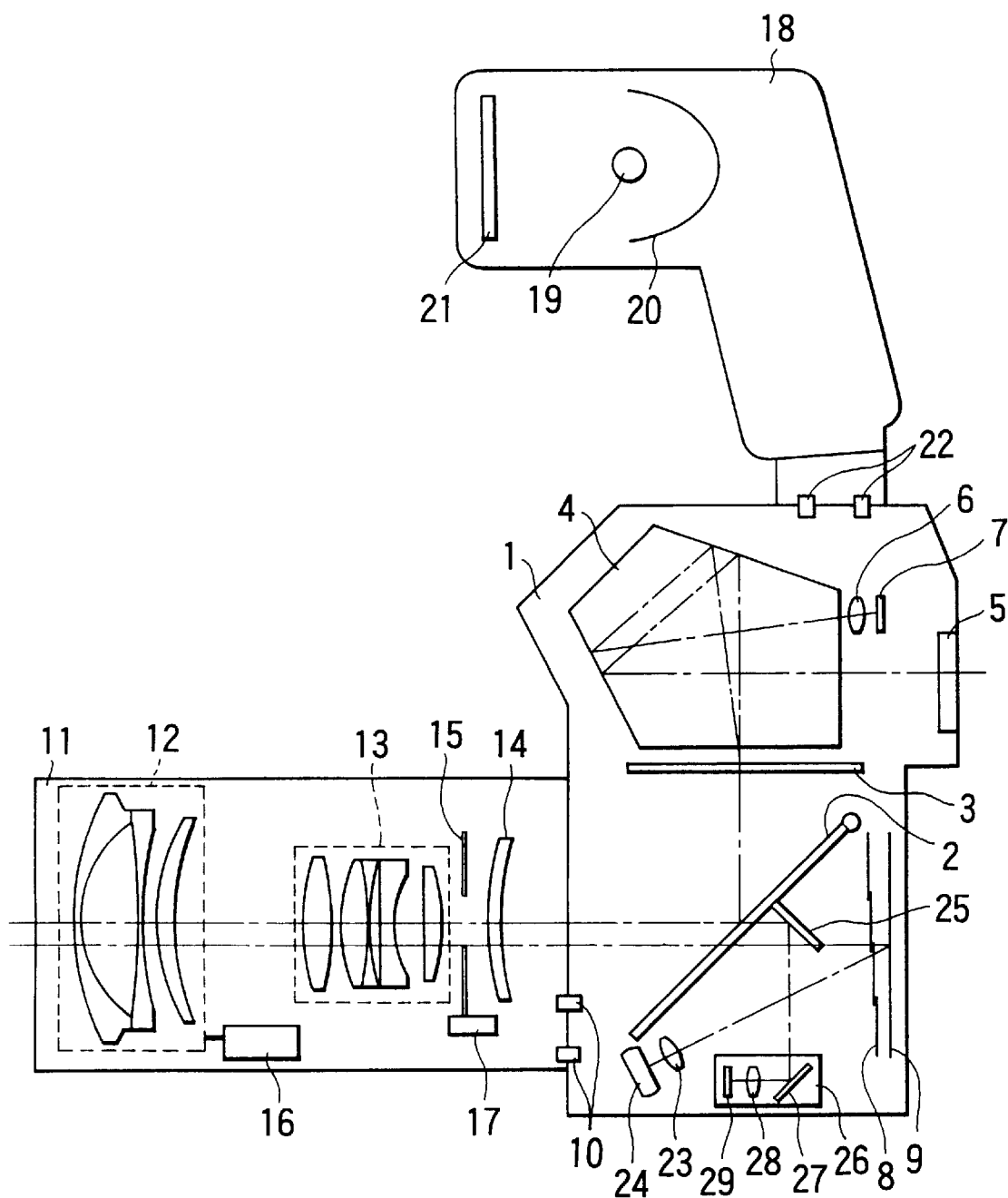
FIG. 25 is a diagrammatic cross-sectional view of a camera system according to another embodiment of the present invention.
Figure 26:
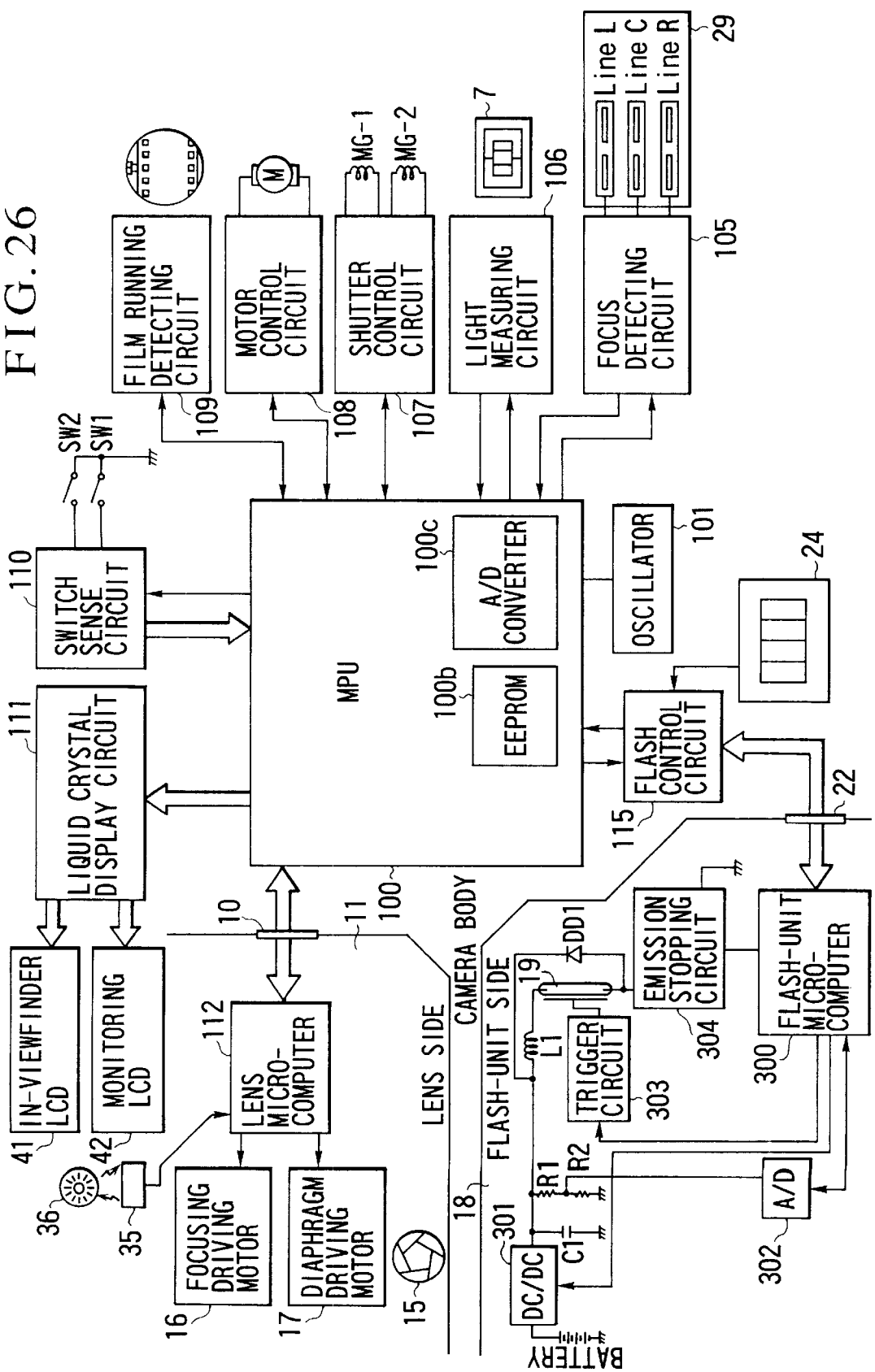
FIG. 26 is a block diagram showing the electrical circuit of the camera system shown in FIG. 25.

FIG. 25 is a diagrammatic cross-sectional view of the optical arrangement of a camera system, showing another embodiment of the present invention. In FIG. 25, identical reference numerals are used to denote constituent elements identical to the corresponding elements shown in FIG. 12. FIG. 26 is a block diagram of the electrical circuit of the camera system of FIG. 25, and in FIG. 26, identical reference numerals are used to denote constituent elements identical to the corresponding elements of the camera body and the lens side shown in FIG. 12.

Referring to FIG. 26, a flash control circuit 115 is composed of a circuit for enabling communications between the flash control sensor 24 of a camera and the flash unit 18, and when the flash unit 18 starts an emission, the flash control sensor immediately starts to store electric charge. When the output of the flash control sensor reaches a predetermine value, the flash control circuit 115 transmits an emission stop signal to the flash unit 18.

A flash-unit microcomputer 300 is a circuit which causes the flash unit 18 to emit light toward a subject, in accordance with a signal from the camera microcomputer 100, and is capable of performing various kinds of control, such as control of the amount of emission and control of the peak value and the emission time of a flat emission.

A DC/DC converter 301 boosts a battery voltage in accordance with an instruction given by the flash-unit microcomputer 300, thereby charging the main capacitor C1 with a voltage of approximately 300 V.

The voltage dividing resistors R1 and R2 are provided so that the flash-unit microcomputer 300 can monitor the voltage of the main capacitor C1. The flash-unit microcomputer 300 performs A/D conversion of a divided voltage supplied from the resistors R1 and R2, through an A/D converter 302, and indirectly monitors the voltage of the main capacitor C1 to stop the boosting operation of the DC/DC converter 301, or monitors the current charged voltage of the main capacitor C1 and transmits the monitored charged voltage to the camera microcomputer 100.

A trigger circuit 303 outputs a trigger signal via the flash-unit microcomputer 300 in response to an instruction of the camera microcomputer 100 during an exposure operation, and causes the xenon tube 19 to generate a high voltage. Thus, the charge energy stored in the main capacitor C1 is discharged via the xenon tube 19 so that an emission of the flash unit 18 is started.

An emission stopping circuit 304 is turned on when the aforesaid trigger signal is outputted. When the emission of the flash unit 18 is started and the output of the flash control circuit 115 reaches a predetermined valued, the emission stopping circuit 304 transmits an emission stop signal to the flash-unit microcomputer 300, and the flash-unit microcomputer 300 transmits an emission stop signal to the emission stopping circuit 304. When receiving the emission stop signal, the emission stopping circuit 304 is turned off to stop the emission of the xenon tube 19.

Figure 27:
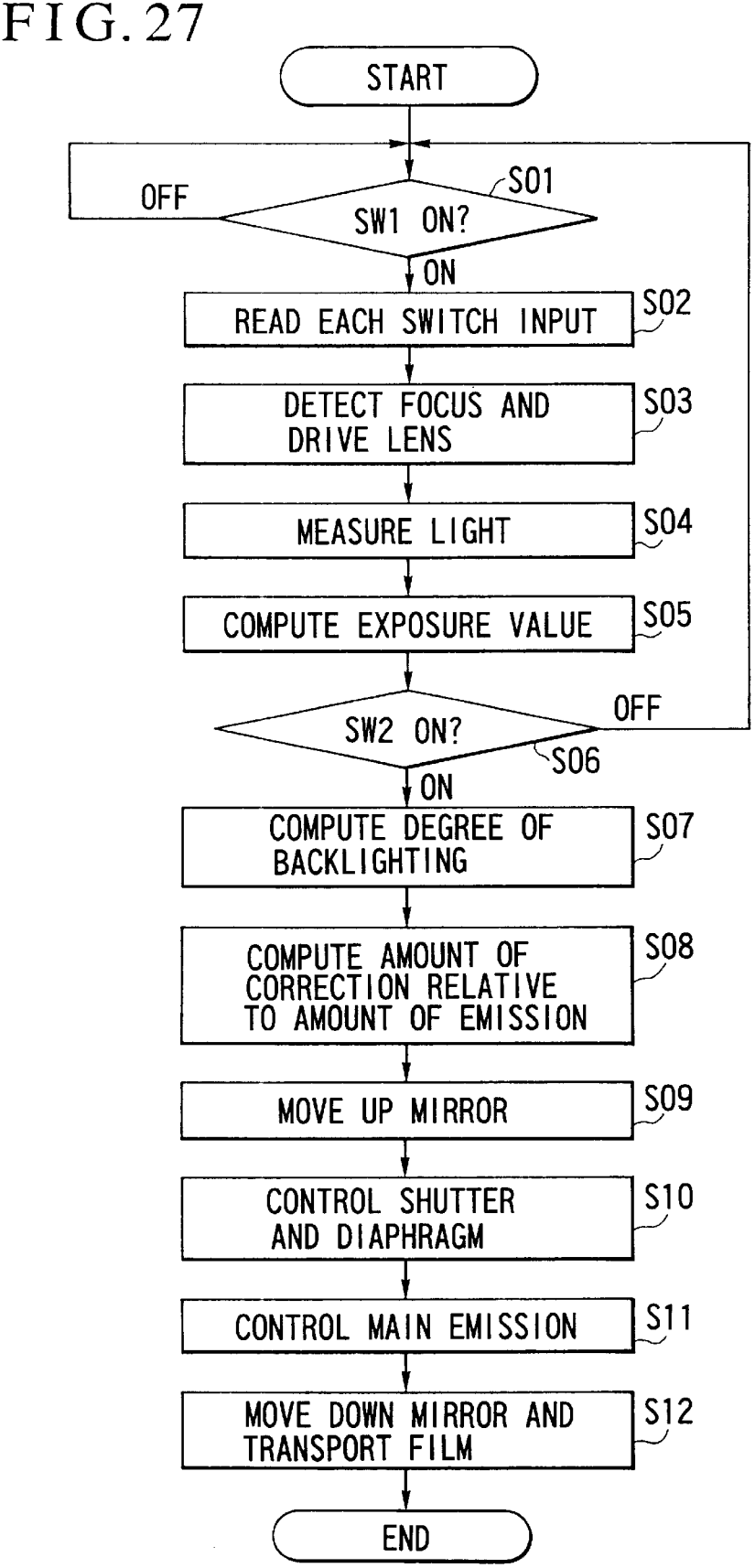
FIG. 27 is a flowchart showing the operation of the camera system shown in FIG. 26.

The operation flow of the flash photography camera system to which the present invention is applied will be described below with reference to FIG. 27.

When the operation of the camera system is started, the camera microcomputer 100 detects the state of the first-stroke switch SW1 which is turned on when the shutter release button is pressed to the first stroke position (Step S01). The camera microcomputer 100 repeats Step S01 until the on state of the first-stroke switch SW1 is detected, and if the on state of the first-stroke switch SW1 is detected, the camera microcomputer 100 performs the next operation.

In Step S02, the camera microcomputer 100 reads the states of individual operating switches (not shown) of the camera system through the switch sense circuit 110, and sets various photographing modes, such as a method of determining a shutter speed and a method of determining an aperture value.

Then, in Step S03, the camera microcomputer 100 causes the focus detecting circuit 105 to perform a focus detecting operation using a known phase-difference detecting method, as described previously. The camera microcomputer 100 controls the lens microcomputer 112 on the basis of the state of focus detected in the aforesaid focus detecting operation, and performs focus adjustment of the lens barrel 11.

As described previously with reference to FIG. 2, three points for focus detection are provided on the image plane. Which of the three points at which subjects are respectively present is to be focused may be arbitrarily set by the photographer, or by using a known automatic selection algorithm based on the concept of nearest-point priority.

In Step S04, the camera microcomputer 100 obtains the subject luminance values of the respective six areas provided in the image plane, through the light measuring circuit 106.

Then, in Step S05, the camera microcomputer 100 determines the amount of exposure from the subject luminance values of the respective six areas by a known algorithm, and determines the value of a shutter speed and the value of an aperture in accordance with the photographing modes which have been set.

Then, in Step S06, the camera microcomputer 100 determines whether the second-stroke switch SW2 to be turned on when the shutter release button is pressed to the second stroke position is on. If the second-stroke switch SW2 is off, the process returns to Step S01 and repeats the operation of Steps S01 to S06, whereas if the second-stroke switch SW2 is on, the process proceeds to Step S07.

In Step S07, the camera microcomputer 100 obtains the subject luminance information through the light measuring circuit 106 and calculates the degree of backlighting. A method of finding the degree of backlighting will be described below with reference to FIG. 32.

First, a backlighting coefficient "rlt" is obtained from the output values of the respective sensor's light measuring areas. The backlighting coefficient "rlt" is a function which indicates how the degree of backlighting of the measured light value obtained at the distance measuring point determined in Step S03 is higher than the degree of backlighting of an average measured light value. As the value of the backlighting coefficient "rlt" becomes smaller, the contrast of a subject becomes higher and the degree of backlighting becomes higher. The backlighting coefficient "rlt" is expressed by the following expression:

$$rt1 = \sum_{j=0}^{5} A(j)/6 - A(i)$$

where A(i) represents the measured light value of the distance measuring point, and A(0) to A(5) represent the measured light outputs obtained from the respective six light measuring areas E0 to E5 shown in FIG. 2.

Figure 32:
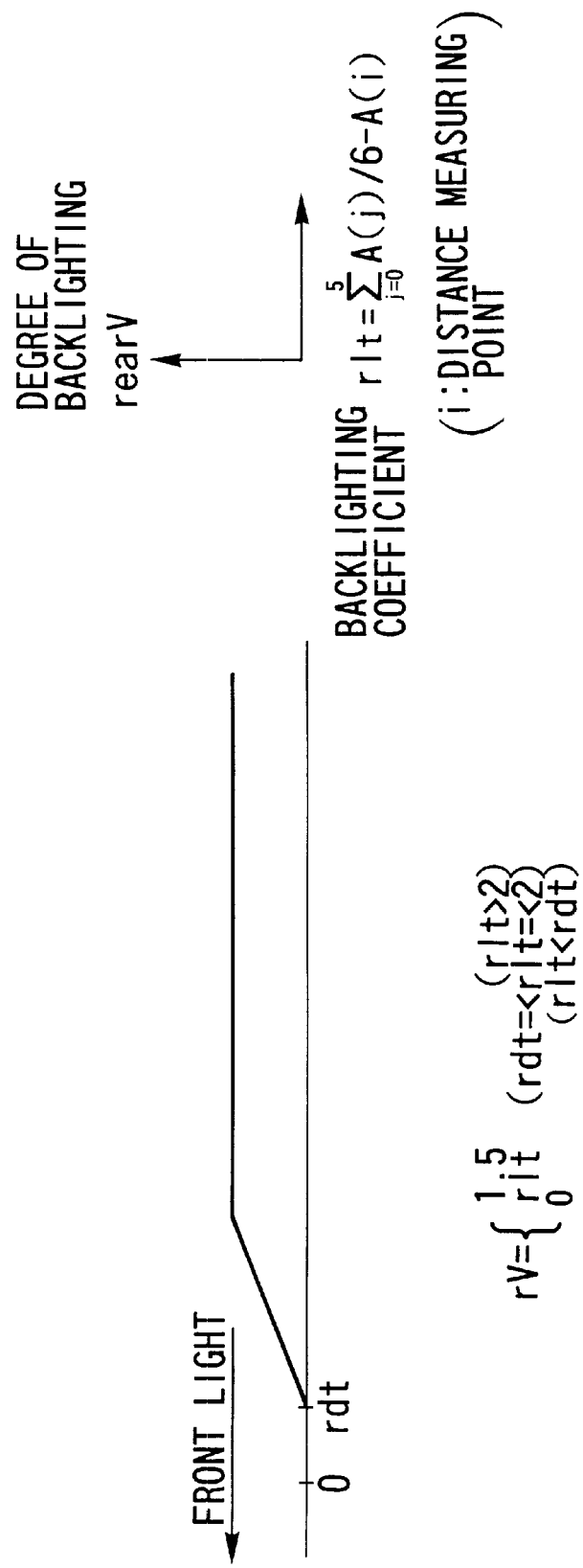
FIG. 32 is a view showing an expression for calculating the degree of backlighting and a graph representing the expression.

The degree of backlighting, rV, which is calculated on the basis of this backlighting coefficient is expressed by the following expression, and the relationship between the backlighting coefficient "rlt" and the degree of backlighting "rV" is as shown in FIG. 32:

$$rV = \begin{cases} 1.5 & (rlt > 2) \\ rlt & (rdt \le rlt \le 2) \\ 0 & (rlt < rdt) \end{cases}$$

The units of the backlighting coefficient and the degree of backlighting are equivalent to those of the APEX system.

In Step S08, the camera microcomputer 100 computes a correction value of the amount of emission from the degree of backlighting obtained in Step S07. A method of finding the correction value of the amount of emission will be described below with reference to FIG. 33.

The amount of correction, $\Delta G$, of the amount of emission varies depending on the degree of backlighting and the luminance and is expressed by the following expression:

$$\Delta G = \begin{cases} 0 & (A_{AV} \le BV7) \\ rV \times CBV \times (A_{AV} - DG) & (A_{AV} > BV7) \end{cases}$$

where $A_{AV}$, is a simple average value of measured light values. In other words, as the degree of backlighting becomes higher under higher-luminance conditions, the amount of correction $\Delta G$ becomes larger.

In Step S09, the camera microcomputer 100 moves up the main mirror 2 and retracts the main mirror 2 from the photographic optical path together with the sub-mirror 25, prior to an exposure operation.

Then, in Step S10, the camera microcomputer 100 gives the lens microcomputer 112 an instruction to find an aperture value based on the determined exposure value, and drives the shutter control circuit 107 so that the shutter 8 can be controlled to run at the determined shutter speed.

In Step S11, the flash-unit microcomputer 300 is caused to control the main emission of the flash unit 18 during the exposure operation in synchronism with the driving of the shutter 8. The main emission is controlled by a known TTL flash control system, and is restricted to the amount of emission corrected by the amount of correction obtained by the computation of Step S08. The relationship between the amount of correction and a correct value is expressed by the following expression:

$$G = C - \Delta G$$

where G is the sensor output (integral value) obtained from the flash control sensor when the flash control sensor sends an emission stop signal to the flash unit 18, and C is a theoretical correct value obtainable in TTL flash control.

When the exposure operation comes to an end in this manner, in Step S12, the camera microcomputer 100 moves down the main mirror 2 and the like which have been retracted from the photographing optical path, thereby again obliquely inserting the main mirror 2 and the like into the photographing optical path. The camera microcomputer 100 winds the film 9 by one frame by means of the motor control circuit 108 and the film running detecting circuit 109, and the operation of the flash photography camera system according to the aforesaid embodiment is completed.

Figure 28:
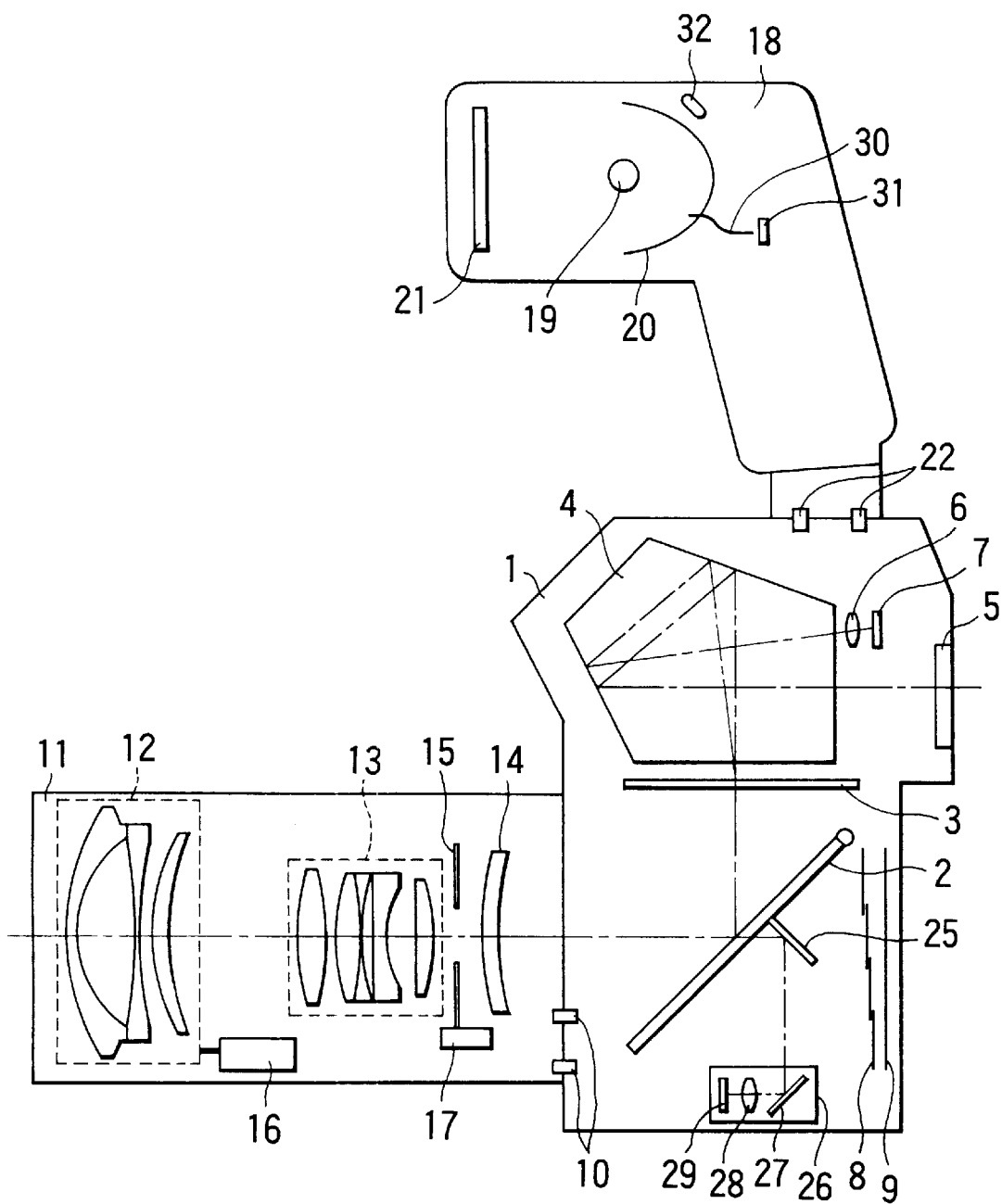
FIG. 28 is a diagrammatic cross-sectional view of a camera body, a flash unit and the like which constitute a camera system according to another embodiment of the present invention.

FIG. 28 is a diagrammatic cross-sectional view mainly showing an optical arrangement according to another embodiment of the present invention. In FIG. 28, identical reference numerals are used to denote constituent elements identical to the corresponding ones shown in FIGS. 12 and 25, and the description thereof is omitted for the sake of simplicity.

Referring to FIG. 28, a glass fiber 30 is provided for conducting light emitted from the xenon tube 19 to the monitor sensor (PD1) 31. The sensor (PD1) 31 is provided for directly measuring the amounts of emissions of the preliminary emission and the main emission. The sensor (PD2) 32 is provided for monitoring the light emitted from the xenon tube 19. By controlling the emission current of the xenon tube 19 on the basis of the output of the sensor (PD2) 32, the flash unit 18 can be made to perform a flat emission.

Figure 29:
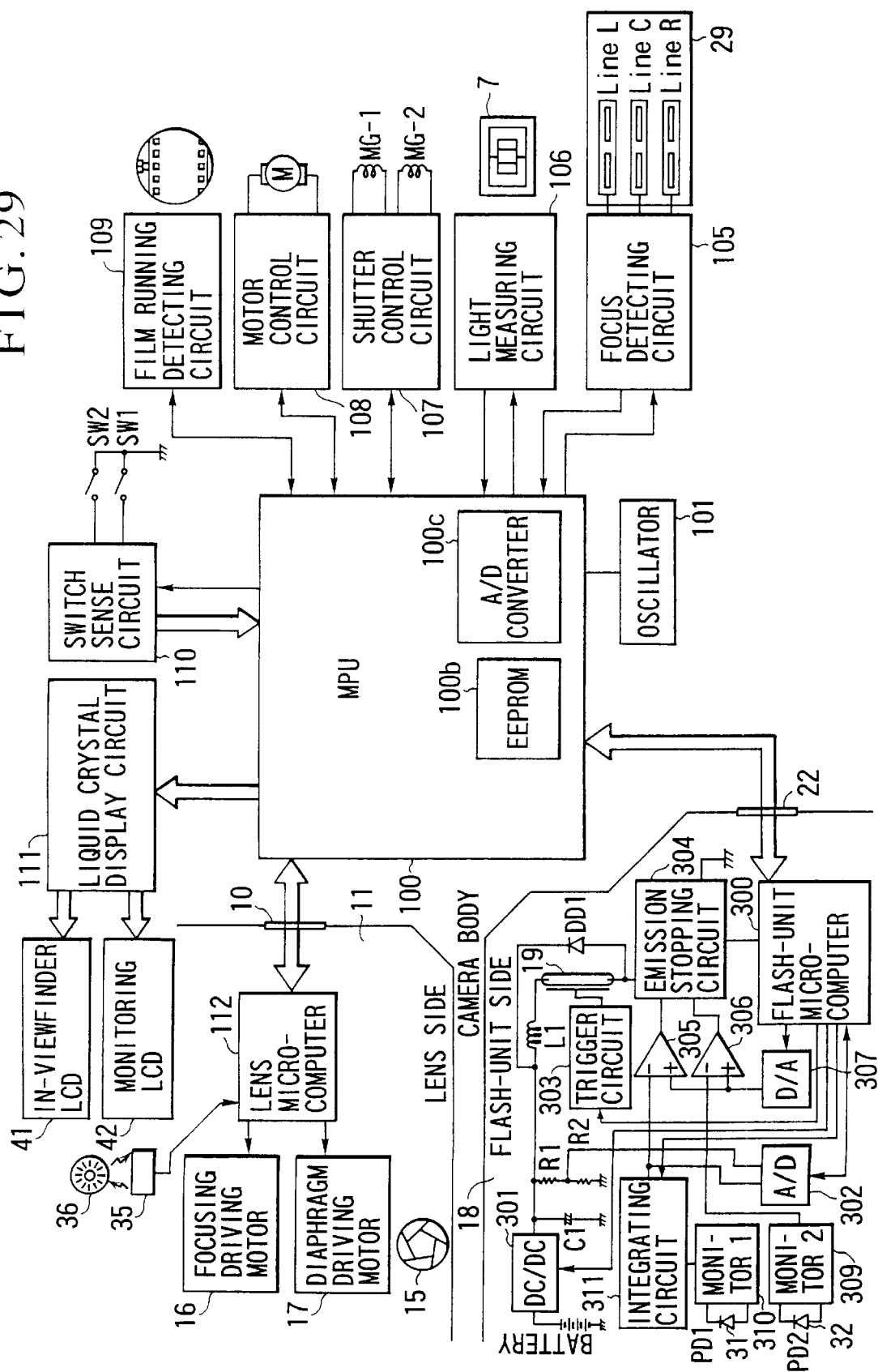
FIG. 29 is a block diagram showing the electrical circuit of the camera system shown in FIG. 28.

FIG. 29 is a block diagram showing the electrical circuit of the camera system of FIG. 28.

In FIG. 29, identical reference numerals are used to denote constituent elements identical to the corresponding elements shown in FIG. 26, and the description thereof is omitted for the sake of simplicity.

Referring to FIG. 29, the trigger circuit 303 outputs a trigger signal via the flash-unit microcomputer 300 in response to an instruction of the camera microcomputer 100 during an exposure operation, and causes the xenon tube 19 to generate a high voltage. Thus, the charge energy stored in the main capacitor C1 is discharged via the xenon tube 19 so that an emission of the flash unit 18 is started.

The emission stopping circuit 304 is turned on when the aforesaid trigger signal is outputted. After the emission of the flash unit 18 has been started, the emission stopping circuit 304 is turned off to stop the emission of the xenon tube 19, in response to the output of a comparator 305 or a comparator 306 and a signal from the flash-unit microcomputer 300.

The electrical circuit shown in FIG. 29 will be described below together with individual operations of the flash unit 18.

Preliminary Flat Emission (FP Emission)

The flash-unit microcomputer 300 sets a predetermined value in a D/A converter 307. At this time, since the xenon tube 19 has not yet started to emit light, a substantial amount of photoelectric current does not flow in the monitor sensor (PD2) 32 and a second monitor circuit 309 outputs a small-level signal to the inverting input terminal of the comparator 306, so that the comparator 306 outputs a high-level signal to the emission stopping circuit 304.

When a trigger signal is outputted, the xenon tube 19 starts an emission and the peak value of the emission immediately rises and the photoelectric current of the sensor (PD2) 32 increases, and the output of the second monitor circuit 309 rises and the output of the comparator 306 goes to its low level.

When the output of the comparator 306 goes to the low level, the emission stopping circuit 304 is activated to shut down the discharge loop of the xenon tube 19, but since a circulating current loop is formed by the diode DD1 and the coil L1, the peak value falls not instantaneously but gradually.

As the peak value falls, the photoelectric current of the sensor (PD2) 32 decreases, so that the output of the comparator 306 goes to the high level, and the discharge loop of the xenon tube 19 is formed and the peak value again starts to rise.

In this manner, the increase and the decrease in the peak value are repeated at intervals of a period shorter than the period required for the output of the comparator 306 to change between the low level and the high level, so that it is possible to realize control of the flat emission of continuing an emission while maintaining an approximately constant peak value.

The flat emission is brought to an end when the flash-unit microcomputer 300 outputs a signal directly to the emission stopping circuit 304.

The peak value of the flat emission can be controlled to become a desired value, by varying the operating point of the photoelectric current of the sensor (PD2) 32 by changing the digital value of the predetermined value to be applied to the D/A converter 307 and changing the level of a voltage to be applied to the non-inverting input terminal of the comparator 306. Similarly, the emission time of the flat emission can also be controlled to become a desired value.

Preliminary Emission and Integration

The preliminary emission is realized by performing the above-described flat emission for a predetermined time with a predetermined peak value.

During the preliminary emission, the monitor sensor (PD1) 31 measures the luminance of the light emitted from the xenon tube 19, and when the flash-unit microcomputer 300 instructs an integrating circuit 311 to start an integration, the integrating circuit 311 starts to integrate the preliminary emission in response to the output of a first monitor circuit 310. Incidentally, although the output of the comparator 305 to the inverting input terminal of which the output of the integrating circuit 311 is applied is inputted to the emission stopping circuit 304, the emission stopping circuit 304 is set to ignore such input, by a signal from the flash-unit microcomputer 300, so that the control of the above-described flat emission is prevented from being hindered.

When the preliminary emission of predetermined time comes to an end, the flash-unit microcomputer 300 causes the A/D converter 302 to perform A/D conversion of the preliminary emission integral value outputted from the integrating circuit 311 and reads the integral value as a digital value.

Main Emission Control

The camera microcomputer 100 obtains a correct integral value of the amount of emission of the main emission from a value such as the aforementioned preliminary emission integral value or a subject-reflected light luminance value supplied from the multiple divided light measuring sensor 7 during the preliminary emission, and sets the obtained correct integral value in the D/A converter 307 via the flash-unit microcomputer 300.

The camera microcomputer 100 initializes the integrating circuit 311 and causes the trigger circuit 303 to start an emission of the xenon tube 19.

The emission luminance of the xenon tube 19 which has been measured by the monitor sensor (PD1) 31 is integrated by the integrating circuit 311, and when the integral output of the integrating circuit 311 reaches the set correct integral value, the output of the comparator 305 is switched from high to low and the emission stopping circuit 304 stops the emission. Incidentally, during this time, the emission stopping circuit 304 is set to ignore the output of the comparator 306, by a signal supplied from the flash-unit microcomputer 300.

In this manner, the amount of emission of the main emission can be controlled to become the correct amount of emission obtained by the computation.

Figure 30:
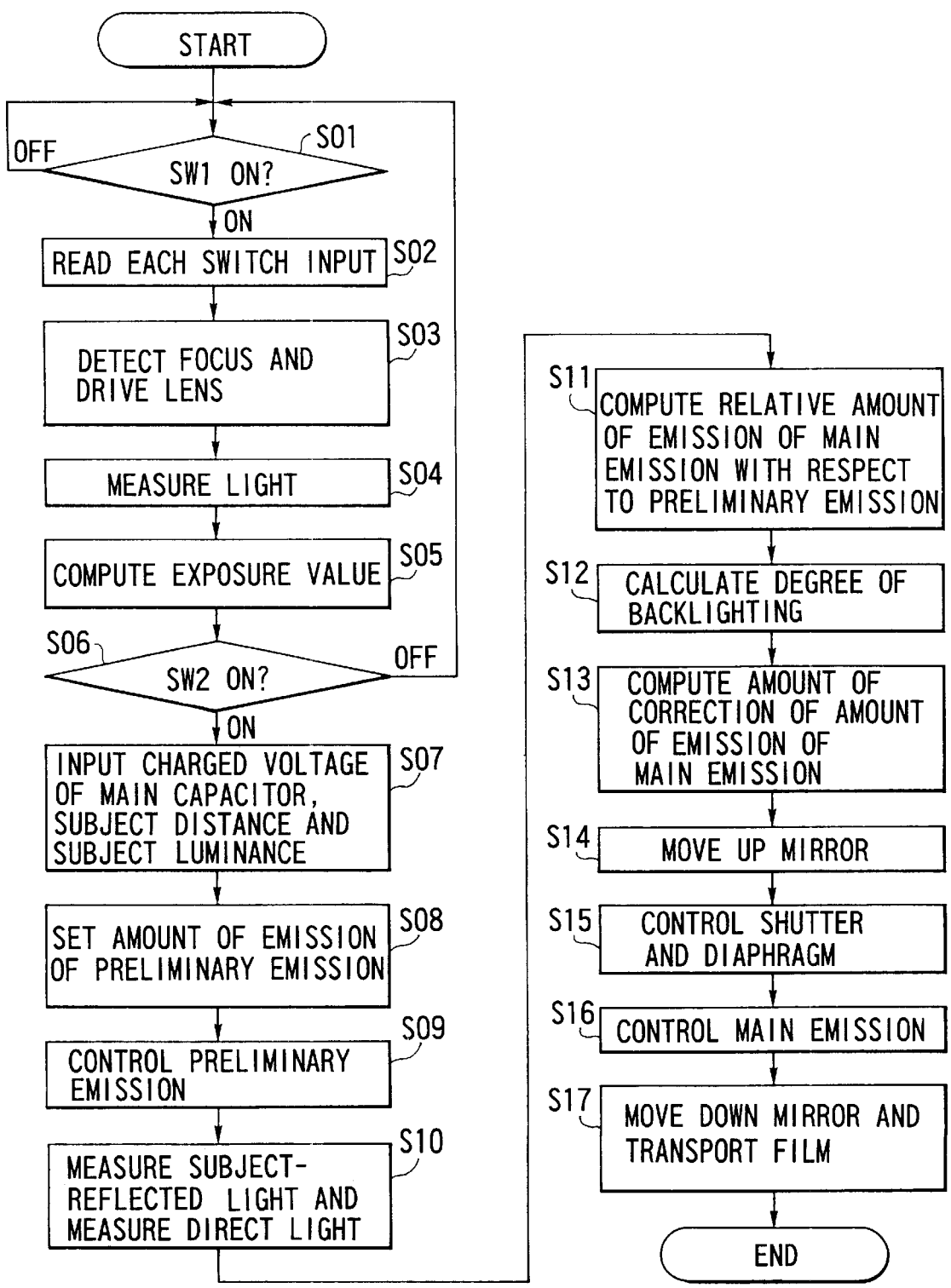
FIG. 30 is a flowchart showing the operation of the camera system shown in FIG. 29.
Figure 31:
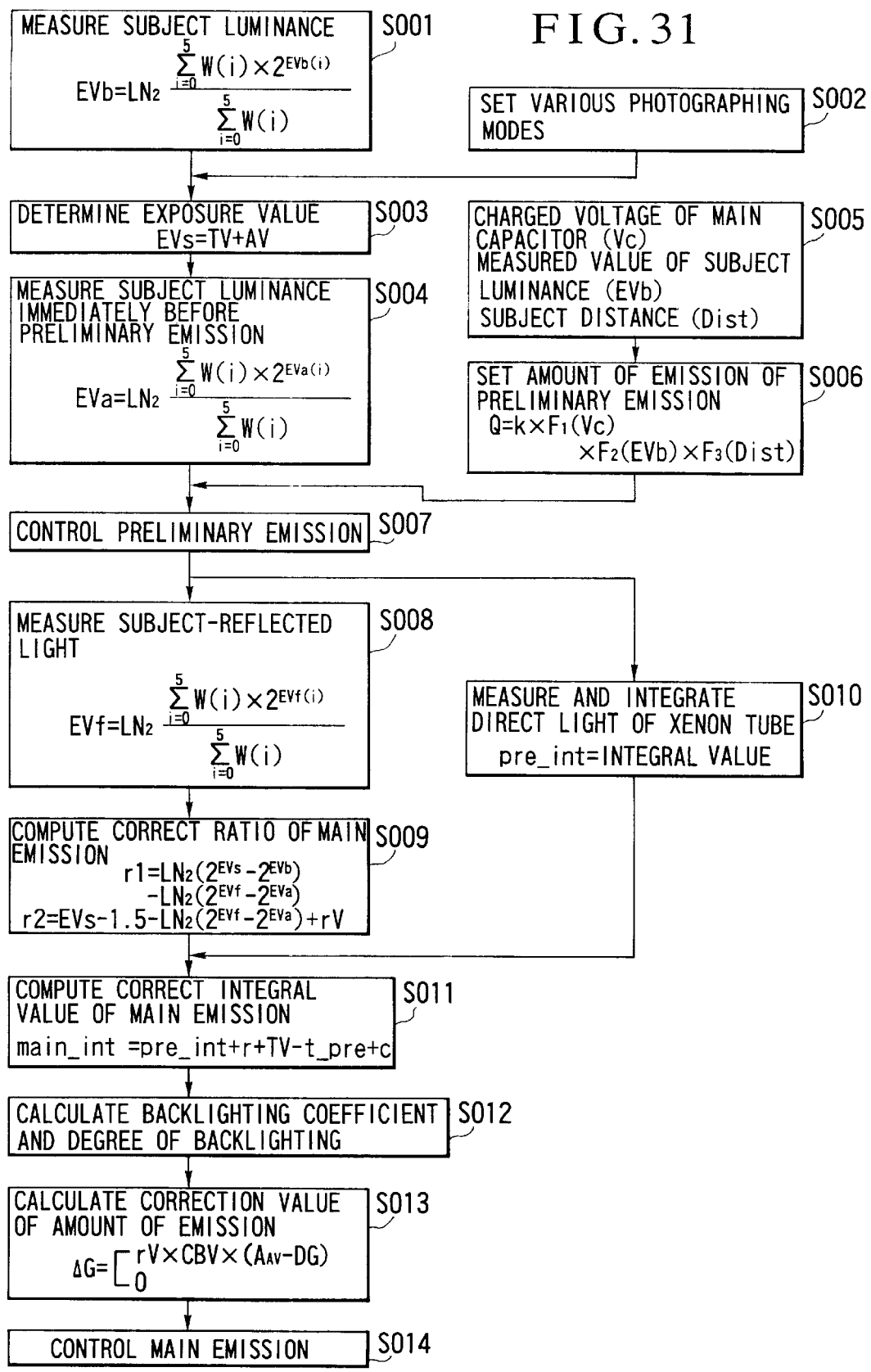
FIG. 31 is a flowchart showing the computation processing of the camera system shown in FIG. 29.

The operation of the camera system according to the above-described embodiment will be described below with reference to FIGS. 30 and 31. FIG. 30 is a flowchart aiding in mainly describing the operation of the camera microcomputer (MPU) 100, while FIG. 31 is a flowchart aiding in describing processing which constitutes the essential feature of the embodiment, and shows expressions associated with the processing.

In the flowchart shown in FIG. 30, when the operation of the camera system is started, the camera microcomputer (MPU) 100 detects the state of the first-stroke switch SW1 which is turned on when the shutter release button is pressed to the first stroke position (Step S01). The camera microcomputer (MPU) 100 repeats Step S01 until the on state of the first-stroke switch SW1 is detected, and if the on state of the first-stroke switch SW1 is detected, the camera microcomputer (MPU) 100 performs the next operation.

In Step S02, the camera microcomputer (MPU) 100 reads the states of individual operating switches (not shown) of the camera system through the switch sense circuit 110, and sets various photographing modes, such as a method of determining a shutter speed and a method of determining an aperture value.

Then, in Step S03, the camera microcomputer (MPU) 100 causes the focus detecting circuit 105 to perform a focus detecting operation using a known phase-difference detecting method, as described previously. The camera microcomputer (MPU) 100 controls the lens microcomputer 112 on the basis of the state of focus detected in the aforesaid focus detecting operation, and performs focus adjustment.

As described previously with reference to FIG. 2, three points for focus detection are provided on the image plane. Which of the three points at which subjects are respectively present is to be focused may be arbitrarily set by the photographer, or by using a known automatic selection algorithm based on the concept of nearest-point priority.

In Step S04, the camera microcomputer (MPU) 100 obtains the subject luminance values of the respective six areas provided in the image plane, through the light measuring circuit 106.

Then, in Step S05, the camera microcomputer (MPU) 100 determines the amount of exposure from the subject luminance values of the respective six areas by a known algorithm, and determines the value of a shutter speed and the value of an aperture in accordance with the photographing modes which have been set.

Then, in Step S06, the camera microcomputer (MPU) 100 determines whether the second-stroke switch SW2 to be turned on when the shutter release button is pressed to the second stroke position is on. If the second-stroke switch SW2 is off, the process returns to Step S01 and repeats the operation of Steps S01 to S06, whereas if the second-stroke switch SW2 is on, the process proceeds to Step S07.

In Step S07, the camera microcomputer (MPU) 100 obtains information indicative of the current charged voltage of the main capacitor C1 of the flash unit 18 through information transmission from the flash-unit microcomputer 300. The camera microcomputer (MPU) 100 also obtains information indicative of the absolute distance from the camera system to a subject through information transmission from the lens microcomputer 112, and obtains subject luminance information from the light measuring circuit 106.

In Step S08, the camera microcomputer (MPU) 100 determines the amount of emission of the preliminary emission on the basis of the obtained charged voltage information, absolute distance information and subject luminance information.

In Step S09, the camera microcomputer (MPU) 100 sends an instruction to the flash-unit microcomputer 300 so that the flash-unit microcomputer 300 controls the preliminary emission to make the amount of emission thereof equivalent to the determined amount of emission.

In Step S10, simultaneously with the preliminary emission, the camera microcomputer (MPU) 100 measures the light reflected from the subject, through the multiple divided light measuring sensor 7. More specifically, the camera microcomputer (MPU) 100 also measures the luminance of the subject through the multiple divided light measuring sensor 7 immediately before the start of emission of the preliminary emission. This measurement is intended to obtain a measured value of subject-reflected light which contains only the emission component of the preliminary emission, by subtracting the measured light value obtained immediately before the preliminary emission from the measured light value obtained during the preliminary emission.

While the preliminary emission is being performed, the flash-unit microcomputer 300 causes the monitor sensor (PD1) 31 to measure the direct light of the xenon tube 19, and then causes the integrating circuit 311 to integrate the measured light value supplied from the monitor sensor (PD1) 31. Upon completion of the preliminary emission, the flash-unit microcomputer 300 performs A/D conversion of the integral value of the integrating circuit 311 and obtains the digital integral value.

In Step S11, the camera microcomputer (MPU) 100 computes a correct integral value of the main emission from the measured light integral value of the preliminary emission, the measured light value of the subject-reflected light of the preliminary emission, the exposure value and the like.

In Step S12, the camera microcomputer (MPU) 100 obtains the subject luminance information from the light measuring circuit 106 and calculates the degree of backlighting which indicates how a main subject contrasts with a background.

In Step S13, the camera microcomputer (MPU) 100 computes the amount of correction of the amount of emission from the degree of backlighting obtained in Step S12.

In step S14, the camera microcomputer (MPU) 100 moves up the main mirror 2 and retracts the main mirror 2 from the photographic optical path together with the sub-mirror 25, prior to an exposure operation.

Then, in Step S1S, the camera microcomputer (MPU) 100 gives the lens microcomputer 112 an instruction to find an aperture value based on the determined amount of exposure, and drives the shutter control circuit 107 so that the shutter 8 can be controlled to run at the determined shutter speed.

In Step S16, the flash-unit microcomputer 300 is caused to control the main emission during the exposure operation in synchronism with the driving of the shutter 8. The main emission is controlled on the basis of the sum of the amount of correction obtained by the computation of Step S11 and the amount of correction obtained by the computation of Step S13.

When the exposure operation comes to an end in this manner, in Step S17, the camera microcomputer (MPU) 100 moves down the main mirror 2 and the like which have been retracted from the photographing optical path, thereby again obliquely inserting the main mirror 2 and the like into the photographing optical path. The camera microcomputer (MPU) 100 winds the film 9 by one frame by means of the motor control circuit 108 and the film running detecting circuit 109, and the operation of the flash photography camera system according to the aforesaid embodiment is completed.

The following description is made in connection with computing expressions for computing the amount of correct emission of the main emission and the amount of emission of the preliminary emission in the camera system according to the above-describe embodiment, as well as a flowchart of FIG. 31.

In Step S001 which corresponds to Step S04 of the flowchart of FIG. 30, the camera microcomputer (MPU) 100 measures the subject luminance values of the respective six areas under natural light through the light measuring circuit 106 and obtains a weighted average of the six subject luminance values:

$$EVb = LN_2 \frac{\sum_{i=0}^{5} W(i) \times 2^{EVb(i)}}{\sum_{i=0}^{5} W(i)}$$

where the weighting coefficient W(i) varies according to the kind of light measuring mode used in main-emission control and the states of distance measuring points selected for automatic focus detection. The weighting coefficient W(i) is set as shown in Table 2 by way of example.

TABLE 2

| | w (i) | | | | | | |
|---|---|---|---|---|---|---|---|
| | WEIGHTED LIGHT MEASUREMENT | | | PARTIAL LIGHT MEASUREMENT | | | DISTANCE ←MEASURING |
| i | P0 | P1 | P2 | P0 | P1 | P2 | POINT |
| 0 | 7 | 3 | 1 | 1 | 0 | 0 | |
| 1 | 3 | 7 | 3 | 0 | 1 | 0 | |
| 2 | 1 | 3 | 7 | 0 | 0 | 1 | |
| 3 | 3 | 1 | 1 | 0 | 0 | 0 | |
| 4 | 1 | 1 | 3 | 0 | 0 | 0 | |
| 5 | 1 | 1 | 1 | 0 | 0 | 0 | |

According to Table 2, if the light measuring mode used in the main-emission control is the weighted average light measurement mode, a weighted average of the luminance values obtained at the respective distance measuring points selected for automatic focus detection is computed. If the light measuring mode used in the main-emission control is the partial light measurement mode, a weighted average is computed in such a way that a luminance value relative to only an area which contains a selected distance measuring point is multiplied by the weighting coefficient and luminance values relative to the other areas are reset to "0", i.e., the subject luminance value EVb(i) relative to one area is obtained as EVb.

In the computation of the weighted average, the logarithmically compressed values EVb(i) of the luminance values relative to the respective areas are raised to the second power and expanded into antilogarithms, and a weighted average of the antilogarithms is calculated. The weighted average is finally logarithmically compressed with base 2.

The value EVb obtained by this computation is used in a main-emission correct ratio computation to be performed in Step S009 in the flowchart shown in FIG. 31 which will be described later.

In Step S002 which corresponds to Step S02 of the flowchart of FIG. 30, the photographer or the like intentionally inputs a photographing mode, such as a shutter speed priority mode or an aperture value priority mode, various control values and other associated data. In Step S003, an exposure value "EVs" consisting of a shutter speed "TV" and an aperture value "AV" is determined from the input photographing mode, the control values and EVb(i) of the subject luminances.

EVs=TV+AV

To determine this exposure value, the weighted average EVb obtained in Step S001 may be used, or a known divided measurement computation algorithm may also be used.

In Step S004 which corresponds to Step S10 of the flowchart of FIG. 30, subject luminances are measured immediately before the preliminary emission and a weighted average of the measured subject luminances is calculated.

$$EVa = LN_2 \frac{\sum_{i=0}^{5} W(i) \times 2^{EVa(i)}}{\sum_{i=0}^{5} W(i)}$$

The computing method is the same as Step S001. The reason why light measurement and a computation similar to those of Step S001 are performed will be described below.

Figure 34:
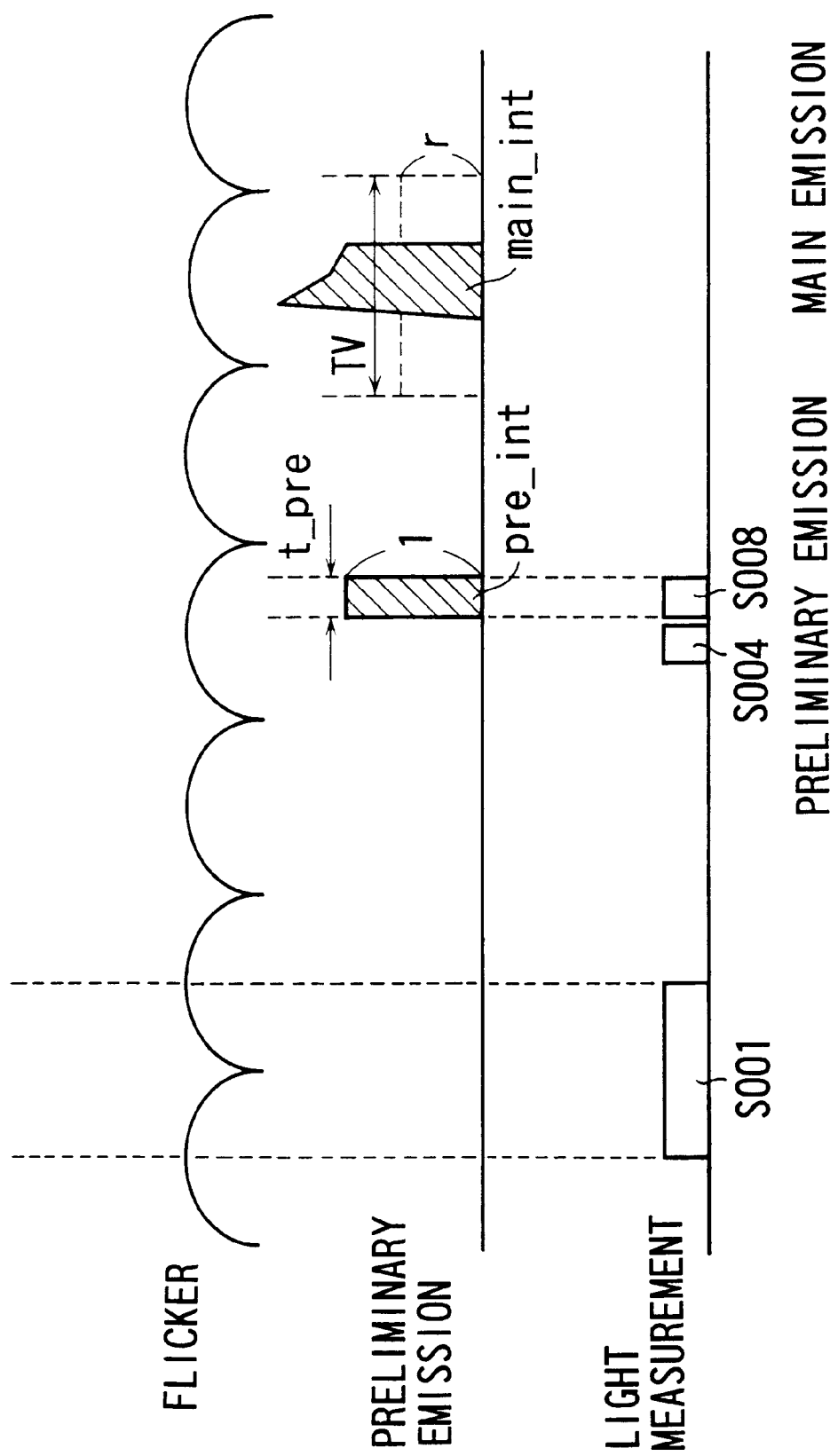
FIG. 34 is a timing chart showing the timing of each emission and light measurement.

There is a possibility that the photographer may change framing and the state of a subject may change at an intermediate time instant between the instant when the first-stroke switch SW1 is turned on and the instant when the second-stroke switch SW2 is turned on immediately before the start of an exposure operation. The succeeding preliminary emission and hence light measurement for the preliminary emission needs to be performed for a short time in order to prevent a waste of energy and to prevent a subject to be photographed from being dazzled by the preliminary emission. Accordingly, in the light measurement of Step S001, light measurement of comparatively long time is repeated and the obtained measured light values are averaged in order to reduce the influence of flicker as greatly as possible during photography under a light source, such as a fluorescent lamp, as shown in FIG. 34. However, the light measurement of Step S004 needs to be performed for a short time which is equal to the time required for light measurement to be performed during the succeeding preliminary emission, and at the possible shortest time interval between the light measurement of Step S004 and the light measurement of the preliminary emission.

The computed value EVa is used in the main-emission correct ratio computation (step S009) which will be described later, in order to compute subject-reflected light which contains only the reflected-light component of the preliminary emission.

Then, control of the preliminary emission is performed in Steps S007 which corresponds to Step S09 of FIG. 30. The amount of emission of the preliminary emission is determined in the sequence of Steps S005 and S006.

In Step S005 which corresponds to Step S07 of FIG. 30, a main-capacitor charged voltage Vc, subject luminance information EVb and subject distance information Dist are inputted, and in Step S006 which corresponds to Step S08 of FIG. 30, the amount of emission of the preliminary emission "Q" is computed.

$$Q = k \times F_1(Vc) \times F_2(EVb) \times F_3(Dist)$$

The functions $F_1$, $F_2$ and $F_3$ will be described below with reference to FIGS. 35(a) to 35(c).

Figure 35A:
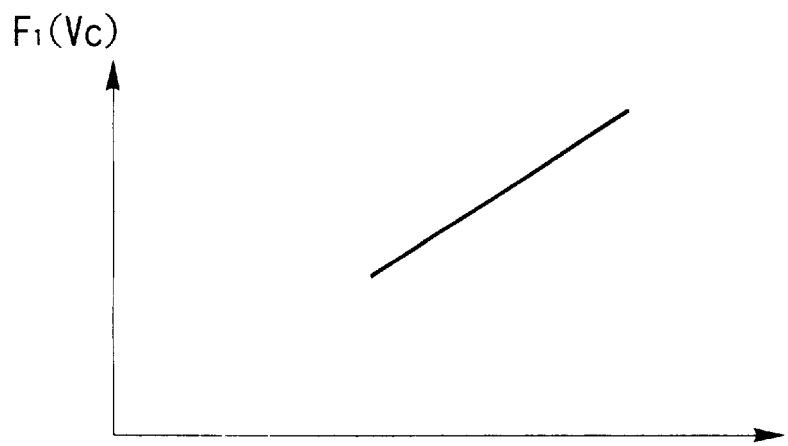
FIGS. 35(a), 35(b) and 35(c) are graphs of different functions for computing the amount of emission of preliminary emission.

FIG. 35(a) is a graph of the function $F_1$. As the main-capacitor charged voltage Vc becomes higher, the amount of emission of the preliminary emission "Q" is made larger. Although the larger the amount of emission of the preliminary emission "Q", the wider the dynamic range of light measurement of subject-reflected light, the function $F_1$ is intended to prevent the energy of the main emission from being consumed by the preliminary emission when the main-capacitor charged voltage Vc is low.

Figure 35B:
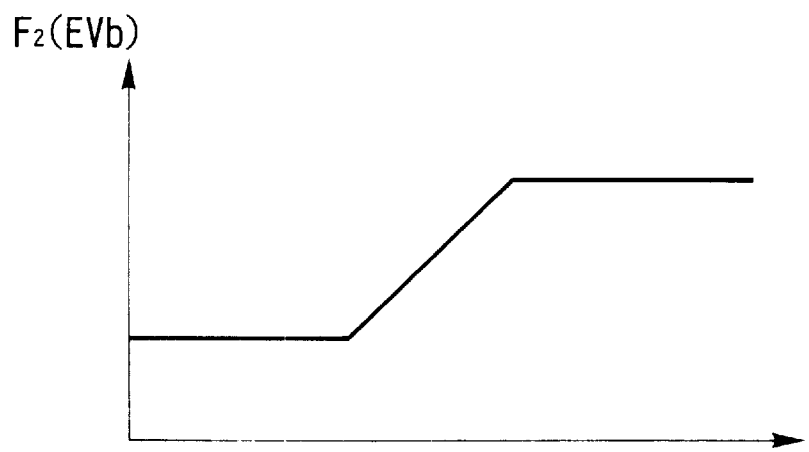

FIG. 35(b) is a graph of the function $F_2$. Since the subject-reflected light component of the preliminary emission might be concealed by a high subject luminance under natural light, the amount of emission of the preliminary emission needs to be made large. Contrarily, if the preliminary emission is carried out when the subject luminance is high under natural light, a subject to be photographed may be dazzled by a sudden emission. Accordingly, the amount of emission of the preliminary emission needs to be reduced. When the subject luminance is high or low to some extent, the amount of emission of the preliminary emission is kept constant, because the amount of emission of the preliminary emission is difficult to increase or decrease by hardware.

Figure 35C:
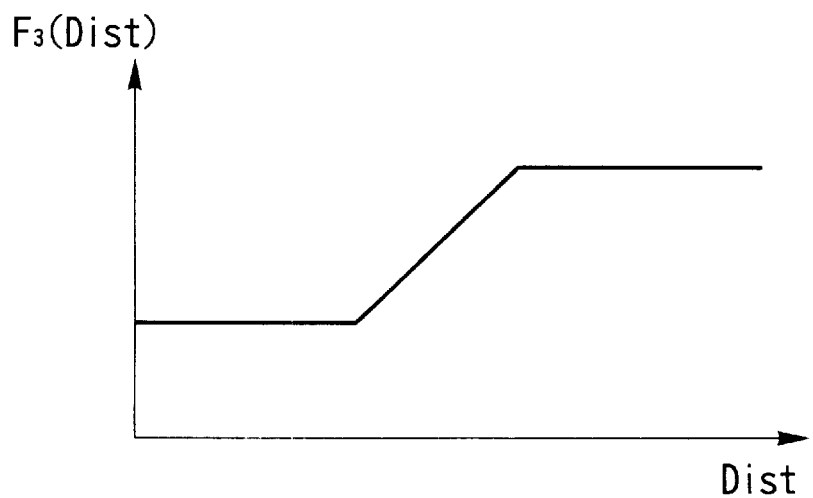

FIG. 35(c) is a graph of the function $F_3$. If the absolute distance from the camera to a subject to be photographed is close, since the subject is dazzled by the preliminary emission, the amount of emission of the preliminary emission needs to be reduced. Contrarily, if the absolute distance is far, since the preliminary emission does not reach a subject to be photographed and subject-reflected light cannot be measured, the amount of emission of the preliminary emission needs to be increased. When the absolute distance is far or close to some extent, the amount of emission of the preliminary emission is kept constant similarly to the case of the function $F_2$.

Specifically, the increase and the decrease in the amount of emission of the preliminary emission are controlled by a rise and a fall in the peak value of the flat emission.

In Step S008 which corresponds to Step S10 of the flowchart of FIG. 30, the subject-reflected light luminances of the preliminary emission are measured, and a weighted average of the measured luminances is obtained.

$$EVf = LN_2 \frac{\sum_{i=0}^{5} W(i) \times 2^{EVf(i)}}{\sum_{i=0}^{5} W(i)}$$

The timing is as shown in FIG. 34, and the weighted average is computed in a manner similar to used in Steps S001 and S004.

In Step S009 which corresponds to Step S11 of the flowchart of FIG. 30, the amount of correct emission of the main emission relative to the amount of emission of the preliminary emission is computed.

$$r1 = LN_2(2^{EVs} - 2^{EVb}) - LN_2(2^{EVf} - 2^{EVa}) \quad (A)$$

$$r2 = EV_S - 1.5 - LN_2(2^{EVf} - 2^{EVa}) + rV \quad (B)$$

In the first term of Expression (A), the exposure value "EVs" and the measured subject luminance value "EVb" are raised to the second power and expanded into antilogarithms, and the difference between the antilogarithms is calculated and is logarithmically compressed with base 2. In this computation, the amount of underexposure for subject luminance under natural light is computed. Specifically, the total amount of exposure of the subject is made correct in such a way as to obtain the amount of correct exposure by adding subject luminance under an emission of the flash unit 18 to subject luminance under natural light.

In the second term of Expression (A), similarly, the subject-reflected light luminance "EVf" obtained during the preliminary emission and the subject luminance "EVa" obtained immediately before the preliminary emission are raised to the second power and expanded into antilogarithms, and the difference between the antilogarithms is calculated, and is logarithmically compressed with base 2. This computation obtains the subject-reflected light luminance of only the preliminary emission, exclusive of the subject luminance under natural light.

The first term of Expression (B) represents that the value of the first term of the Expression (A) is not greater than "0", i.e., the exposure value "EVs" is less than the measured subject luminance value "EVb", i.e., a correct exposure can be obtained without the use of the flash unit 18. In this case, a desired emission level is set to the amount of emission equivalent to a 1.5-step underexposure level relative to a control value. The amount of emission equivalent to the 1.5-step underexposure level has been determined on the basis of the data obtained by actually taking pictures. The content of the second term of Expression (B) is identical to the content of the second term of Expression (A).

The third term of Expression (B) represents backlight correction, and the backlighting coefficient "rlt" shown in FIG. 32 is used as a parameter. If backlight is strong, correction is performed so that the amount of correction is increased toward an overexposure side. The amount of correction in backlight correction has been determined on the basis of the data obtained by actually taking pictures.

In either of Expressions (A) or (B), by subtracting the value of the second term from that of the first term, because of their compression computations, it is possible to obtain a ratio which indicates to what extent the amount of emission of the main emission is to be increased or decreased with respect to the amount of emission of the preliminary emission so that the total amount of exposure can be made correct.

After that, the larger value of the two values of r1 and r2 is selected as a control value. Although the larger value is selected as a control value, if EVs>EVf, the value of r1 is used, and if EVs≦EVf, the value of r2 is used.

Basically, if the subject luminance is greater than the control value, the value of r2 is used, whereas if the subject luminance is less than the control value, the value of r1 is used. However, in the case of backlight conditions, the control value varies depending on the correction value of the third term of Expression (B).

In Step S010 which corresponds to Step S10 of the flowchart of FIG. 30, an integral value of the measured light value of the direct light of the xenon tube 19 during the preliminary emission is set as a variable "pre_int". In Step S011 which corresponds to Step S11 of the flowchart of FIG. 30, a correct integral value of the main emission is computed:

$$main\_int = pre\_int + r + TV - t\_pre + c$$

where all the variables are compression variables.

The xenon tube 19 may be made to perform a flat emission while the shutter 8 is open, on the basis of a peak value equivalent to the value obtained by adding the ratio "r" obtained in Step S009 to the peak value of the preliminary emission. Since such peak value is converted into an integral value, a time factor of "the shutter time (TV)—the preliminary emission continuation time (t-pre)" may further be added to the peak value of the preliminary emission. FIG. 34 shows the manner of the computation performed in Step S011.

A method of finding the degree of backlighting will be described below with reference to FIG. 32.

First, the backlighting coefficient "rlt" is obtained from the output values of the respective sensor's light measuring areas. The backlighting coefficient "rlt" is a function which indicates how the degree of backlighting of the measured light value obtained at the distance measuring point determined in Step S03 is higher than the degree of backlighting of an average measured light value (an average value of the measured light values of the areas E0 to E5). As the value of the backlighting coefficient "rlt" becomes smaller, the contrast of a subject becomes higher and the degree of backlighting becomes higher. The backlighting coefficient "rlt" is expressed by the following expression:

$$rt1 = \sum_{j=0}^{5} A(j)/6 - A(i)$$

where A(i) represents the measured light value of the distance measuring point determined in Step S03, and A(0) to A(5) represent the measured light outputs obtained from the respective six light measuring areas E0 to E5 shown in FIG. 2.

The degree of backlighting, rV, which is calculated on the basis of this backlighting coefficient is expressed by the following expression, and the relationship between the backlighting coefficient "rlt" and the degree of backlighting "rV" is as shown in FIG. 32:

$$rV = \begin{cases} 1.5 & (rlt > 2) \\ rlt & (rdt \leq rlt \leq 2) \\ 0 & (rlt < rdt) \end{cases}$$

The units of the backlighting coefficient and the degree of backlighting are equivalent to those of the APEX system.

Figure 33:
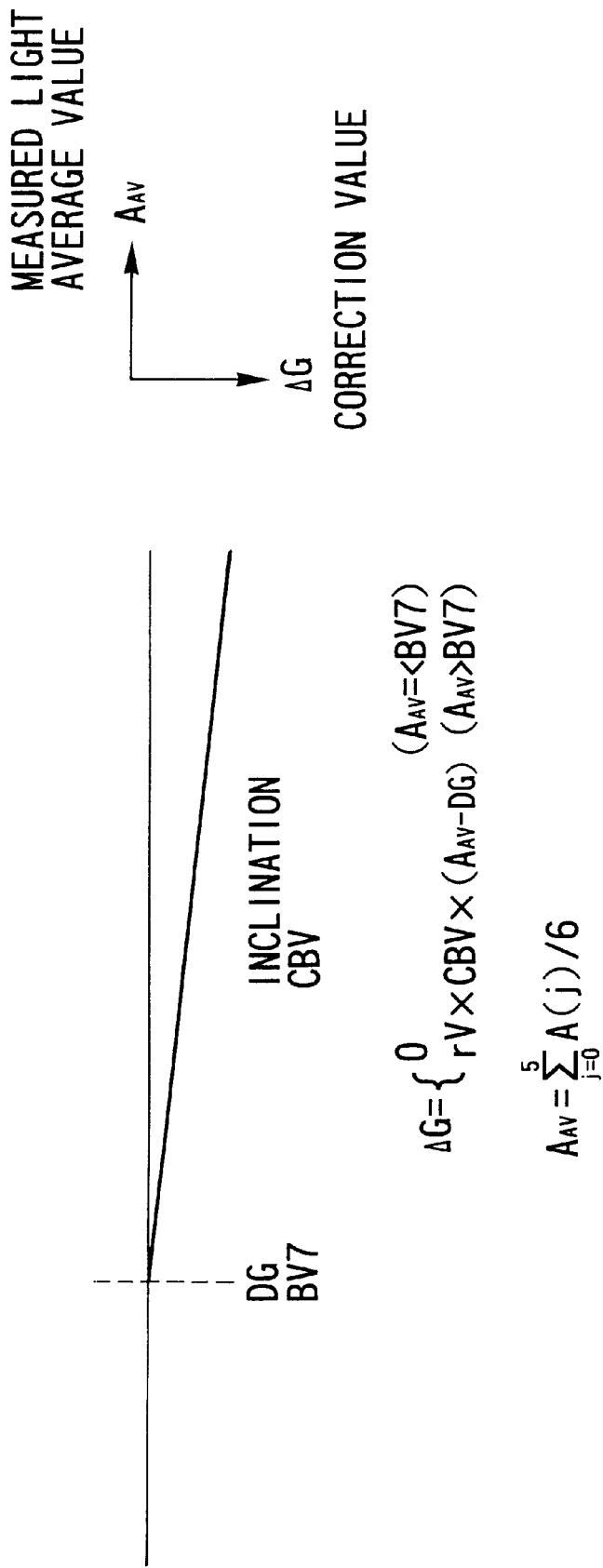
FIG. 33 is a view showing an expression for calculating the amount of correction of the amount of emission and a graph representing the expression.

A method of finding the correction value of the amount of emission will be described below with reference to FIG. 33.

The amount of correction, ΔG, of the amount of emission varies depending on the degree of backlighting and the luminance and is expressed by the following expression:

$$\Delta G = \begin{cases} 0 & (A_{AV} \leq BV7) \\ rV \times CBV \times (A_{AV} - DG) & (A_{AV} > BV7) \end{cases}$$

where $A_{AV}$ is a simple average value of measured light values. In other words, as the degree of backlighting becomes higher under higher-luminance conditions, the amount of correction ΔG becomes larger.

Finally, a correction coefficient, such as the amount of correction for flash control, which is set by the photographer, is added.

In Step S014 which corresponds to Step S14 of the flowchart of FIG. 30, the amount of emission of the main emission is controlled on the basis of the correct integral value of the main emission obtained through the computation.

Figure 36:
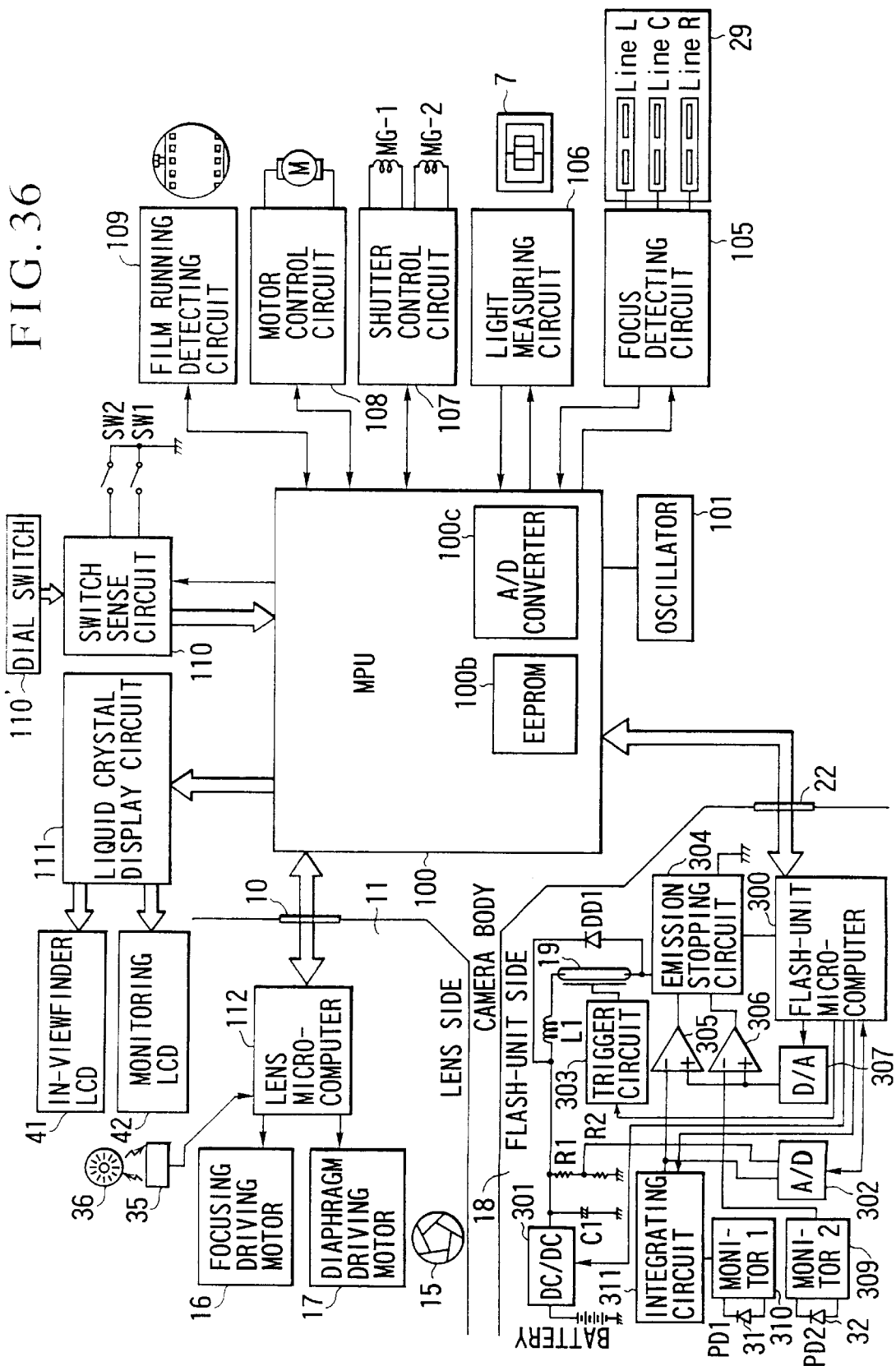
FIG. 36 is a block diagram showing the electrical circuit of a camera system according to another embodiment of the present invention.

FIG. 36 is a block diagram showing another embodiment of the present invention. The optical arrangement of a camera system according to this embodiment is identical to that shown in FIG. 28. In FIG. 36, identical reference numbers are used to denote constituent elements identical to the corresponding ones shown in FIG. 29. In FIG. 36, reference numeral 110' denotes a dial switch circuit for indicating the state of a dial switch, shown in FIG. 37, which corresponds to any of the setting positions of the dial switch. The switch sense circuit 110 reads the setting position of the dial switch through the dial switch circuit 110'.

The shown dial switch is used to selectively set the photographing modes. If the shown dial switch is set so that a position "L" is opposed to the mark shown as a triangle in FIG. 37, a lock mode for turning off the power supply of the camera system is set. Similarly, a position "P" is provided for setting a program mode in which the camera system determines a shutter speed and an aperture value according to a subject luminance, a position "Tv" is provided for setting a shutter speed priority AE mode in which the camera system determines an aperture value according to a subject luminance when a photographer himself/herself determines a shutter speed, a position "Av" is provided for setting an aperture priority AE mode in which the camera system determines a shutter speed according to a subject luminance when a photographer himself/herself determines an aperture value, a position "M" is provided for setting a manual mode in which a photographer himself/herself determines a shutter speed and an aperture value, a position "DEP" is provided for setting a depth-of-field priority AE mode in which when a photographer inputs a positional range to be focused, the camera system automatically sets an aperture value and a shutter speed.

In addition, a position "CF" is provided for setting a custom function setting mode, and a position "CAL" is provided for setting a visual line calibration mode.

Figure 37:
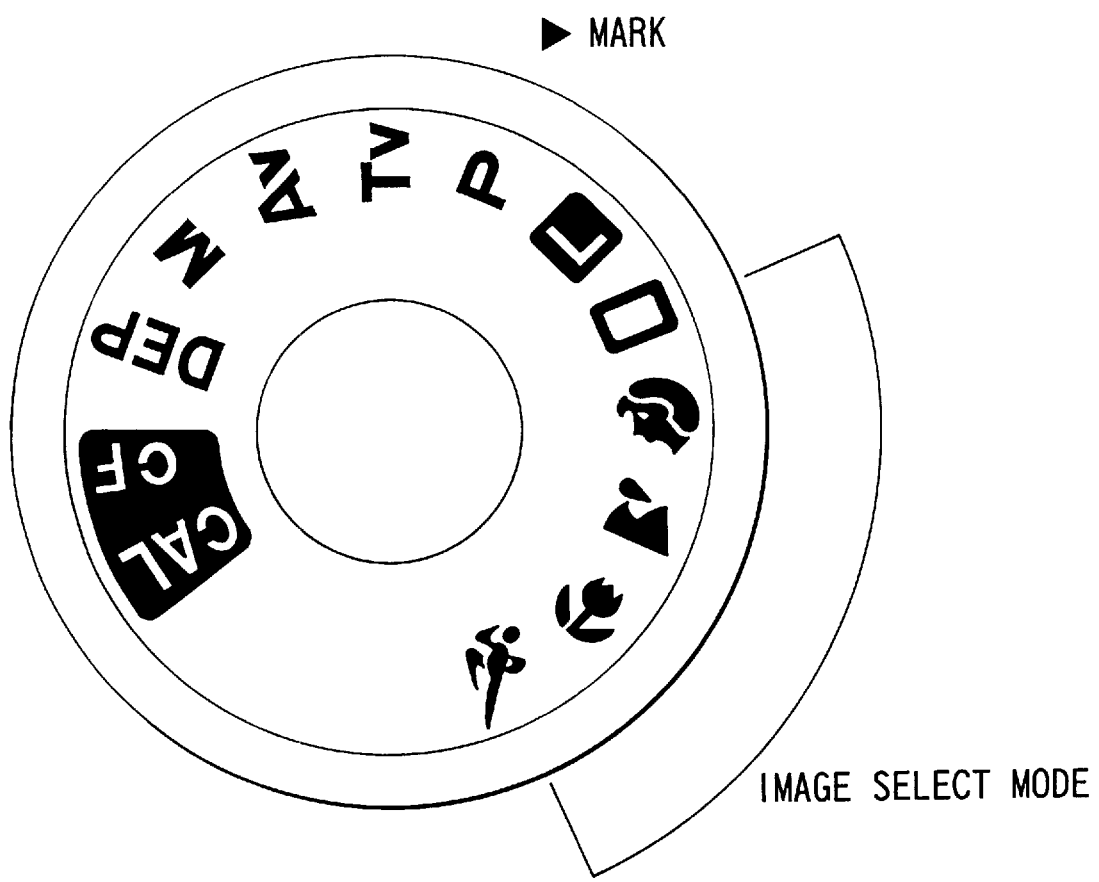
FIG. 37 is an explanatory view aiding in describing a mode setting dial of the camera system of FIG. 36.

The image select zone shown in FIG. 37 is provided for setting an image select mode in which the camera system performs exposure control so that even a beginner can easily enjoy photography. A full automatic mode, a portrait mode, a landscape mode, a close-up mode and a sports mode can be selectively set by the photographer rotating the dial switch from the "L" side, so that the photographer can take a photograph suited to a desired scene.

The operation of the camera microcomputer (MPU) 100 will be described below with reference to FIG. 38.

When the operation of the camera system is started, the process proceeds to Step S01, in which the camera microcomputer (MPU) 100 determines whether the switch SW1 is on. If the switch SW1 is off, the camera microcomputer (MPU) 100 repeats Step S01, and if the switch SW1 is on, the process proceeds to Step S02.

In Step S02, the camera microcomputer (MPU) 100 reads the states of the dial switch and other operating switches (not shown) of the camera system other than the switches SW1 and SW2, through the switch sense circuit 110, and sets various photographing modes, such as a method of determining a shutter speed and a method of determining an aperture value.

In Step S03, the camera microcomputer (MPU) 100 drives the focus detecting circuit 105 to perform a focus detecting operation using a known phase-difference detecting method in the manner described previously. The camera microcomputer (MPU) 100 also controls the lens microcomputer 112 to perform focus adjustment, on the basis of the state of focus detected in the focus detecting operation.

Three points for focus detection are provided on the image plane, as described previously with reference to FIG. 2. Which of the three points at which subjects are respectively present is to be focused may be arbitrarily determined by the photographer, or may be determined by executing a known automatic selection algorithm based on the concept of nearest-point priority.

In Step S04, the camera microcomputer (MPU) 100 obtains the subject luminance values of the respective six areas provided in the image plane, through the light measuring circuit 106.

In Step S05, the camera microcomputer (MPU) 100 determines the amount of exposure from the subject luminance values of the respective six areas by a known algorithm, and determines the value of a shutter speed and the value of an aperture in accordance with the photographing modes which have been set. During the program mode using the flash unit 18, the camera microcomputer (MPU) 100 sets a shutter speed and an aperture value according to a subject luminance on the basis of the program diagram shown in FIG. 40. This program diagram is dedicated to a 50-mm lens having a fully-open-aperture F number of 1.8, and if the subject luminance is high when the full automatic mode of the image select (IS) mode is selected, the highest shutter speed is limited to $\frac{1}{125}$ sec, as shown by a dashed line in FIG. 40.

In Step S06, the camera microcomputer (MPU) 100 determines whether the image select mode is selected. The image select mode includes light measuring modes which are symbolically displayed on the dial switch by using icons, as shown in FIG. 37. If the image select mode is selected, the camera system can set an optimum program diagram so that even a beginner can easily take a comparatively beautiful picture. If it is determined that the image select mode is selected, the process proceeds to Step S07, whereas if the image select mode is not selected, the process proceeds to Step S08.

Figures 40, 41:
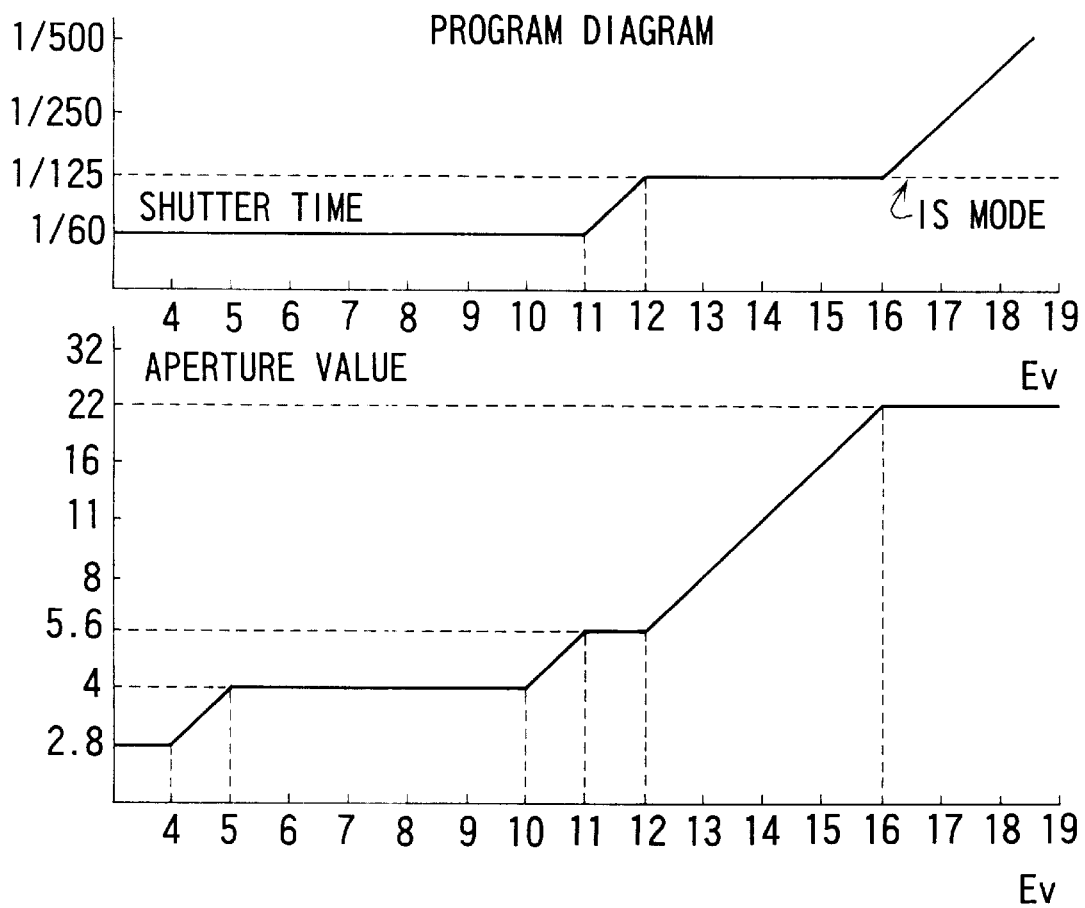
FIG. 40 is a program diagram of a camera body which constitutes the camera system according to the embodiment shown in FIG. 39.
FIG. 41 is an explanatory view showing the contents of an FP emission enable flag provided in an MPU inside the camera body which constitutes the camera system according to the embodiment shown in FIG. 39.

In Step S07, since the image select mode has been selected, the value of an FP emission enable Flag FP_ON provided in the camera microcomputer (MPU) 100 is reset to "0" to inhibit an FP emission. FIG. 41 is a table showing the contents of the FP emission enable Flag FP_ON. The value of the FP emission enable Flag FP_ON is set to "1" at all times, and even if the value of the FP emission enable Flag FP_ON is "0", the value is set to "1" upon completion of photography.

Then, in Step S08, the camera microcomputer (MPU) 100 determines whether the switch SW2 is on. If the switch SW2 is off, the process returns to Step S01 and repeats Steps S01 to S08. If the switch SW2 is on, the process proceeds to Step S09.

In Step S09, the camera microcomputer (MPU) 100 obtains information indicative of the current charged voltage of the main capacitor C1 of the flash unit 18 through information transmission from the flash-unit microcomputer 300. The camera microcomputer (MPU) 100 also obtains information indicative of the absolute distance from the camera system to a subject through information transmission from the lens microcomputer 112, and obtains subject luminance information from the light measuring circuit 106.

In Step S10, the camera microcomputer (MPU) 100 determines the amount of emission of the preliminary emission on the basis of the obtained charged voltage information, absolute distance information and subject luminance information.

In Step S11, the camera microcomputer (MPU) 100 sends an instruction to the flash-unit microcomputer 300 so that the flash-unit microcomputer 300 controls the preliminary emission of the flat emission to make the amount of emission of the preliminary emission equivalent to the determined amount of emission.

In Step S12, simultaneously with the preliminary emission, the camera microcomputer (MPU) 100 measures the light reflected from the subject, through the multiple divided light measuring sensor 7. More specifically, the, camera microcomputer (MPU) 100 also measures the luminance of the subject through the multiple divided light measuring sensor 7 immediately before the start of emission of the preliminary emission. This measurement is intended to obtain a measured value of subject-reflected light which contains only the emission component of the preliminary emission, by subtracting the measured light value obtained immediately before the preliminary emission from the measured light value obtained during the preliminary emission.

While the preliminary emission is being performed, the flash-unit microcomputer 300 causes the monitor sensor (PD1) 31 to measure the direct light of the xenon tube 19, and then causes the integrating circuit 311 to integrate the measured light value supplied from the monitor sensor (PD1) 31. Upon completion of the preliminary emission, the flash-unit microcomputer 300 performs A/D conversion of the integral value of the integrating circuit 311 and obtains the digital integral value.

In Step S13, the camera microcomputer (MPU) 100 computes a correct integral value of the main emission from the measured light integral value of the preliminary emission, the measured light value of the subject-reflected light of the preliminary emission, the exposure value and the like. The processing of Step S13 is the same as that described previously in connection with each of the aforesaid embodiments.

In Step S14, the camera microcomputer (MPU) 100 moves up the main mirror 2 and retracts the main mirror 2 from the photographic optical path together with the sub-mirror 25, prior to an exposure operation.

Then, in Step S15, the camera microcomputer (MPU) 100 gives the lens microcomputer 112 an instruction to find an aperture value based on the determined amount of exposure, and drives the shutter control circuit 107 so that the shutter 8 can be controlled to run at the determined shutter speed.

In Step S16, the flash-unit microcomputer 300 is caused to control the main emission during the exposure operation in synchronism with the driving of the shutter 8. The main emission is controlled to become a main flat emission based on the amount of correction obtained by the computation of Step S13. This control is identical to that described previously in connection with each of the aforesaid embodiments, and the description thereof is omitted for the sake of simplicity.

If the FP emission enable Flag FP_ON is "0", the main flat emission is inhibited in Step S07 and a normal emission is performed in Step S16. Accordingly, it is possible to prevent occurrence of an underexposure even if the distance to a main subject is long or a larger aperture value is selected, so that even a photographer such as a beginner who selects the image select mode can perform photography without failure. Incidentally, the normal emission is controlled so that its amount of emission becomes equivalent to the amount of emission determined according to the computed value obtained in Step S13 and the amount of emission of the preliminary flat emission obtained in Step S12.

When the exposure operation comes to an end in this manner, in Step S17, the camera microcomputer (MPU) 100 moves down the main mirror 2 and the like which have been retracted from the photographing optical path, thereby again obliquely inserting the main mirror 2 and the like into the photographing optical path. The camera microcomputer (MPU) 100 winds the film 9 by one frame by means of the motor control circuit 108 and the film running detecting circuit 109, and the operation of the camera system is completed.

Figure 39:
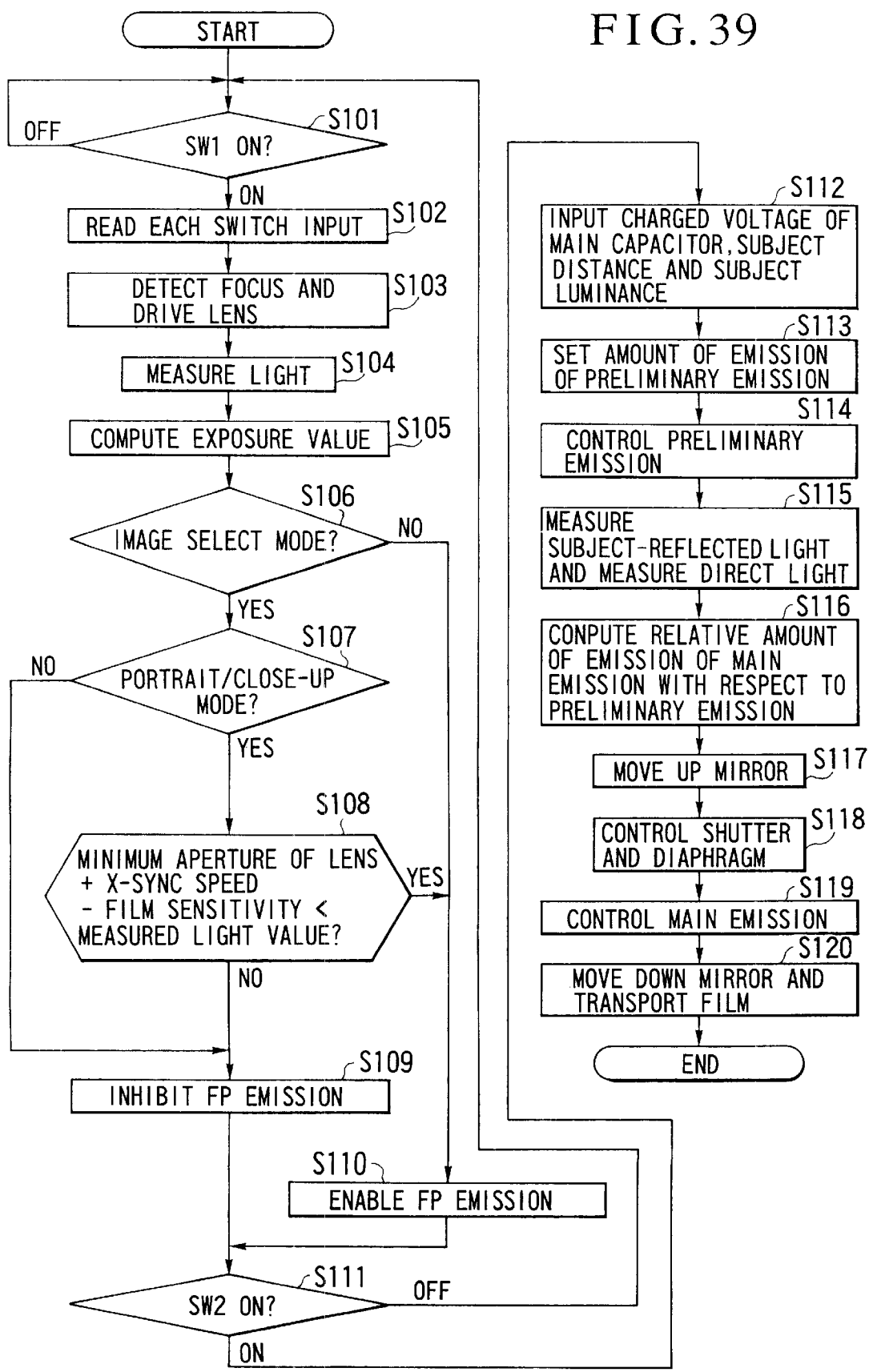
FIG. 39 is a control flowchart of a camera system according to another embodiment of the present invention.

FIG. 39 shows an operation flow of the camera microcomputer (MPU) 100 of another embodiment of the flash photography camera system according to the present invention.

Figure 38:
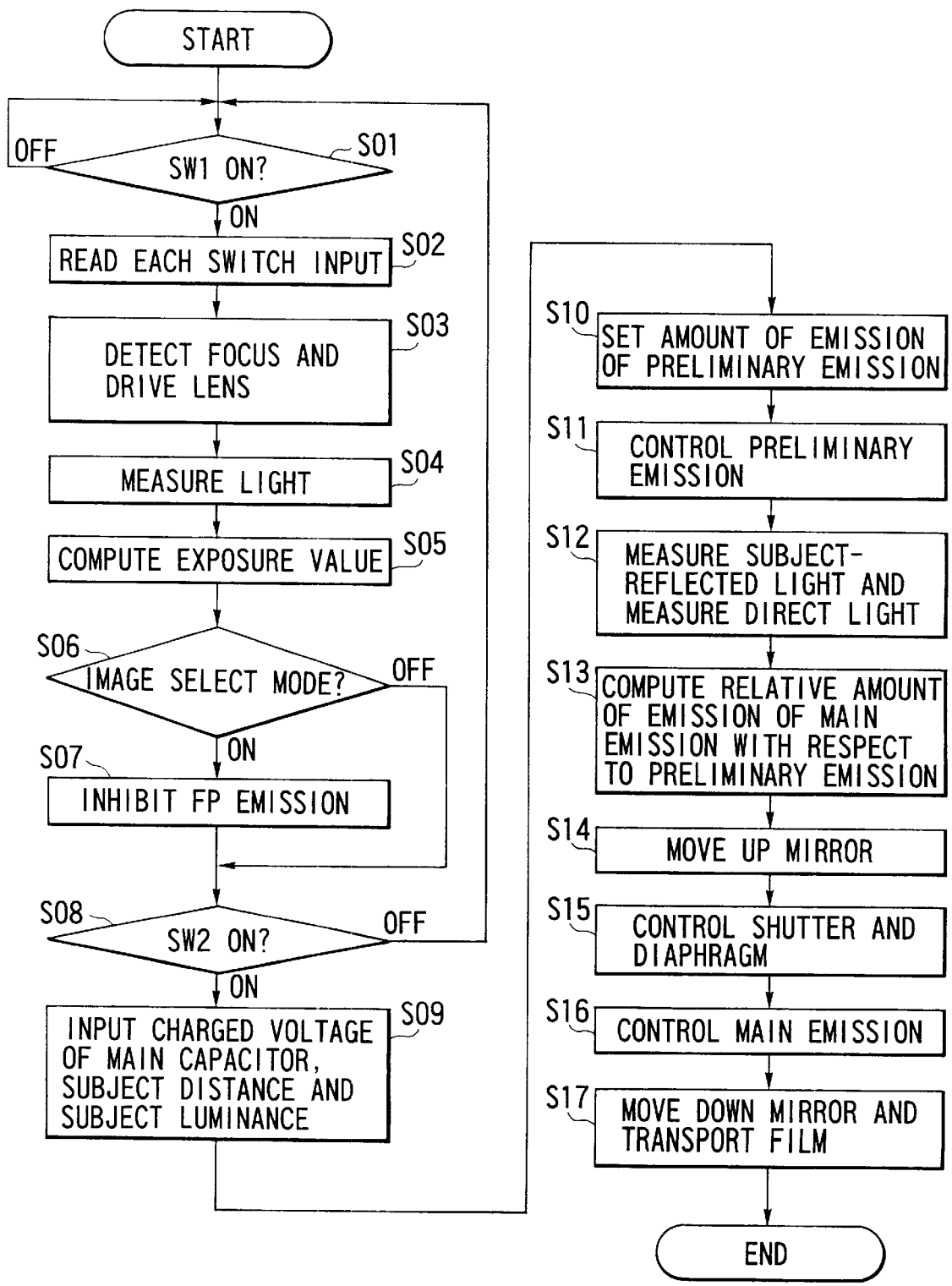
FIG. 38 is a control flowchart of the camera system shown in FIG. 36.

Although in the flowchart of FIG. 38 the main flat emission is inhibited when the image select mode is set, the flowchart of FIG. 39 is characterized in that even when the image select mode is set, the main flat emission is enabled if predetermined conditions are satisfied.

In the flowchart of FIG. 39, when the operation of the camera system is started, the process proceeds to Step S101, in which the camera microcomputer (MPU) 100 determines whether the switch SW1 is on. If the switch SW1 is off, the camera microcomputer (MPU) 100 repeats Step S101, and if the switch SW1 is on, the process proceeds to Step S102.

In Step S102, the camera microcomputer (MPU) 100 reads the states of the dial switch and other operating switches (not shown) of the camera system other than the switches SW1 and SW2, through the switch sense circuit 110, and sets various photographing modes, such as a method of determining a shutter speed and a method of determining an aperture value.

In Step S103, the camera microcomputer (MPU) 100 drives the focus detecting circuit 105 to perform a focus detecting operation using a known phase-difference detecting method in the manner described previously. The camera microcomputer (MPU) 100 also controls the lens microcomputer 112 to perform focus adjustment, on the basis of the state of focus detected in the focus detecting operation.

Three points for focus detection are provided on the image plane, as described previously with reference to FIG. 2. Which of the three points at which subjects are respectively present is to be focused may be arbitrarily determined by the photographer, or may be determined by executing a known automatic selection algorithm based on the concept of nearest-point priority.

In Step S104, the camera microcomputer (MPU) 100 obtains the subject luminance values of the respective six areas provided in the image plane, through the light measuring circuit 106.

In Step S105, the camera microcomputer (MPU) 100 determines the amount of exposure from the subject luminance values of the respective six areas by a known algorithm, and determines the value of a shutter speed and the value of an aperture in accordance with the photographing modes which have been set. During the program mode using the flash unit 18, the camera microcomputer (MPU) 100 sets a shutter speed and an aperture value according to a subject luminance on the basis of the program diagram shown in FIG. 40. This program diagram is dedicated to a 50-mm lens having a fully-open-aperture F number of 1.8, and if the subject luminance is high when the full automatic mode of the image select (IS) mode is selected, the highest shutter speed is limited to $\frac{1}{125}$ sec, as shown by a dashed line in FIG. 40.

In Step S106, the camera microcomputer (MPU) 100 determines whether the image select mode is selected. If the image select mode is selected, the process proceeds to Step S107, whereas if the image select mode is not selected, the process proceeds to Step S110.

In Step S107, the camera microcomputer (MPU) 100 determines whether the portrait mode or the close-up mode of the image select mode is selected. If neither of the portrait mode and the close-up mode is selected, the process proceeds to Step S109 in order to inhibit an FP emission. If either of the portrait mode and the close-up mode is selected, the process proceeds to Step S108.

In Step S108, the camera microcomputer (MPU) 100 determines whether the measured light value is greater than a predetermined value Evi. This EVi is expressed by the following expression:

$$EVi=\text{(maximum aperture value of lens)}+\text{(flash-synchronizing shutter speed of camera)}-\text{(film sensitivity)}$$

In this expression, each value is computed on the basis of the APEX system. For example, if a photographing lens system has a maximum aperture value of F22 and a camera body has a flash-synchronizing shutter speed of $\frac{1}{125}$ second and a film having a film sensitivity of ISO 100 is used, the value of EVi is EVi=9+7−5=11. If the measured light value (in this example, a Bv value) is greater than this value, it is determined that an FP emission is possible, and the process proceeds to Step S110. If the measured light value is not greater than the value of EVi, the process proceeds to Step S109.

In Step S109, if the image select mode has been selected, the value of the FP emission enable Flag FP_ON provided in the camera microcomputer (MPU) 100 is reset to "0" to inhibit the FP emission.

In Step S110, the value of the FP emission enable Flag FP_ON is set to "1", and the process proceeds to Step S111.

Then, in Step S111, the camera microcomputer (MPU) 100 determines whether the switch SW2 is on. If the switch SW2 is off, the process returns to Step S101 and repeats Steps S101 to S110. If the switch SW2 is on, the process proceeds to Step S112.

Steps S112 to S120 are identical to Steps S9 to S17 of FIG. 38, and the description thereof is omitted for the sake of simplicity.

If it is determined in the aforesaid step S108 that the measured light value is not greater than the predetermined value EVi, the main flat emission is inhibited (Step S119) and a normal emission is performed, so that occurrence of an underexposure is prevented. On the other hand, if it is determined in Step S108 that the measured light value is greater than the predetermined value EVi, the main flat emission is enabled so that flash photography is performed to prevent occurrence of an overexposure.

Figure 42:
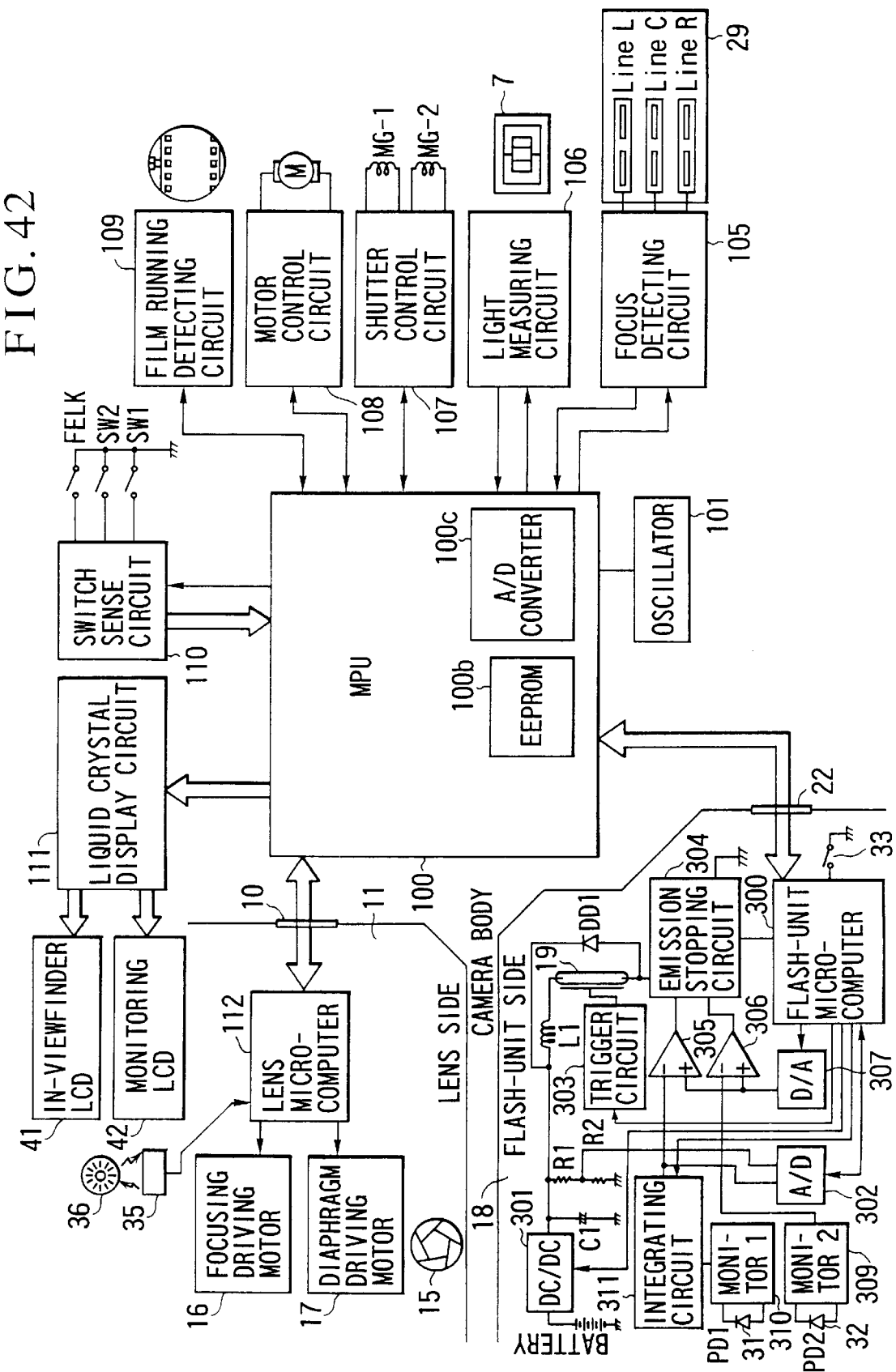
FIG. 42 is a block diagram of the electrical circuit of a camera system according to another embodiment of the present invention.

FIG. 42 is a block diagram showing another embodiment of the present invention. The optical arrangement of a camera system according to this embodiment is identical to that shown in FIG. 1. In FIG. 42, identical reference numbers are used to denote constituent elements identical to the corresponding ones shown in FIG. 29. In FIG. 42, reference numeral 33 denotes a switch for detecting the direction of an emission part during the execution of a bounce function, and symbol FELK denotes a switch to be turned on in response to an operation of an operating member (not shown).

The operation of the camera microcomputer (MPU) 100 of this embodiment will be described below with reference to FIGS. 43(a) and 43(b).

Figure 43A:
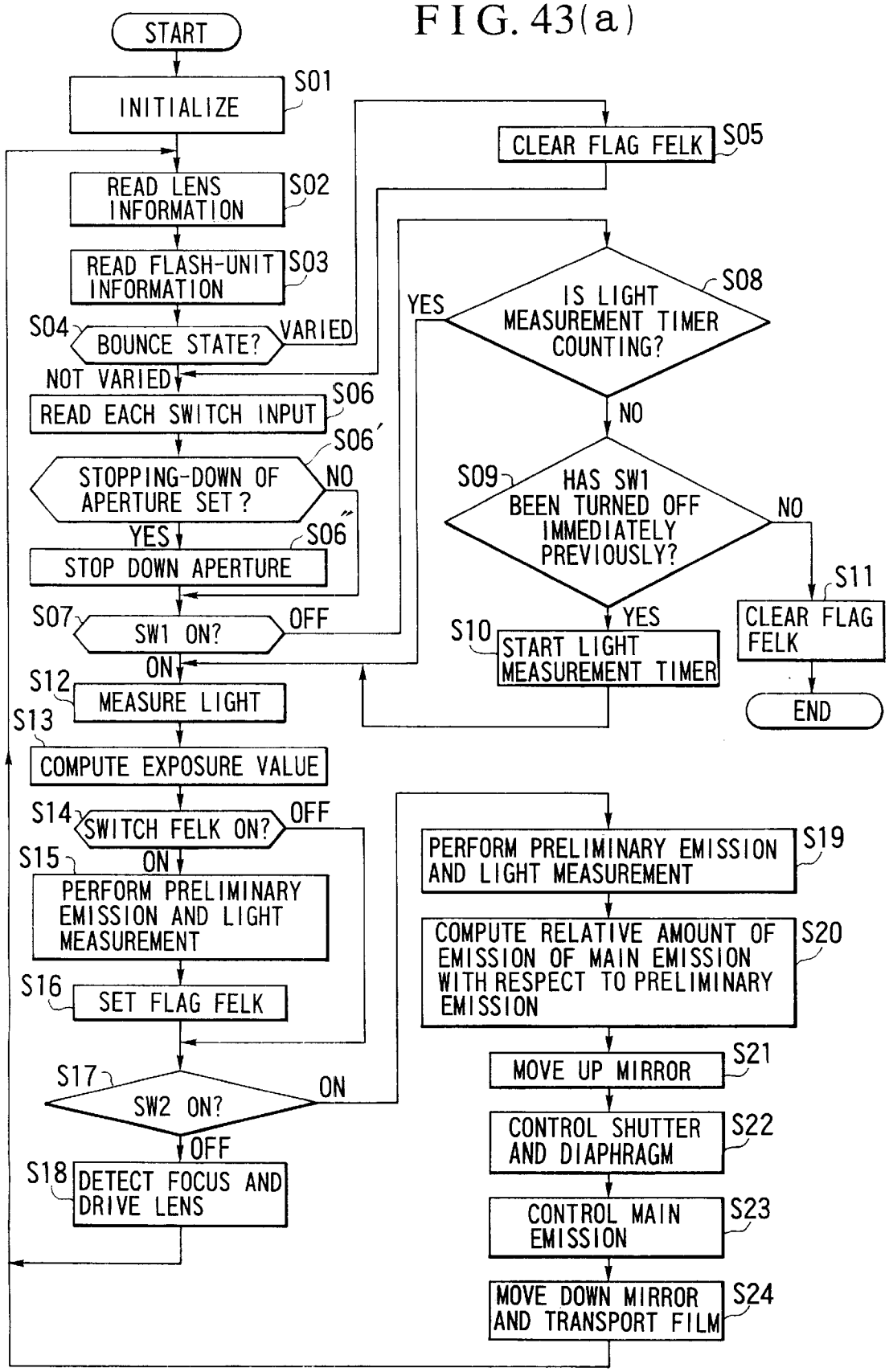
FIGS. 43(a) and 43(b) are control flowcharts of the camera system shown in FIG. 42.

Referring first to FIG. 43(a), when the operation of the camera system is started, the process proceeds to Step S01, in which the camera microcomputer (MPU) 100 initializes predetermined input/output ports and variables. In Step S02, the camera microcomputer (MPU) 100 reads lens information, such as focus information and full-open-aperture F number, from the lens barrel 11. In Step S03, the camera microcomputer (MPU) 100 reads flash-unit information, such as the guide number and the state of the flash unit 18, from the flash unit 18.

Then, in Step S04, the camera microcomputer (MPU) 100 determines whether the direction of the flash unit 18 has been changed by the execution of the bounce function, on the basis of the output of the switch 33 which is contained in the flash-unit information. If the direction of the flash unit 18 has been changed, the process proceeds to Step S05, in which the flag FELK (FE lock) is cleared to zero, whereas if the direction of the flash unit 18 has not been changed, the process proceeds to Step S06.

In Step S06, the camera microcomputer (MPU) 100 reads the states of the dial switch and other operating switches (not shown) of the camera system other than the switches SW1 and SW2, through the switch sense circuit 110, and sets various photographing modes, such as a method of determining a shutter speed and a method of determining an aperture value.

In Step S06', the camera microcomputer (MPU) 100 determines whether an aperture stopping-down switch (not shown) has been manually operated when the camera system is in the manual mode or in the aperture-priority mode. If the aperture stopping-down switch has been manually operated to cause the camera system to come into an aperture stopping-down mode, the process proceeds to step S0611, in which the aperture size of the diaphragm 15 is reduced to an arbitrary aperture value which has previously been set in the manual mode or the aperture-priority mode.

In Step S07, the camera microcomputer (MPU) 100 determines whether the switch SW1 to be turned on at the first stroke of the shutter release button is on. If the switch SW1 is off, the process proceeds to Step S08, in which the camera microcomputer (MPU) 100 determines whether a light measuring timer (a timer for counting time so that light measurement can be continued for approximately 6 seconds after the switch SW1 is turned off) is performing its counting operation. If the light measuring timer is performing the counting operation, the process proceeds to Step S12, whereas if the light measuring timer completes the counting operation, the process proceeds to Step S09.

In Step S09, the camera microcomputer (MPU) 100 determines whether the switch SW1 has just been turned off. If the switch SW1 has not just been turned off, the process proceeds to Step S11, in which the flag FELK is cleared, and the flowchart is brought to an end. On the other hand, if the switch SW1 has just been turned off, the process proceeds to Step S10, in which the light measuring timer is made to start the counting operation, and the process proceeds to Step S12.

In Step S12, the camera microcomputer (MPU) 100 obtains the subject luminance values of the respective six areas provided in the image plane, through the light measuring circuit 106.

In Step S13, the camera microcomputer (MPU) 100 determines the amount of exposure from the subject luminance values of the respective six areas by a known algorithm, and determines the value of a shutter speed and the value of an aperture in accordance with the photographing modes which have been set.

In Step S14, the camera microcomputer (MPU) 100 determines whether the flag FELK is on. If the flag FELK is off, the process proceeds to Step S18, whereas if the flag FELK is on, the process proceeds to Step S15.

In Step S15, the camera microcomputer (MPU) 100 executes a preliminary emission and performs light measurement. The content of this processing will be described later.

In Step S16, the flag FELK is set to "1".

In Step S17, the camera microcomputer (MPU) 100 determines whether the switch Sw2 to be turned on at the second stroke of the shutter release button is on. If the switch SW2 is off, the process proceeds to Step S18, in which the camera microcomputer (MPU) 100 drives the focus detecting circuit 105 to perform a focus detecting operation using a known phase-difference detecting method in the manner described previously. The camera microcomputer (MPU) 100 also controls the lens microcomputer 112 to perform focus adjustment, on the basis of the state of focus detected in the focus detecting operation.

Three points for focus detection are provided on the image plane, as described previously with reference to FIG. 2. Which of the three points at which subjects are respectively present is to be focused may be arbitrarily determined by the photographer, or may be determined by executing a known automatic selection algorithm based on the concept of nearest-point priority.

The process returns from Step S18 to Step S02, and as long as the switch SW1 is on or the light measuring timer is performing the counting operation, the camera microcomputer (MPU) 100 repeats Step S02 to Step S18.

If it is determined in Step S17 that the switch SW2 is on, the process proceeds to Step S19.

In Step S19, the camera microcomputer (MPU) 100 executes a preliminary emission and performs light measurement. The preliminary-emission and light-measurement processing subroutine executed in Step S19 is identical to that executed in Step S15.

Figure 43B:
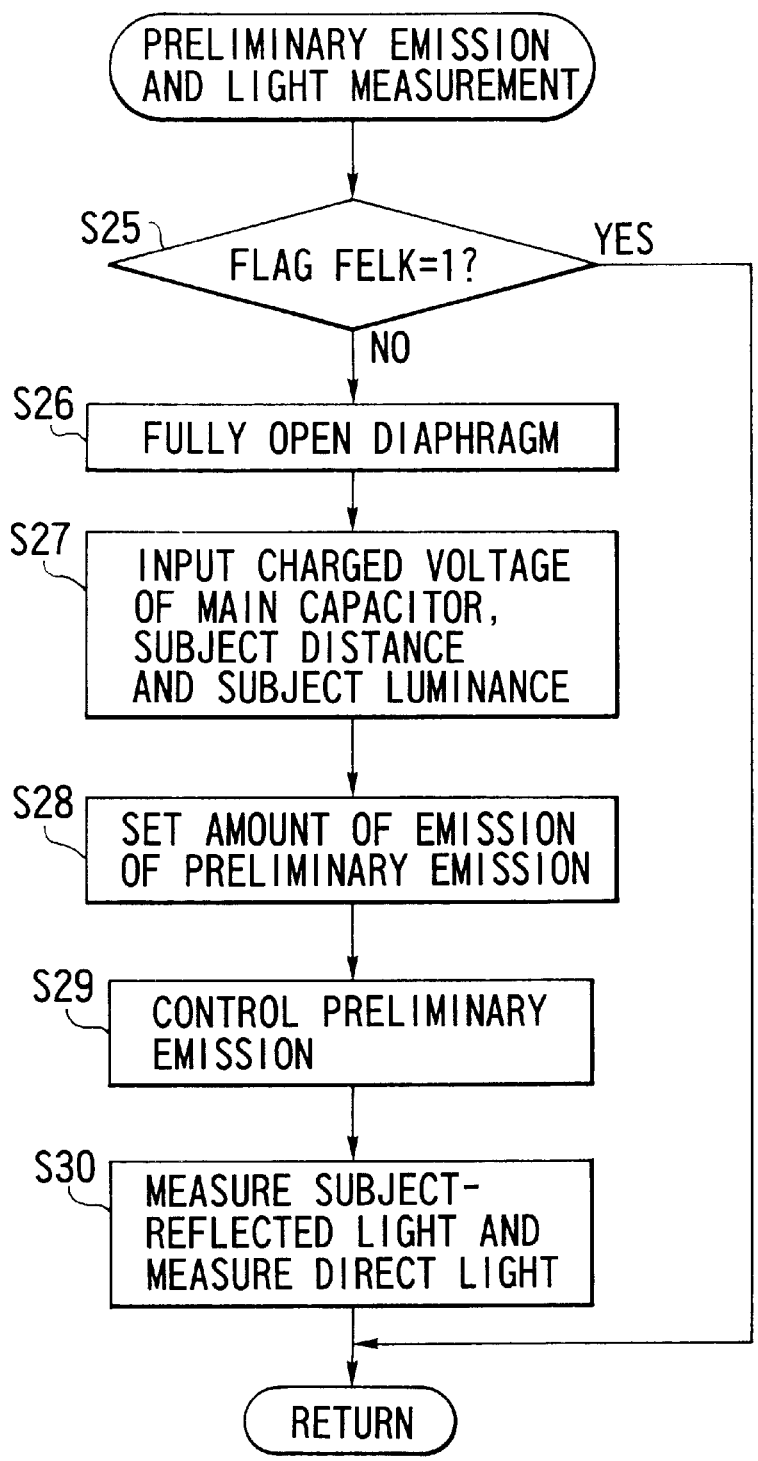

In Step S5 of the preliminary-emission and light-measurement processing subroutine shown in FIG. 43(b), it is determined whether the flag FELK is set. If the flag FELK is set, this subroutine is brought to an end, whereas if the flag FELK is not set, the process proceeds to Step S26, in which the processing of fully opening the aperture of the diaphragm 15 is executed, because the diaphragm of the lens system may be stopped down as a result of the execution of a function such as a depth-of-field confirmation function. By fully opening the aperture prior to the preliminary emission in this manner, it is possible to perform a later preliminary emission light measurement through accurate and simple computations.

In Step S27, the camera microcomputer (MPU) 100 obtains information indicative of the current charged voltage of the main capacitor C1 of the flash unit 18 through information transmission from the flash-unit microcomputer 300. The camera microcomputer (MPU) 100 also obtains information indicative of the absolute distance from the camera system to a subject through information transmission from the lens microcomputer 112, and obtains subject luminance information from the light measuring circuit 106.

In Step S28, the camera microcomputer (MPU) 100 determines the amount of emission of the preliminary emission on the basis of the obtained charged voltage information, absolute distance information and subject luminance information.

In step S29, the camera microcomputer (MPU) 100 sends an instruction to the flash-unit microcomputer 300 so that the flash-unit microcomputer 300 controls the preliminary emission of the flat emission to make the amount of emission of the preliminary emission equivalent to the determined amount of emission.

In Step S30, simultaneously with the preliminary emission, the camera microcomputer (MPU) 100 measures the light reflected from the subject, through the multiple divided light measuring sensor 7. More specifically, the camera microcomputer (MPU) 100 also measures the luminance of the subject through the multiple divided light measuring sensor 7 immediately before the start of emission of the preliminary emission, and obtains a measured value of subject-reflected light which contains only the emission component of the preliminary emission, by subtracting the measured light value obtained immediately before the preliminary emission from the measured light value obtained during the preliminary emission.

While the preliminary emission is being performed, the flash-unit microcomputer 300 causes the monitor sensor (PD1) 31 to measure the direct light of the xenon-tube 19, and then causes the integrating circuit 311 to integrate the measured light value supplied from the monitor sensor (PD1) 31. Upon completion of the preliminary emission, the flash-unit microcomputer 300 performs A/D conversion of the integral value of the integrating circuit 311 and obtains the digital integral value. Then, the camera microcomputer (MPU) 100 brings this subroutine to an end.

In Step S20 which belongs to the main flowchart shown in FIG. 43(a), the camera microcomputer (MPU) 100 computes a correct integral value of the main emission from the measured light integral value of the preliminary emission, the measured light value of the subject-reflected light of the preliminary emission, the exposure value and the like.

In Step S21, the camera microcomputer (MPU) 100 moves up the main mirror 2 and retracts the main mirror 2 from the photographic optical path together with the sub-mirror 25, prior to an exposure operation.

Then, in Step S22, the camera microcomputer (MPU) 100 gives the lens microcomputer 112 an instruction to find an aperture value based on the determined amount of exposure, and drives the shutter control circuit 107 so that the shutter 8 can be controlled to run at the determined shutter speed.

In Step S23, the flash-unit microcomputer 300 is caused to control the main emission of the flash unit 18 during the exposure operation in synchronism with the driving of the shutter 8. The main emission is restricted to the amount of emission obtained by the computation of Step S20.

When the exposure operation comes to an end in this manner, in Step S24, the camera microcomputer (MPU) 100 moves down the main mirror 2 and the like which have been retracted from the photographing optical path, and obliquely inserts the main mirror 2 and the like into the photographing optical path, and simultaneously executes the processing of fully opening the aperture of the diaphragm 15. The camera microcomputer (MPU) 100 winds the film 9 by one frame by means of the motor control circuit 108 and the film running detecting circuit 109, and returns to Step S02.

Incidentally, in this embodiment, if the flag FELK is not be operated, the aperture of the diaphragm 15 is fully opened and the preliminary emission and light measurement are performed immediately before the exposure operation, and after the amount of emission of the main emission (correct integral value) has been determined, the main emission and the exposure operation are performed. At this time, if the switch SW2 remains on, a continuous shooting is selected and the preliminary emission is performed immediately before each exposure cycle. The emission operation of performing the preliminary emission immediately before each exposure cycle is hereinafter referred to as the "batch emission mode".

If the flag FELK is turned on by operating an operating member (not shown), the aperture of the diaphragm 15 is fully opened independently of an exposure operation (i.e., before the operation of the shutter release button) and the preliminary emission and light measurement are performed to determine the amount of emission of the main emission (correct integral value). After that, if the switch SW2 is turned on, the main emission and the exposure operation are performed on the basis of the determined amount of emission. At this time, if the switch SW2 remains on, a continuous shooting is selected, but only the main emission is performed without performing the preliminary emission immediately before each exposure cycle, and all the amounts of emissions during the continuous shooting are controlled to become equal (i.e., to make the amount of emission of each of the second main emission et seqq. equal to the amount of emission of the first main emission). Incidentally, the operation of performing continuous shooting by using the measured light value of the first preliminary emission as a fixed value is hereinafter referred to as the "FE lock mode".

In addition, in this embodiment, as can be seen from Steps S04 and S05, if the direction of the flash unit 18 is changed by the execution of the bounce function after the flag FELK has been operated, the FE lock mode is cancelled the batch emission mode is set.

Incidentally, the timing of changing the FE lock mode to the batch emission mode is not limited to only when the direction of the flash unit 18 is changed, and the processing of changing the FE lock mode to the batch emission mode may be performed at the time of occurrence of a change in a photographic condition which affects exposure, such as an exchange of photographing lens systems or a change of photographing modes.

Figure 44:
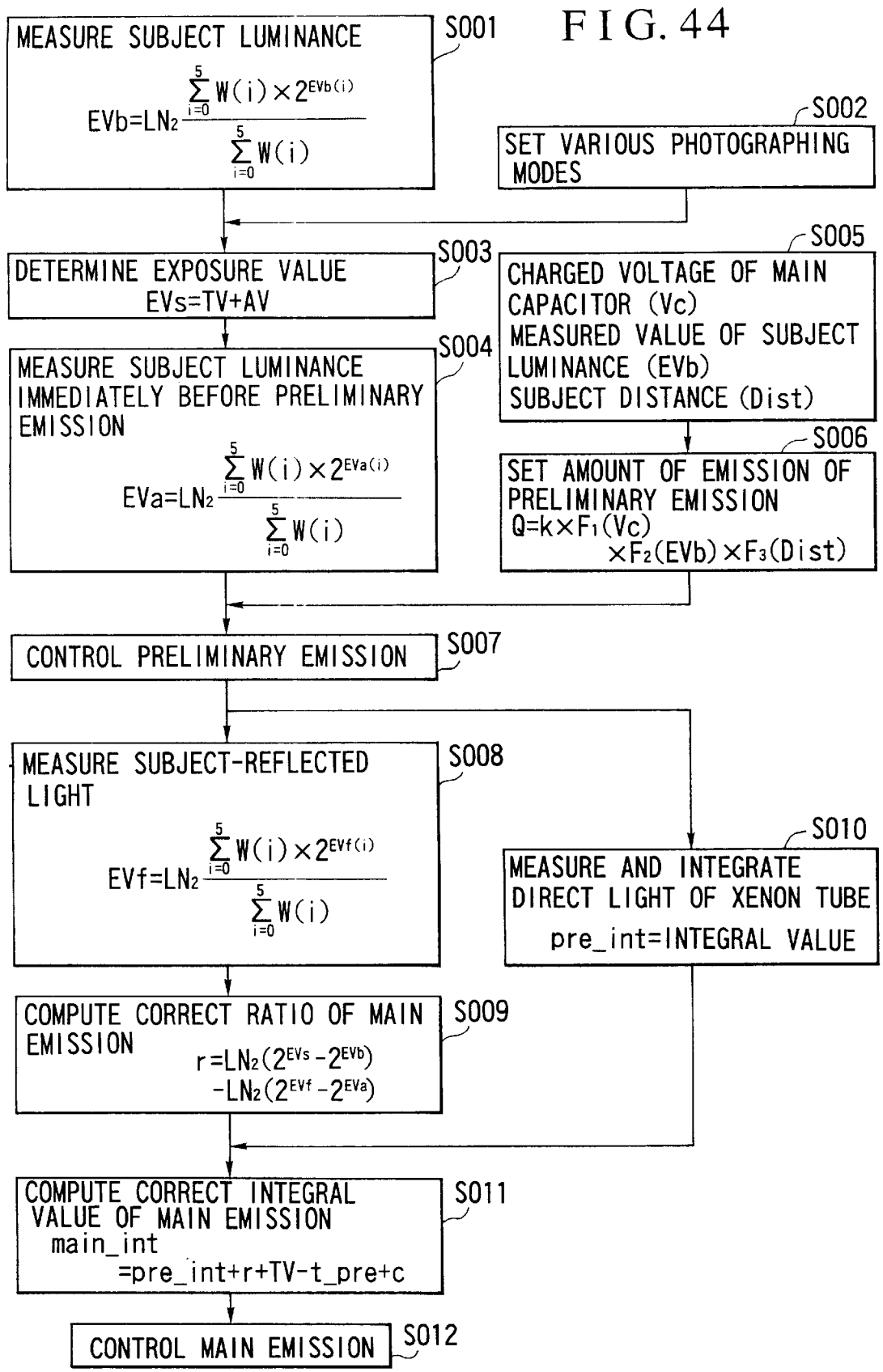
FIG. 44 is a control flowchart of the camera system shown in FIG. 42.
Figure 46A:
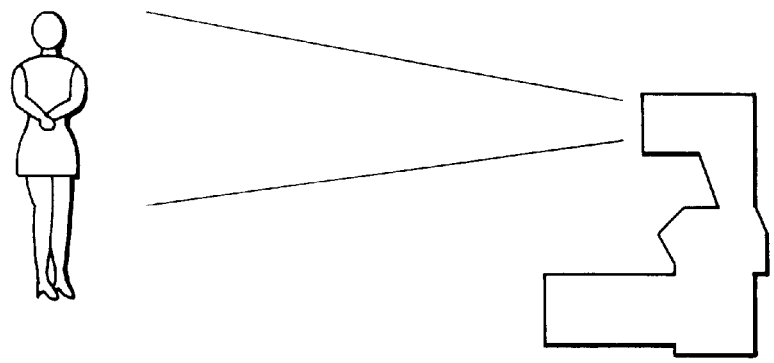
FIGS. 46(a) and 46(b) are explanatory views aiding in describing normal flash photography and bounce flash photography.
Figure 46B:
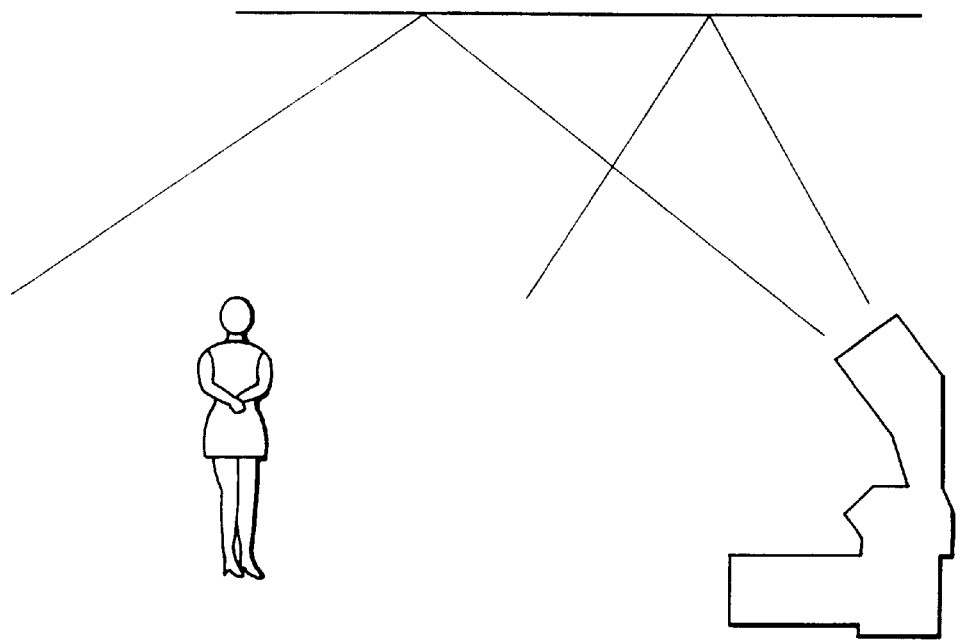

The following description is made in connection with computing expressions for computing the amount of correct emission of the main emission in the above-described camera system, as well as a flowchart of FIG. 44.

In Step S001 which corresponds to Step S12 of the flowchart of FIG. 43(a), the camera microcomputer (MPU) 100 measures the subject luminance values of the respective six areas under natural light through the light measuring circuit 106 and obtains a weighted average of the six subject luminance values. The weighting coefficient W(i) varies according to the kind of light measuring mode used in the control of the main emission of the flash unit 18 and the states of distance measuring points selected for automatic focus detection. The weighting coefficient W(i) is set as listed in the table shown in FIG. 45 by way of example. As can be seen from the table, if the light measuring mode used in the main-emission control is the weighted average light measurement mode, a weighted average of the luminance values obtained at the respective distance measuring points selected for automatic focus detection is computed. If the light measuring mode used in the main-emission control is the partial light measurement mode, a weighted average is computed in such a way that a luminance value relative to only an area which contains a selected distance measuring point is multiplied by the weighting coefficient and luminance values relative to the other areas are reset to "0", i.e., the subject luminance value EVb(i) relative to one area is obtained as EVb.

In the computation of the weighted average, the logarithmically compressed values EVb(i) of the luminance values relative to the respective light measuring areas are raised to the second power and expanded into antilogarithms, and a weighted average of the antilogarithms is calculated. The weighted average is finally logarithmically compressed with base 2.

The value EVb obtained by this computation is used in a main-emission correct ratio computation to be performed in Step S009 which will be described later.

In Step S002 which corresponds to Step S06 of the flowchart of FIG. 43(a), the photographer or the like intentionally inputs a photographing mode, such as a shutter speed priority mode or an aperture value priority mode, various control values and other associated data.

In Step S003, the exposure value "EVs" consisting of the shutter speed "TV" and the aperture value "AV" is determined from the input photographing mode, the control values and the subject luminance values EVb(i), by using the following expression (1):

$$EVs=TV+AV \qquad (1)$$

To determine the exposure value Evs, the weighted average EVb obtained in Step S001 may be used, or a known divided measurement computation algorithm may also be used.

In Step S004 which corresponds to Step S30 of the flowchart of FIG. 43(b), subject luminances are measured immediately before the preliminary emission and a weighted average of the measured subject luminances is calculated by using a computing expression similar to that shown in Step S001 of FIG. 44.

The reason why light measurement is again performed in Step S004 after the light measurement of Step S001 is that there is a possibility that the photographer may change framing or the like and the state of a subject may change at an intermediate time instant between the instant when the switch SW1 is turned on and the instant when the switch SW2 is turned on immediately before the start of an exposure operation.

However, in Step S004, the succeeding preliminary emission and hence light measurement for the preliminary emission needs to be performed for a short time in order to prevent a waste of energy and to prevent a subject to be photographed from being dazzled by the preliminary emission. Accordingly, in the light measurement of Step S001, light measurement of comparatively long time (for example, 10 ms) is repeated in order to reduce the influence of flicker as greatly as possible during photography under a light source, such as a fluorescent lamp, as shown in FIG. 34. However, the light measurement of Step S004 needs to be performed for a short time (for example, 1 ms or less) which is equal to the time required for light measurement to be performed during the succeeding preliminary emission (S008).

Incidentally, it is desirable to perform the light measurement of Step S004 and the light measurement of Step S008 temporally close to each other so that the light measurement conditions of both steps can be made as identical to each other as possible, except whether the flash unit 18 is made to emit light.

The computed value EVa is used in the main-emission correct ratio computation to be performed in Step S009 which will be described later.

Then, control of the preliminary emission is performed in Step S007 which corresponds to Step S29 of the flowchart of FIG. 43(b). The amount of emission of the preliminary emission is determined in the sequence of Steps S005 and S006 which respectively correspond to Steps S27 and S29 of the flowchart of FIG. 43(b).

In Step S005, the main-capacitor charged voltage Vc, the subject luminance information EVb and the subject distance information Dist of the main capacitor C1 are inputted, and in Step S006, the amount of emission of the preliminary emission "Q" is computed by using the following expression (2).

$$Q=k \times F_1(Vc) \times F_2(EVb) \times F_3(Dist) \qquad (2)$$

As shown in FIG. 35(a), the value of the function $F_1$ (Vc) is approximately proportional to the main-capacitor charged voltage Vc. Therefore, if the charged voltage Vc is high, the amount of emission of the preliminary emission "Q" is increased to widen the dynamic range of light measurement, whereas if the charged voltage Vc is low, the amount of emission of the preliminary emission "Q" is decreased to prevent a shortage of the energy of the main emission.

As shown in FIG. 35(b), the value of the function $F_2$ (EVb) is approximately proportional to the subject luminance EVb except when the subject luminance EVb is low or high to some extent. Therefore, if the subject luminance EVb is high under natural light, the amount of emission of the preliminary emission "Q" is made large, so that the subject-reflected light component of the preliminary emission is prevented from being concealed by a high subject luminance under natural light. Contrarily, if the subject luminance EVb is low, the amount of emission of the preliminary emission "Q" is made small, so that a subject to be photographed is prevented from being dazzled by the preliminary emission. When the subject luminance EVb is high or low to some extent, the value of the second function $F_2$ (EVb) is kept constant, because the amount of emission of the preliminary emission is difficult to increase or decrease by hardware.

As shown in FIG. 35(c), the value of the function $F_3$ (Dist) is approximately proportional to the subject distance Dist except when the subject distance Dist is close or far to some extent. Therefore, if the subject distance Dist is far, the amount of emission of the preliminary emission "Q" is made large, so that it is possible to prevent the problem that the light of the preliminary emission does not reach a subject and subject-reflected light cannot be obtained. Contrarily, if the subject distance Dist is close, the amount of emission of the preliminary emission "Q" is made small, so that a person who is a subject is prevented from being dazzled by the preliminary emission. When the subject distance Dist is close or far to some extent, the value of the third function $F_3$ (Dist) is kept constant for a reason similar to that mentioned above in the description of the second function $F_2$.

In Step S008 which corresponds to Step S30 of the flowchart of FIG. 43(b), the subject-reflected light luminances of the preliminary emission are measured at the timing shown in FIG. 34, and a weighted average of the measured luminances is obtained by the computing expression used in Steps S001 and S004.

In Step S009, the amount of correct emission of the main emission relative to the amount of emission of the preliminary emission is computed by using the following expression (3):

$$r1=LN_2(2^{EVs}-2^{EVb})-LN_2(2^{EVf}-2^{EVa}) \qquad (3)$$

In the first term of Expression (3), the exposure value "EVs" and the measured subject luminance value "EVb" are raised to the second power and expanded into antilogarithms, and the difference between the antilogarithms is calculated and is logarithmically compressed with base 2. In this computation, the amount of underexposure for subject luminance under natural light is computed. Specifically, the computation of the first term is performed in such a way as to obtain a correct amount of exposure by adding subject luminance under an emission of the flash unit 18 to subject luminance under natural light. In the second term of Expression (3), the exposure value "EVf" obtained during the preliminary emission and the measured subject luminance value "EVa" obtained immediately before the preliminary emission are raised to the second power and expanded into antilogarithms and the difference between the antilogarithms is calculated, and is logarithmically compressed with base 2. This computation can obtain the subject-reflected light luminance of only the preliminary emission, exclusive of the subject luminance under natural light.

By subtracting the value of the second term from that of the first term, it is possible to obtain the ratio "r" which indicates to what extent the amount of emission of the main emission is to be increased or decreased with respect to the amount of emission of the preliminary emission so that the total amount of exposure can be made correct.

In Step S010 which corresponds to Step S30 of the flowchart of FIG. 43(b), the integral value "pre_int" of the measured light value of the direct light of the xenon tube 19 during the preliminary emission is computed.

In Step S011, the correct integral value "main_int" of the main emission is computed by using the following expression (4):

$$\text{main\_int} = \text{pre\_int} + r + TV - t\_\text{pre} + c \quad (4)$$

where all the variables are logarithmically compressed numbers. As can be seen from Expression (4) and FIG. 34, the amount of emission of the main emission (flash emission) is set to be equal to the value which is obtained by adding the correction coefficient "c", such as the amount of correction for flash control, which has been set by the photographer to the amount of emission to be reached when a flat emission is performed during the open time (TV) of the shutter 8 at an emission intensity equivalent to the sum of the emission intensity (pre_int−t_pre) of the preliminary emission and the ratio "r" obtained in Step S009 (actually, an emission intensity of "r" times that of the preliminary emission).

In Step S012 which corresponds to Step S23 of the flowchart of FIG. 43(a), the amount of emission of the main emission is controlled on the basis of the correct integral value obtained in Step S011.

As described above, in the camera system according to the above-described embodiment, since the preliminary emission is variable, it is possible to realize preliminary-emission light measurement capable of preventing a person to be photographed from being dazzled. In addition, since the direct light of the flash unit 18 is measured and the flash unit 18 is controlled so that the amount of emission of the main emission can be made equal to a correct integral value, it is possible to obtain stable and correct exposure irrespective of the status or position of a subject or the kind of photographic film.

If the shutter release button continues to be pressed with the FE lock mode selected, the camera system can execute continuous shooting at a constant amount of emission of the flash unit 18 (i.e., at the same amount of exposure).

In addition, after the FE lock mode is selected, if a photographer performs an operation for altering photographic conditions before an exposure operation, the FE lock mode is changed to the batch emission mode and preliminary-emission light measurement is again performed. Accordingly, it is possible to obtain correct exposure suited to the changed photographic conditions.

Incidentally, the present invention can be applied to a camera system using an image recording medium other than photographic film, and can also be applied to a camera system using an image recording medium to which photographic information can be written by a method other than magnetic recording.

What is claimed is:

1. A camera system capable of controlling a flash unit, which is arranged to perform a main emission pointed at a subject and perform an exposure operation, comprising:
   (a) a circuit which performs a preliminary emission pointed at a subject;
   (b) light measuring circuit which performs measurement of a light reflected from the subject during the preliminary emission;
   (c) computing circuit which computes an amount of emission of a main emission on the basis of a result of the measurement of the reflected light;
   (d) flash-unit control circuit which controls the amount of emission of the main emission on the basis of a computation result provided by said computing circuit; and
   (e) a diaphragm setting circuit for forcedly setting a diaphragm of a photographing lens to a fully open aperture value before the preliminary emission,
   wherein said preliminary emission is performed while the aperture is maintained in a fully opened state.

2. A camera system capable of controlling a flash unit according to claim 1, wherein the preliminary emission is a flat emission which continues with a peak value kept constant for a predetermined time.

3. A camera system according to claim 1, wherein said diaphragm setting circuit sets the diaphragm to the fully open aperture value if the preliminary emission is performed while the diaphragm is being stopped down before the exposure operation.

4. A camera system capable of controlling a flash unit, which is arranged to perform a main emission pointed at a subject and perform an exposure operation, comprising:
   (a) a circuit which performs a preliminary emission pointed at a subject;
   (b) light measuring circuit which performs measurement of a light reflected from the subject during the preliminary emission;
   (c) computing circuit which computes an amount of emission of a main emission on the basis of a result of the measurement of the reflected light;
   (d) flash-unit control circuit which controls the amount of emission of the main emission on the basis of a computation result provided by said computing circuit;
   (e) a preliminary emission control circuit having a first mode for causing the preliminary emission to be performed immediately before the main emission and a second mode for causing the preliminary emission to be performed independently of a main emission operation;
   (f) detecting circuit which detects whether a direction of an emission part of a flash unit has been changed; and
   (g) mode changing circuit which changes the second mode to the first mode if said detecting circuit detects that the direction of the emission part has changed.

5. A camera system capable of controlling a flash unit according to claim 4, wherein the preliminary emission is a flat emission which continues with a peak value kept constant for a predetermined time.

* * * * *

UNITED STATES PATENT AND TRADEMARK OFFICE
CERTIFICATE OF CORRECTION

PATENT NO.    : 6,363,221 B1
DATED         : March 26, 2002
INVENTOR(S)   : Tatsuyuki Tokunaga et al.

It is certified that error appears in the above-identified patent and that said Letters Patent is hereby corrected as shown below:

Column 12,
Line 58, delete "terminal Do" and insert -- terminal DO --.

Column 13,
Line 17, delete "terminal Pow" and insert -- terminal POW --.

Column 15,
Line 9, delete "TR1G" and insert -- TRIG --.

Column 16,
Line 60, delete "TR1G" and insert -- TRIG --.

Column 18,
Line 49, delete "circuit 166" and insert -- circuit 106 --.

Column 19,
Line 24, delete ""Focus.P11" and insert -- "Focus.P" --.

Column 27,
Line 5, delete "s614" and insert -- S614 --.
Line 53, delete "com level" and insert -- com_level --.

Column 28,
Line 60, delete "1shutter" and insert -- shutter --.

Column 29,
Line 1, delete "F_ELK" and insert -- F_FELK --.

Column 30,
Line 23, delete "level.2"" and insert -- "level.2" --.

UNITED STATES PATENT AND TRADEMARK OFFICE
CERTIFICATE OF CORRECTION

PATENT NO. : 6,363,221 B1
DATED : March 26, 2002
INVENTOR(S) : Tatsuyuki Tokunaga et al It is certified that error appears in the above-identified patent and that said Letters Patent is hereby corrected as shown below:

Column 41,
Line 5, delete "Step S1S" and insert -- Step S15 --.

Column 49,
Line 39, delete "_reads" and insert -- reads --.

Column 51,
Line 41, delete ""Step 0611" and insert -- "Step 06" --.

Column 52,
Line 18, delete "Sw2" and insert -- SW2 --.

Signed and Sealed this

Twenty-sixth Day of November, 2002

Attest:

JAMES E. ROGAN
Attesting Officer        Director of the United States Patent and Trademark Office